(12) United States Patent
Yang et al.

(10) Patent No.: US 11,774,758 B2
(45) Date of Patent: Oct. 3, 2023

(54) WAVEGUIDE DISPLAY WITH MULTIPLE MONOCHROMATIC PROJECTORS

(71) Applicant: Meta Platforms Technologies, LLC, Menlo Park, CA (US)

(72) Inventors: Yang Yang, Redmond, WA (US); Wanli Chi, Sammamish, WA (US); Wai Sze Tiffany Lam, Bothell, WA (US); Dominic Meiser, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 270 days.

(21) Appl. No.: 17/184,316

(22) Filed: Feb. 24, 2021

(65) Prior Publication Data

US 2022/0269076 A1 Aug. 25, 2022

(51) Int. Cl.
| | | |
|---|---|---|
| *G02B 27/01* | (2006.01) | |
| *F21V 8/00* | (2006.01) | |
| *G02B 27/10* | (2006.01) | |
| *G06F 3/01* | (2006.01) | |

(52) U.S. Cl.
CPC ....... *G02B 27/0172* (2013.01); *G02B 6/0016* (2013.01); *G02B 6/0036* (2013.01); *G02B 27/102* (2013.01); *G02B 2027/0112* (2013.01); *G02B 2027/0123* (2013.01); *G02B 2027/0174* (2013.01); *G06F 3/012* (2013.01); *G06F 3/013* (2013.01)

(58) Field of Classification Search
CPC .......... G02B 27/0172; G02B 27/102; G02B 6/0016; G02B 6/0036; G02B 2027/0112; G02B 2027/0123; G02B 2027/0174; G06F 3/012; G06F 3/013
See application file for complete search history.

(56) References Cited

U.S. PATENT DOCUMENTS

| | | | |
|---|---|---|---|
| 10,750,145 B1* | 8/2020 | Shipton | G02F 1/1334 |
| 11,194,159 B2* | 12/2021 | Popovich | G02B 27/0101 |
| 11,262,490 B2* | 3/2022 | Lee | G02B 27/0081 |
| 2018/0052501 A1 | 2/2018 | Jones, Jr. et al. | |
| 2019/0212557 A1 | 7/2019 | Waldern et al. | |

(Continued)

FOREIGN PATENT DOCUMENTS

WO 2019185977 A1 10/2019

OTHER PUBLICATIONS

International Search Report and Written Opinion for International Application No. PCT/US2022/017539, dated Jun. 8, 2022, 15 pages.

*Primary Examiner* — Collin X Beatty
(74) *Attorney, Agent, or Firm* — Weaver Austin Villeneuve & Sampson LLP

(57) ABSTRACT

A waveguide display includes a waveguide, three input gratings configured to couple display light in different respective colors into the waveguide, one or more first middle gratings configured to receive and redirect the display light from the three input gratings, a second middle grating configured to diffract, at two or more regions of the second middle grating, the display light from the one or more first middle gratings, and an output grating configured to couple the display light from each of the two or more regions of the second middle grating out of the waveguide at two or more regions of the output grating.

20 Claims, 32 Drawing Sheets

(56) References Cited

U.S. PATENT DOCUMENTS

| | | |
|---|---|---|
| 2021/0033857 A1 | 2/2021 | Waldern et al. |
| 2021/0250570 A1* | 8/2021 | Hudman .............. H04N 13/337 |
| 2022/0050295 A1* | 2/2022 | Russell ............. G02F 1/133528 |

* cited by examiner

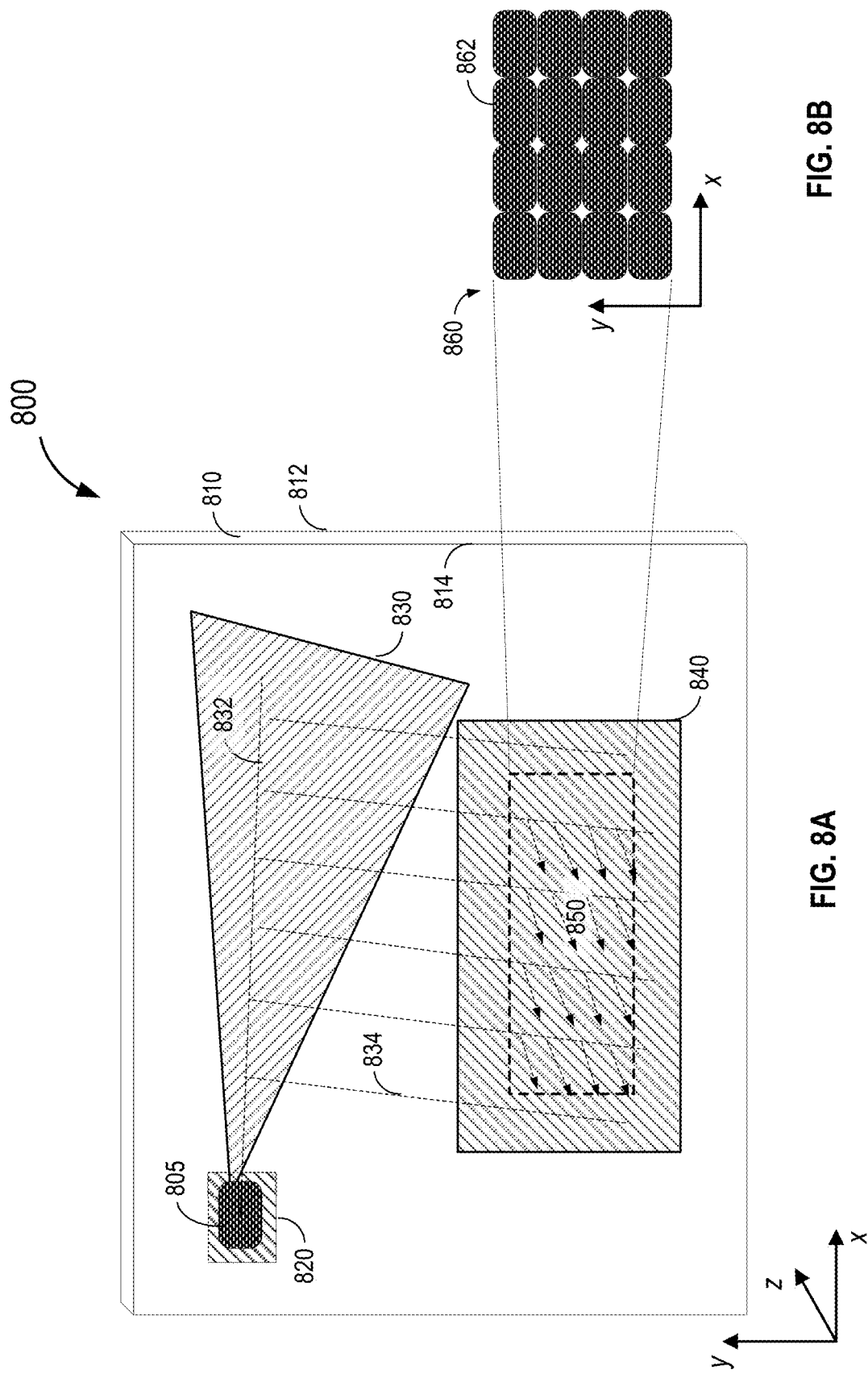

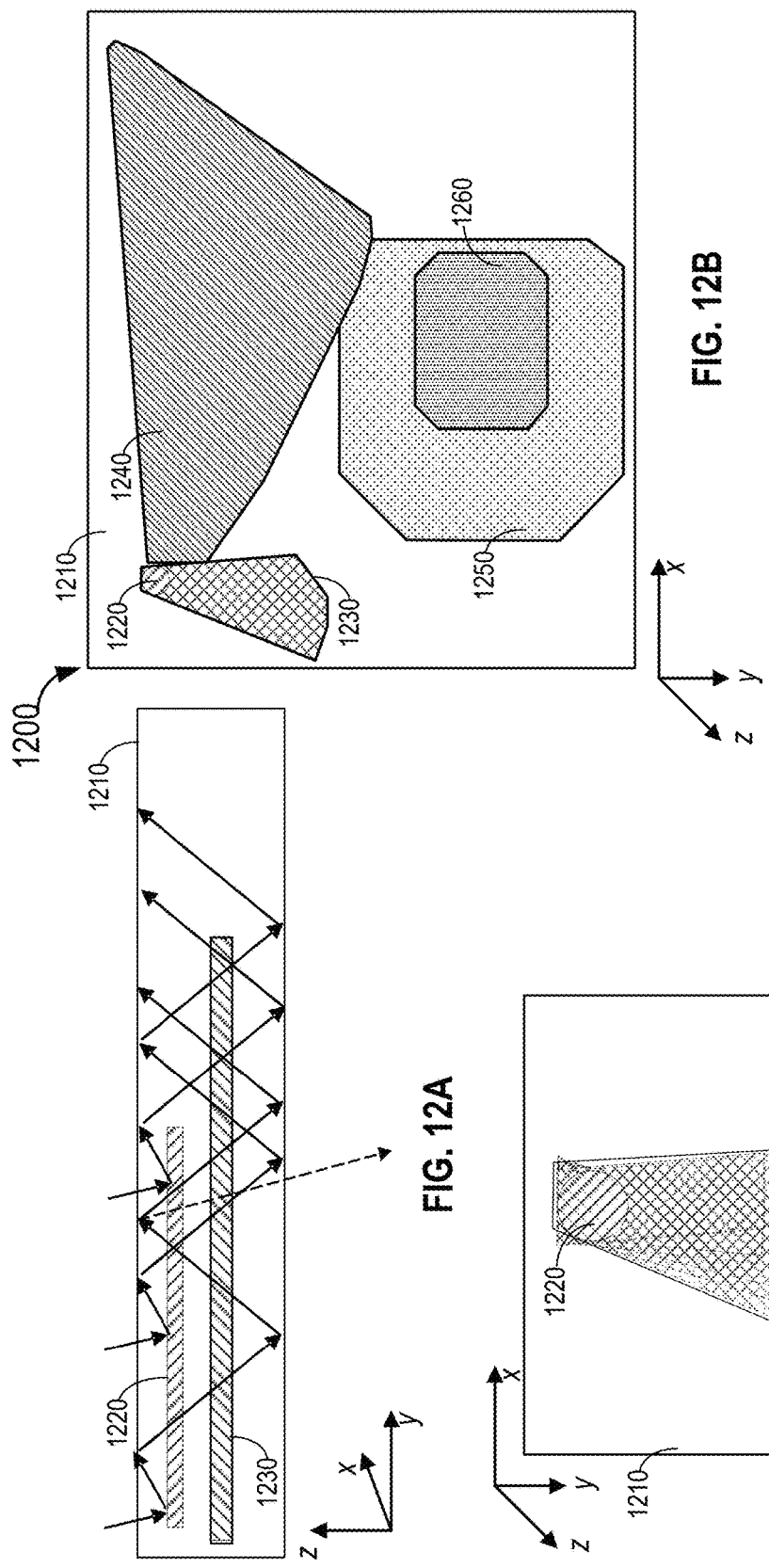

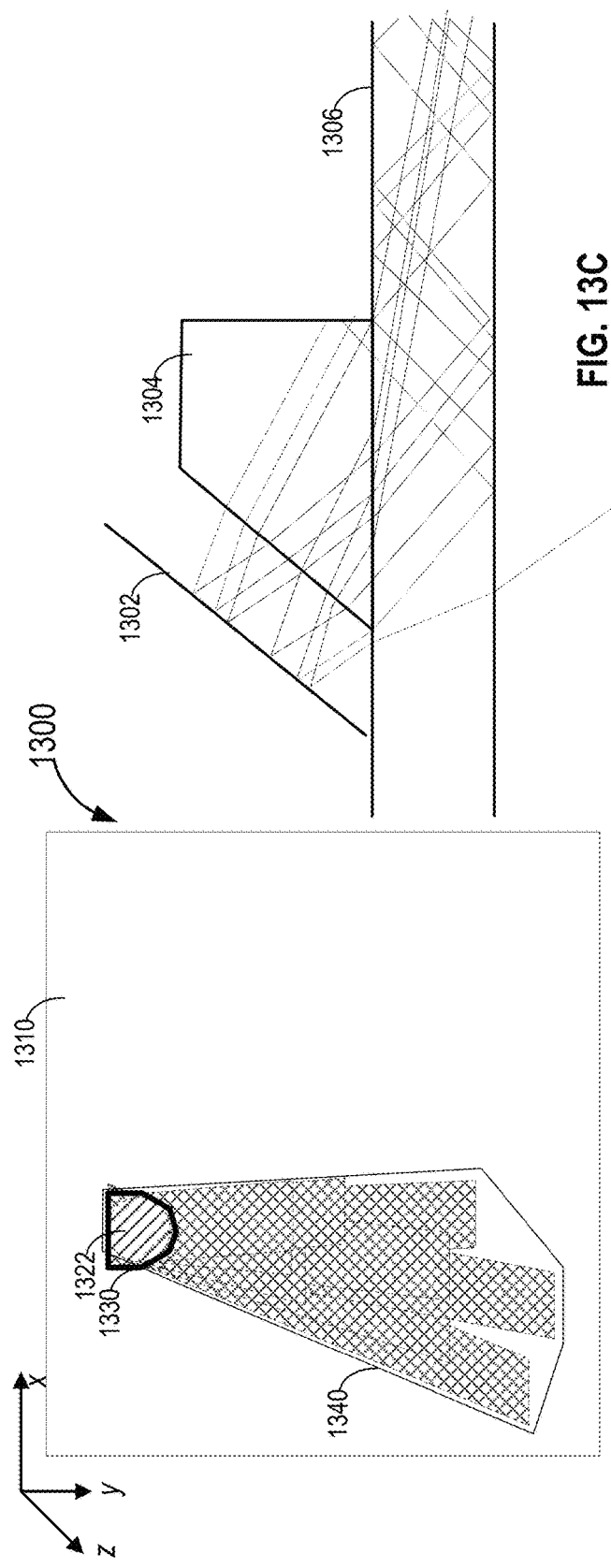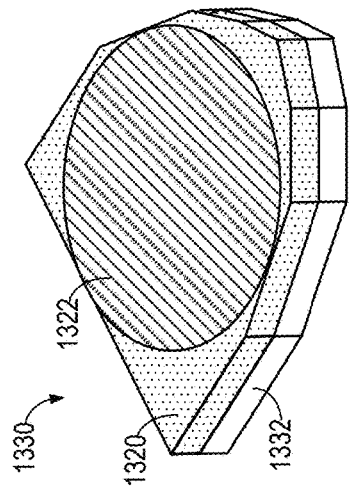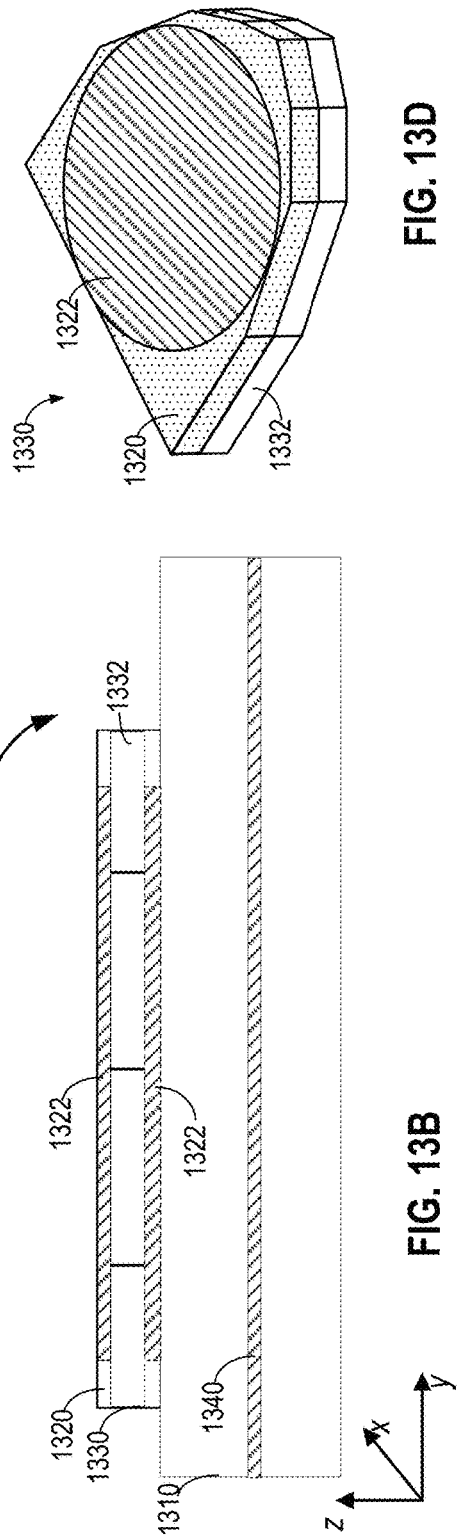
FIG. 13A
FIG. 13C
FIG. 13D
FIG. 13B

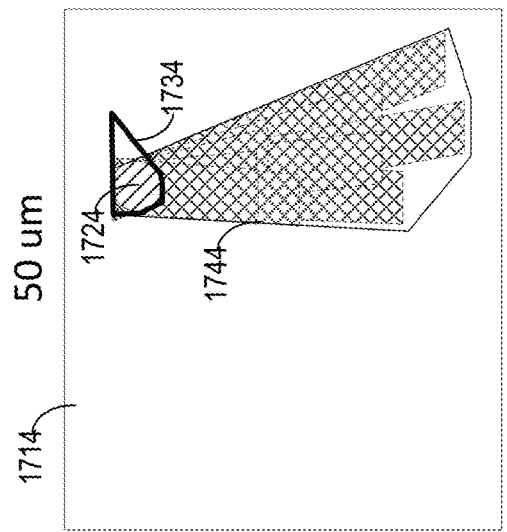
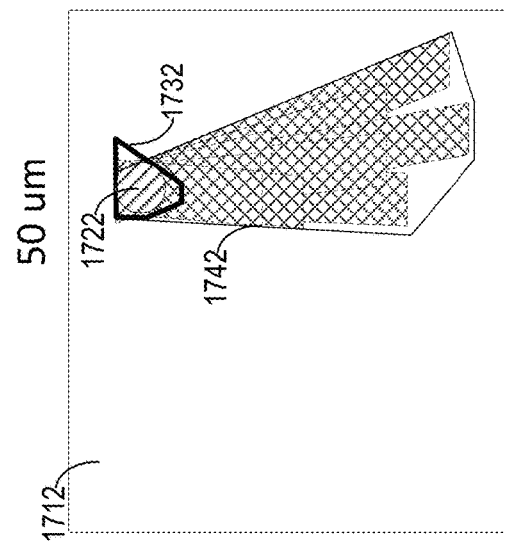
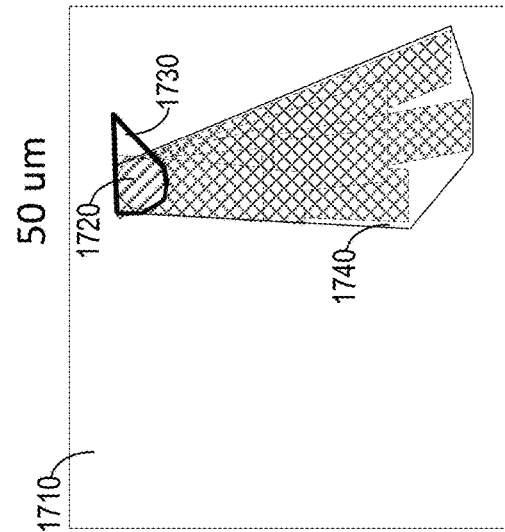
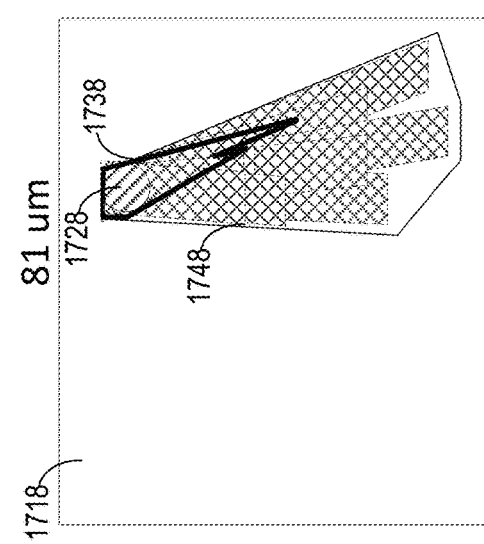

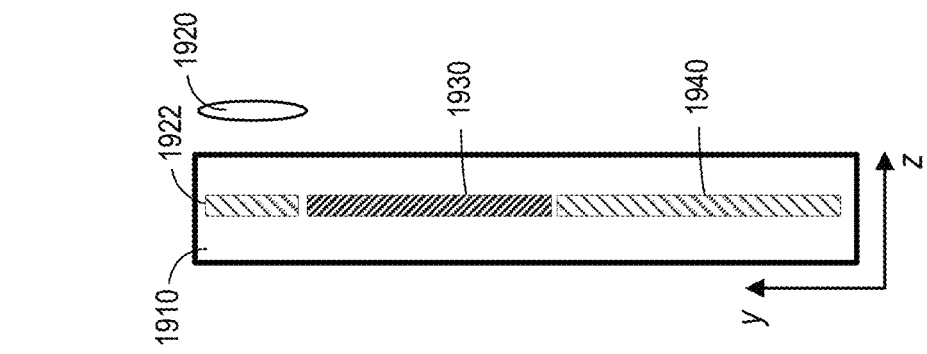
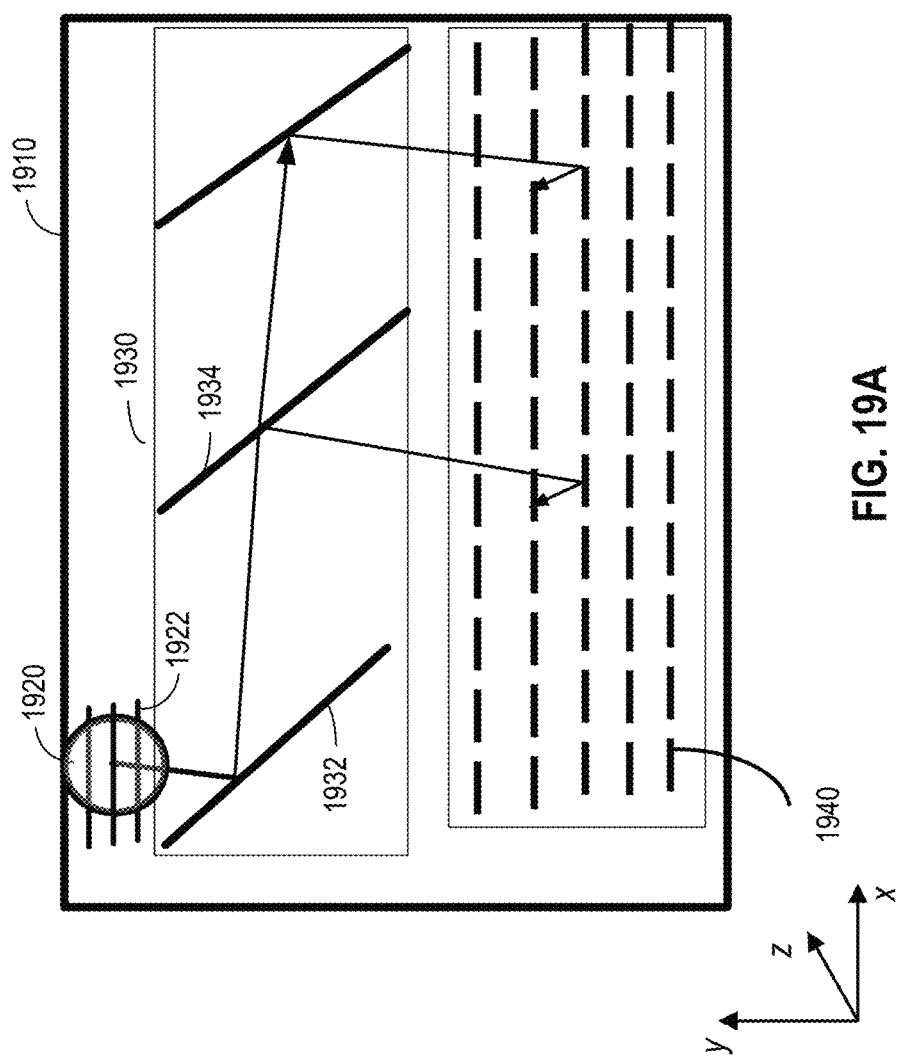
FIG. 19B
FIG. 19A

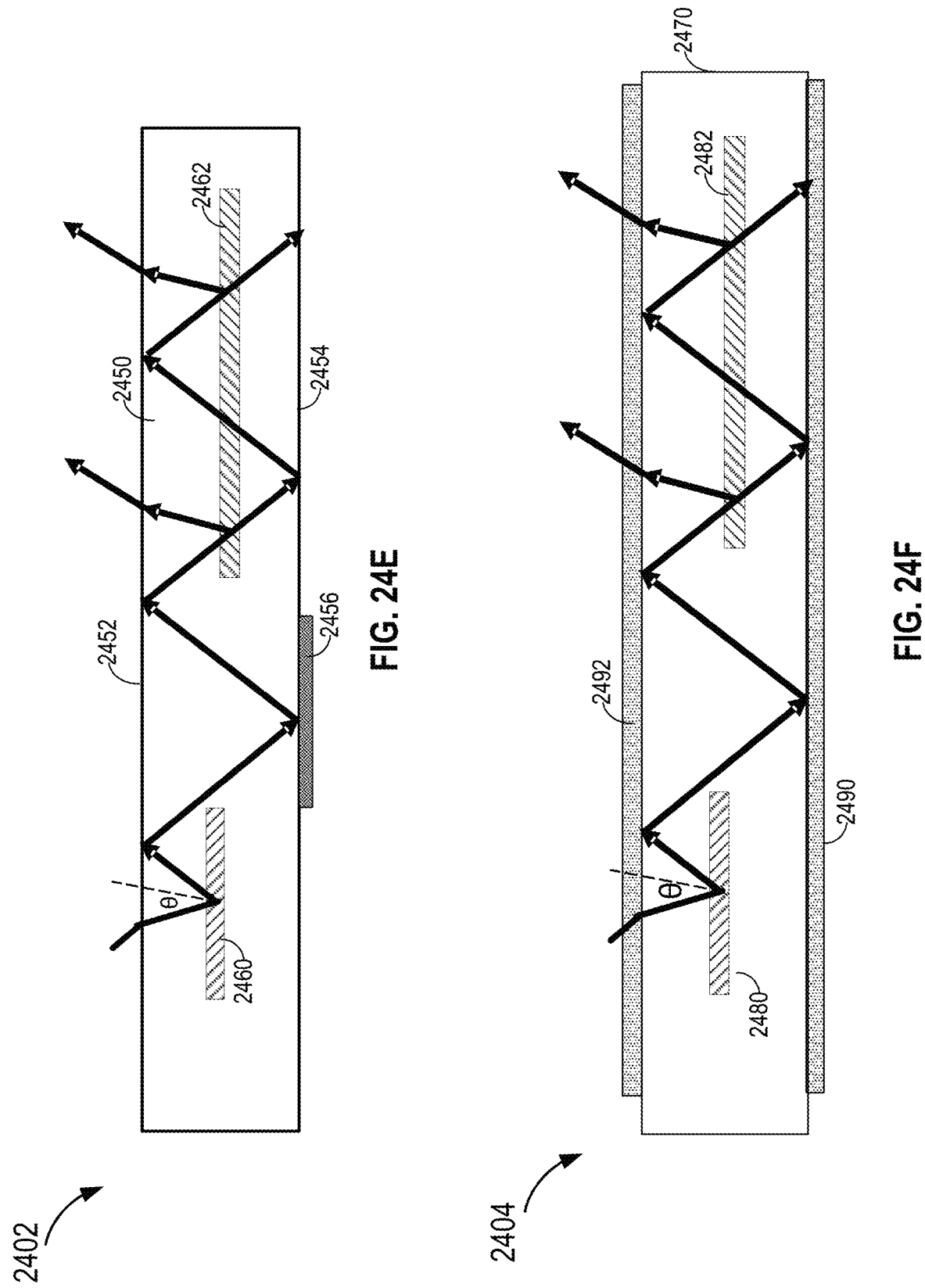

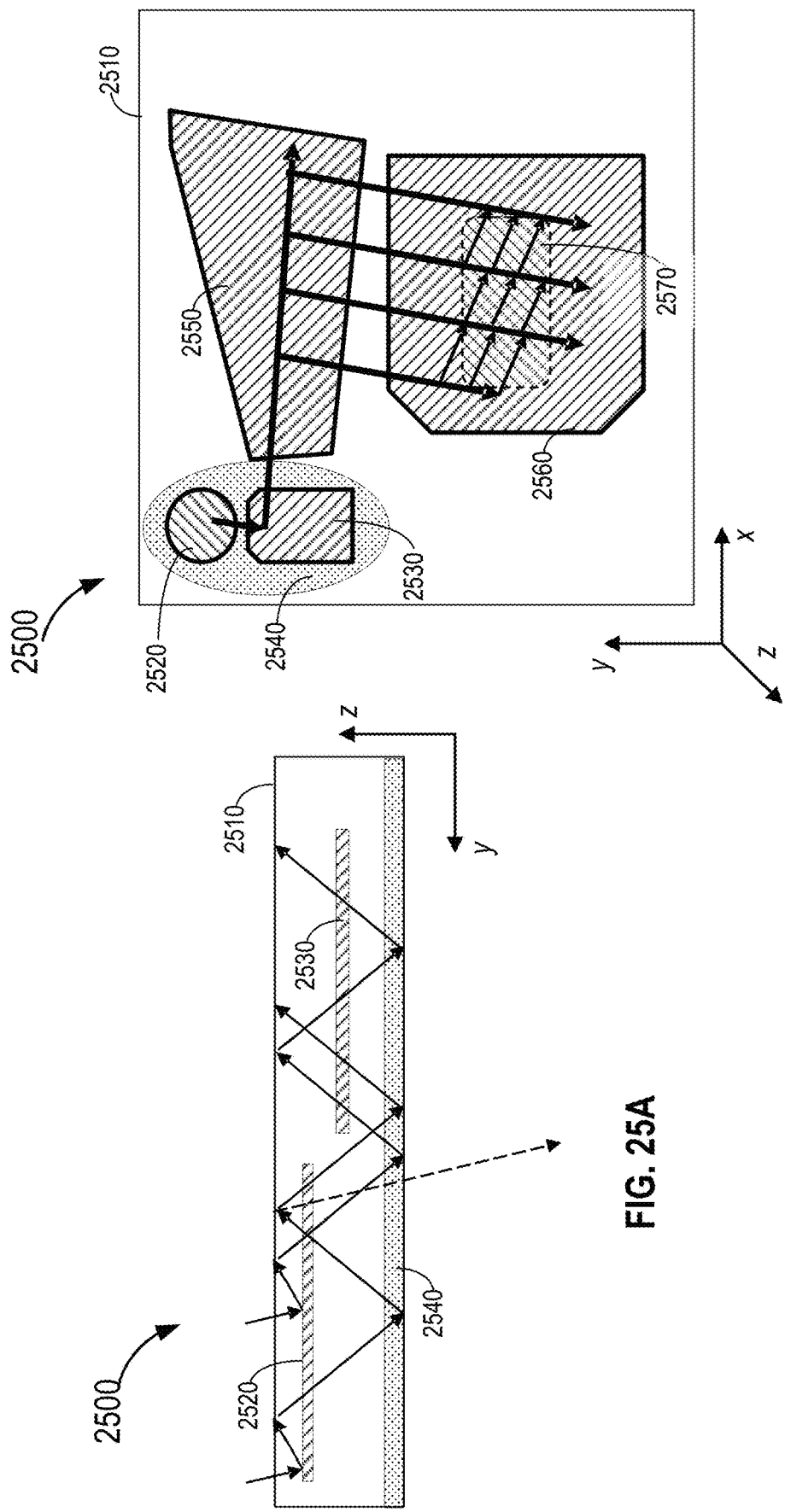

WAVEGUIDE DISPLAY WITH MULTIPLE MONOCHROMATIC PROJECTORS

CROSS-REFERENCES TO RELATED APPLICATIONS

The following two U.S. patent applications (including this one) are being filed concurrently, and the entire disclosure of the other applications are incorporated by reference into this application for all purposes:

Application Ser. No. 17/184,312, filed Feb. 24, 2021, entitled "STAIRCASE IN-COUPLING FOR WAVEGUIDE DISPLAY"; and Application Ser. No. 17/184,316, filed Feb. 24, 2021, entitled "WAVEGUIDE DISPLAY WITH MULTIPLE MONOCHROMATIC PROJECTORS".

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using diffractive optical elements, such as volume holographic gratings and/or surface-relief gratings. Light from the surrounding environment may pass through a see-through region of the waveguide and reach the user's eyes as well.

SUMMARY

This disclosure relates generally to grating-based waveguide displays for near-eye display. More specifically, disclosed herein are techniques for improving the coupling efficiencies of grating-based near-eye display systems. Various inventive embodiments are described herein, including devices, systems, methods, and the like.

According to some embodiments, a waveguide display may include a waveguide that includes a first substrate, a second substrate, and a holographic material layer between the first substrate and the second substrate. The holographic material layer may include a first grating and a second grating. The waveguide display may also include a staircase structure coupled to the waveguide and positioned on top of at least a portion of the first grating but not on top of the second grating. The staircase structure may include an input grating that is on top of the first grating and is configured to couple display light into the waveguide. The first grating is configured to redirect the display light coupled into the waveguide by the input grating towards the second grating.

In some embodiments of the waveguide display, the staircase structure is characterized by a total thickness less than about 100 μm. In some embodiments, the staircase structure may include two or more holographic material layers. In some embodiments, the staircase structure may include a staircase substrate, and the input grating is on a top or bottom surface of the staircase substrate. In some embodiments, a shape and a thickness of the staircase structure may be selected to avoid clipping of a field of view of the waveguide display by the staircase structure.

In some embodiments, the waveguide display may also include an output grating. The second grating may be configured to diffract, at two or more regions of the second grating, the display light from the first grating towards the output grating. The output grating may be configured to couple the display light from each of the two or more regions of the second grating out of the waveguide at two or more regions of the output grating. In some embodiments, the waveguide display may also include a phase structure on the first substrate or the second substrate. The phase structure may be configured to change a polarization state of the display light incident on the phase structure before or after the display light is redirected by the first grating. The phase structure may include a waveplate, a layer of a birefringent material, or a subwavelength structure and an overcoat layer. The phase structure may be in selected regions of the waveguide or may be characterized by a spatially varying phase retardation across different regions of the phase structure.

In some embodiments, the input grating, the first grating, and the second grating may include transmissive volume Bragg gratings or reflective volume Bragg gratings. In some embodiments, the waveguide display may include two or more holographic material layers between the first substrate and the second substrate. The first grating and the second grating may be formed in the two or more holographic material layers.

According to some embodiments, a waveguide display may include a projector configured to transmit display light, a waveguide, a first grating and a second grating in a first region and a second region, respectively, of the waveguide, and a staircase structure on the first region of the waveguide. The staircase structure may include an input grating on top of the first grating and configured to couple the display light from the projector into the waveguide. The first grating is configured to redirect the display light coupled into the waveguide by the input grating towards the second grating.

In some embodiments of the waveguide display, the waveguide may include a first substrate, a second substrate, and one or more holographic material layers between the first substrate and the second substrate. The first grating and the second grating may be formed in the one or more holographic material layers. In some embodiments, the staircase structure may be characterized by a total thickness less than about 100 μm. In some embodiments, the staircase structure may include two or more holographic material layers, and the input grating may be formed in the two or more holographic material layers. In some embodiments, the staircase structure may include a staircase substrate, and the input grating is on a top or bottom surface of the staircase substrate.

In some embodiments, the waveguide display may include an output grating in the waveguide. The second grating may be configured to diffract, at two or more regions of the second grating, the display light from the first grating towards the output grating. The output grating may be configured to couple the display light from each of the two or more regions of the second grating out of the waveguide at two or more regions of the output grating. In some embodiments, the waveguide display may include a phase structure on the waveguide, where the phase structure may be configured to change a polarization state of the display light incident on the phase structure before or after the display light is redirected by the first grating. The phase structure may include, for example, a waveplate, a layer of a birefringent material, or a subwavelength structure and an overcoat layer. In some embodiments, the input grating, the first grating, and the second grating may include transmissive volume Bragg gratings or reflective volume Bragg gratings. A shape and a thickness of the staircase structure may be selected to avoid clipping of a field of view of the waveguide display by the staircase structure.

According to some embodiments, a waveguide display may include a waveguide, three input gratings configured to couple display light in different respective colors into the waveguide, one or more first middle gratings configured to receive and redirect the display light from the three input gratings, a second middle grating configured to diffract, at two or more regions of the second middle grating, the display light from the one or more first middle gratings, and an output grating configured to couple the display light from each of the two or more regions of the second middle grating out of the waveguide at two or more regions of the output grating.

In some embodiments of the waveguide display, the one or more first middle gratings may include three first middle gratings, each first middle grating of the three first middle gratings corresponding to a respective input grating of the three input gratings and configured to receive and redirect the display light of the respective color from the corresponding respective input grating. In some embodiments, the waveguide may include a first substrate, a second substrate, and one or more holographic material layers between the first substrate and the second substrate. The one or more first middle gratings and the second middle grating may be formed in the one or more holographic material layers.

In some embodiments, the waveguide display may include three projectors. Each projector of the three projectors may be configured to generate a monochromatic image, and each input grating of the three input gratings may be configured to couple the monochromatic image from a corresponding projector of the three projectors into the waveguide. In some embodiments, each projector of the three projectors may include a two-dimensional array of micro-LEDs. In some embodiments, the waveguide display may include a phase structure on the waveguide. The phase structure may be configured to change a polarization state of the display light incident on the phase structure before or after the display light is redirected by the one or more first middle gratings. In some embodiments, the phase structure may include a waveplate, a layer of a birefringent material, or a subwavelength structure and an overcoat layer. In some embodiments, the phase structure may be in selected regions of the waveguide or may be characterized by a spatially varying phase retardation across different regions of the phase structure.

In some embodiments of the waveguide display, the three input gratings, the one or more first middle gratings, and the second middle grating may include multiplexed transmissive volume Bragg gratings or multiplexed reflective volume Bragg gratings. In some embodiments, each input grating of the three input gratings may be on a respective staircase structure bonded to the waveguide, and each respective staircase structure may be on top of the one or more first middle gratings. In some embodiments, each respective staircase structure may include a staircase substrate, and each input grating of the three input gratings may be on a top or a bottom of the staircase substrate of the respective staircase structure. In some embodiments, the respective staircase structure may be characterized by a total thickness less than about 100 μm. In some embodiments, the respective staircase structure may include two or more holographic material layers, where the input grating may be formed in the two or more holographic material layers. In some embodiments, a shape and a thickness of the respective staircase structure may be selected to avoid clipping of a field of view of the waveguide display by the respective staircase structure.

According to some embodiments, a waveguide display may include a waveguide, three projectors configured to generate display light of different respective colors, three input gratings configured to couple the display light in the different respective colors into the waveguide, three first middle gratings configured to receive and redirect the display light from the respective input gratings of the three input gratings, a second middle grating configured to receive and redirect the display light from the three first middle gratings, and an output grating configured to couple the display light from the second middle grating out of the waveguide.

In some embodiments, the waveguide may include a first substrate, a second substrate, and one or more holographic material layers between the first substrate and the second substrate. The three first middle gratings and the second middle grating may be formed in the one or more holographic material layers. In some embodiments, the waveguide display may include a phase structure on the waveguide, where the phase structure may be configured to change a polarization state of the display light incident on the phase structure after or before the display light is diffracted by the three first middle gratings. In some embodiments, the phase structure may include a waveplate, a layer of a birefringent material, or a subwavelength structure and an overcoat layer. In some embodiments, each input grating of the three input gratings may be on a respective staircase structure bonded to the waveguide, and each respective staircase structure may be on top a first middle grating of the three first middle gratings. In some embodiments, each respective staircase structure may include a staircase substrate, each input grating of the three input gratings may be on a top or a bottom of the staircase substrate of the respective staircase structure, and each respective staircase structure may be characterized by a total thickness less than about 100 μm.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A illustrates an example of an optical see-through augmented reality system including a waveguide display and gratings for exit pupil expansion according to certain embodiments.

FIG. 8B illustrates an example of an eyebox including two-dimensional replicated exit pupils according to certain embodiments.

FIG. 12A illustrates an example of a method of improving in-coupling efficiency of a waveguide display according to certain embodiments.

FIG. 12B is a top view of an example of a waveguide display including grating couplers arranged to improve the in-coupling efficiency according to certain embodiments.

FIG. 12C is a zoom-in top view of a portion of the waveguide display shown in FIG. 12B according to certain embodiments.

FIG. 12D is a zoom-in side view of a portion of the waveguide display shown in FIG. 12B according to certain embodiments.

FIG. 13A is a top view of an example of a waveguide display including an input grating in a staircase structure for improving the in-coupling efficiency according to certain embodiments.

FIG. 13B a side view of the example of waveguide display shown in FIG. 13A according to certain embodiments.

FIG. 13C illustrates an example of pupil clipping in a waveguide display having a prism coupler according to certain embodiments.

FIG. 13D includes a perspective view of an example of a staircase structure according to certain embodiments.

FIGS. 17A-17C illustrate staircase shape optimization results for examples of waveguide displays including a grating coupler on the top of a staircase structure according to certain embodiments.

FIGS. 17D-17F illustrate staircase thickness optimization results for examples of waveguide displays including a grating coupler on the bottom of a staircase structure according to certain embodiments.

FIG. 19A is a front view of an example of a volume Bragg grating-based waveguide display according to certain embodiments.

FIG. 19B is a side view of the example of the volume Bragg grating-based waveguide display shown in FIG. 19A according to certain embodiments.

FIG. 24E illustrates a cross-sectional view of an example of a waveguide display including VBG couplers and a phase structure according to certain embodiments.

FIG. 24F illustrates a cross-sectional view of another example of a waveguide display including volume Bragg gratings and phase structures according to certain embodiments.

FIG. 25A illustrates a cross-sectional view of an input portion of an example of a waveguide display including VBG couplers and a phase structure according to certain embodiments.

FIG. 25B illustrates a top view of an example of a waveguide display including VBG couplers and a phase structure according to certain embodiments.

Figure 1:
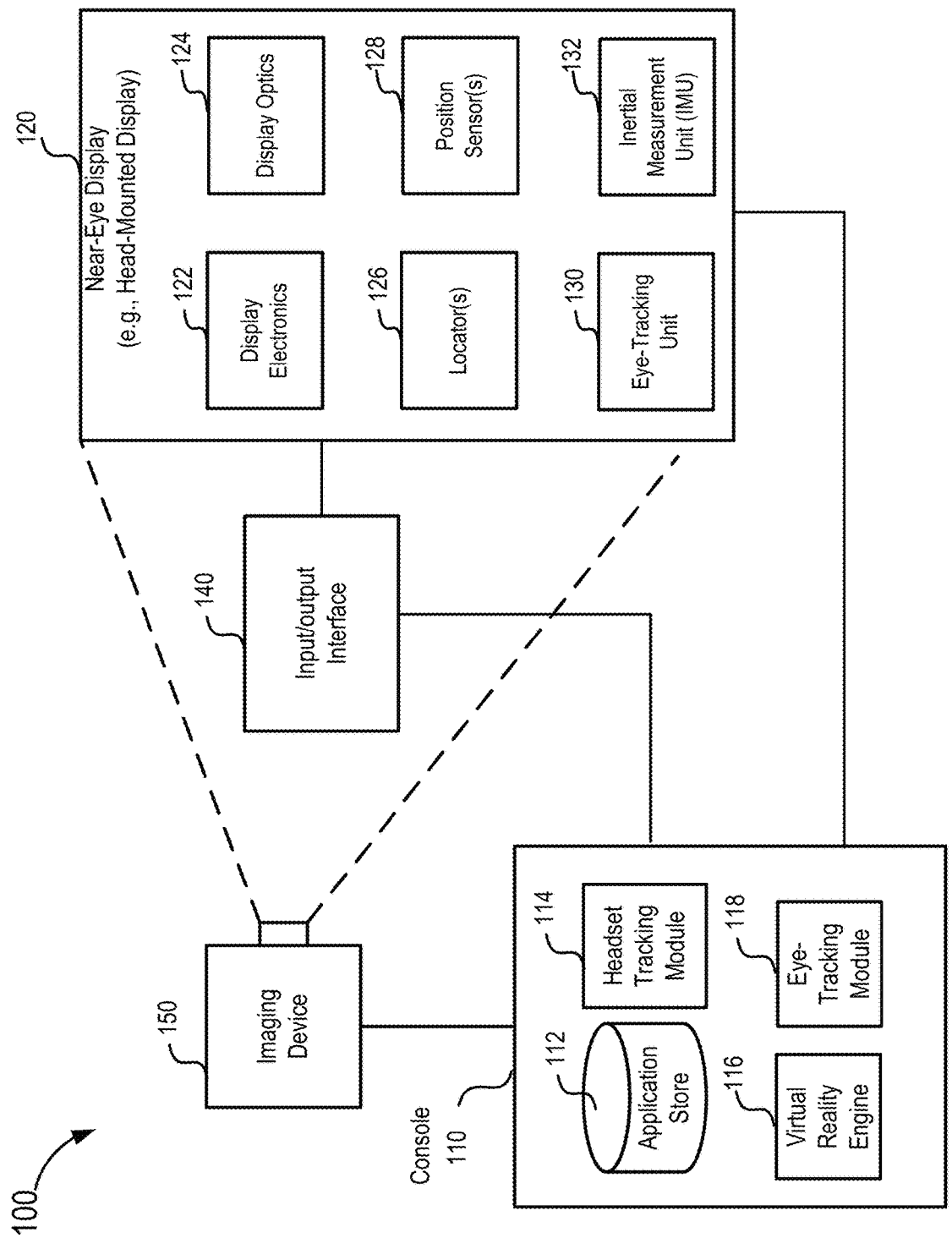
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to grating-based waveguide displays for near-eye display. More specifically, disclosed herein are techniques for improving the coupling efficiencies of grating-based near-eye display systems. Various inventive embodiments are described herein, including devices, systems, methods, and the like.

In a near-eye display system, it is generally desirable to expand the eyebox, improve image quality (e.g., resolution and contrast), reduce physical size, increase power efficiency, and increase the field of view (FOV). In a waveguide-based near-eye display system, light of projected images may be coupled into a waveguide (e.g., a substrate), propagate within the waveguide, and be coupled out of the waveguide at different locations to replicate exit pupils and expand the eyebox. Two or more gratings may be used to expand the eyebox in two dimensions. In a waveguide-based near-eye display system for augmented reality applications, light from the surrounding environment may pass through at least a see-through region of the waveguide display (e.g., the substrate) and reach the user's eyes. In some implementations, the light of the projected images may be coupled into or out of the waveguide using diffractive optical elements, such as gratings, which may also allow light from the surrounding environment to pass through.

Couplers implemented using diffractive optical elements may have limited coupling efficiencies due to, for example, less than 100% diffraction efficiency to the desired diffraction order, leakage, crosstalk, polarization dependence, angular dependence, wavelength dependence, and the like. Grating couplers may be optimized to maximize the power of the display light in the desired path. For example, the grating shape, the slant angle, the grating period, the duty cycle, the grating height or depth, the refractive index, the refractive index modulation, the overcoating material, and the spatial variations of these grating parameters across the grating may be adjusted to improve the efficiencies of directing display light to the desired directions towards the eyebox. Varying these parameters may provide some but limited improvements to the efficiencies of the waveguide display due to the intrinsic characteristics of the SRGs and VBGs, such as a limited maximum achievable refractive index modulation in a holographic recording material. In addition, in waveguide displays using surface-relief grating (SRG) couplers or volume Bragg grating (VBG) couplers, due to the size of the input pupil and thus the size of the input grating coupler, display light coupled into the waveguide by the input grating coupler may be reflected back to the input grating coupler and may be diffracted again by the input grating coupler to undesired directions and thus may not reach the eyebox of the waveguide display.

According to certain embodiments, a second grating (e.g., a grating for pupil expansion) may be place underneath the input grating coupler, such that the in-coupled light by the input grating coupler may be diffracted by the second grating before the in-coupled light would reach the input grating coupler again due to total internal reflection at the surfaces of the waveguide. The in-coupled light that is diffracted by the second grating may change the propagation direction within the waveguide and thus may not meet the Bragg condition of the input grating coupler when it reaches the input grating coupler again. Therefore, the in-coupled light that is diffracted by the second grating may not be diffracted by the input grating coupler even if it reaches the input grating coupler again.

In some embodiments, the second grating may be fabricated in a holographic material layer within the waveguide, the input grating coupler may be fabricated in a different holographic material layer on a staircase structure that has a small area to avoid changing the thickness in other regions of the waveguide. Separately recording the input grating coupler and the second grating in different holographic material layers may make the manufacturing process easier, and may also help to improve the diffraction efficiency of the input grating coupler and the second grating due to the higher overall achievable refractive index modulation in more holographic material layers. The staircase structure including the input grating coupler may then be attached to the waveguide and aligned with the second grating. To avoid FOV clipping, the total thickness and the overall shape of the staircase structure that includes the holographic material layer in which the input grating coupler is recorded and the staircase substrate (if needed) on which the holographic material layer is attached may be optimized. In some embodiments, the thickness of the holographic material layer may be appropriate and thus the staircase substrate may not be used. In some embodiments, a staircase substrate (e.g., a thin glass plate) with a certain shape and thickness may be used such that the total thickness of the holographic material layer and the staircase substrate may be equal to the desired thickness.

According to certain embodiments, three color projectors may be used to generate three monochromatic images that can be combined to form a color image, and three input grating couplers may be used to couple the three monochromatic images respectively into the waveguide. Each color projector may include, for example, a micro-LED array that emits display light in one color. The three color projectors may include, for example, a red micro-LED array, a green micro-LED array, and a blue micro-LED array. Because of the separate input gratings for different colors, each input grating may use the total achievable refractive index modulation of the holographic material layer to achieve a higher diffraction efficiency for display light of the respective color. For example, the overall in-coupling efficiency may be about five to ten times of the overall in-coupling efficiency of a waveguide display without separate projectors and input gratings for three different colors.

According to certain embodiments, the efficiency of a waveguide display may further be improved by controlling the polarization state of the display light along its propagation path. For example, a phase structure may be coupled to a surface of the waveguide and used to change the polarization state of the light reflected at the surface of the waveguide, such that the reflected light, when reaching a grating coupler in its propagation path, may be more preferentially diffracted or reflected to the desired directions to improve the overall efficiency of the waveguide display. The phase structure may include any birefringent materials (e.g., birefringent crystals, liquid crystals, or polymers) or structures (e.g., gratings or other subwavelength structures) that can cause a desired phase delay between two orthogonal linear polarization components (e.g., s-polarized light and p-polarized light), such that the incident light beam may be changed to, for example, an s-polarized, p-polarized, circularly polarized, or elliptically polarized beam. The phase structure may be placed at various locations in a waveguide display, such as at the input coupler region, between the input coupler and the output coupler, at the output coupler region, or any combinations. Adding phase structures to waveguide displays can add more degrees of design freedom for optimizing the efficiencies of the waveguide display. For example, the location, the phase delay, the orientation, and other parameters of the phase structure may be selected to change the polarization state of the display light such that the display light may be more preferentially diffracted by the polarization-dependent gratings to desired diffraction orders and directions to reach user's eye eventually.

In some embodiments, a waveguide display may include any combination of the input grating in a staircase structure, the phase structure for changing the polarization state of the display light, and a respective set of a projector and an input coupler for each color of the display light. For example, a waveguide display may include an input grating in a staircase structure, a phase structure for changing the polarization state of the display light, and a set of a projector and an input coupler for all colors. In another example, a waveguide display may include an input grating in a staircase structure, and a respective set of a projector and an input coupler for each color of the display light. In another example, a waveguide display may include an input grating on a waveguide, a phase structure for changing the polarization state of the display light, and a respective set of a projector and an input coupler for each color of the display light. In yet another example, a waveguide display may include an input grating in a staircase structure, a phase structure for changing the polarization state of the display light, and a respective set of a projector and an input coupler for each color of the display light.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

I. Waveguide Display

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (e.g., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
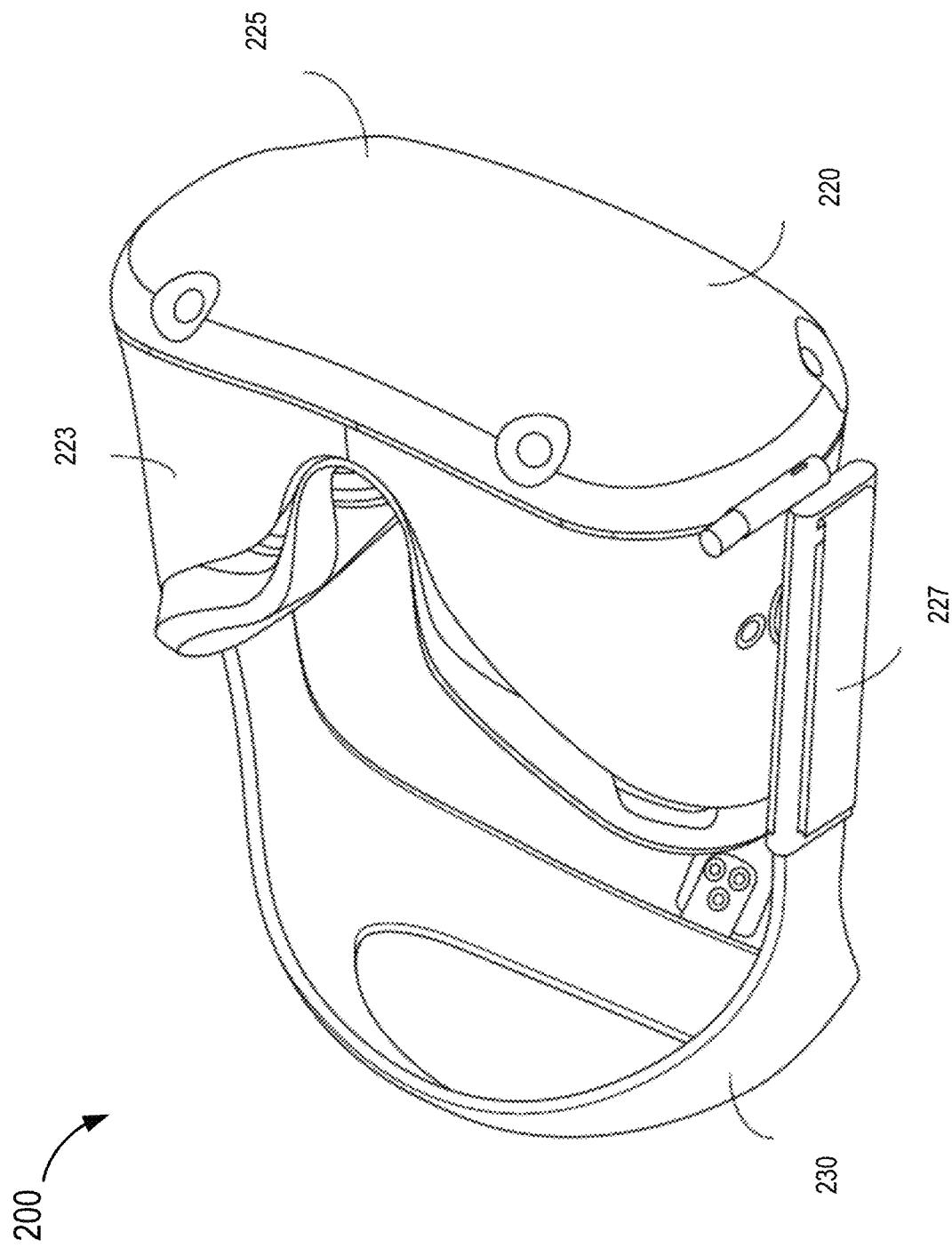
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO-LED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
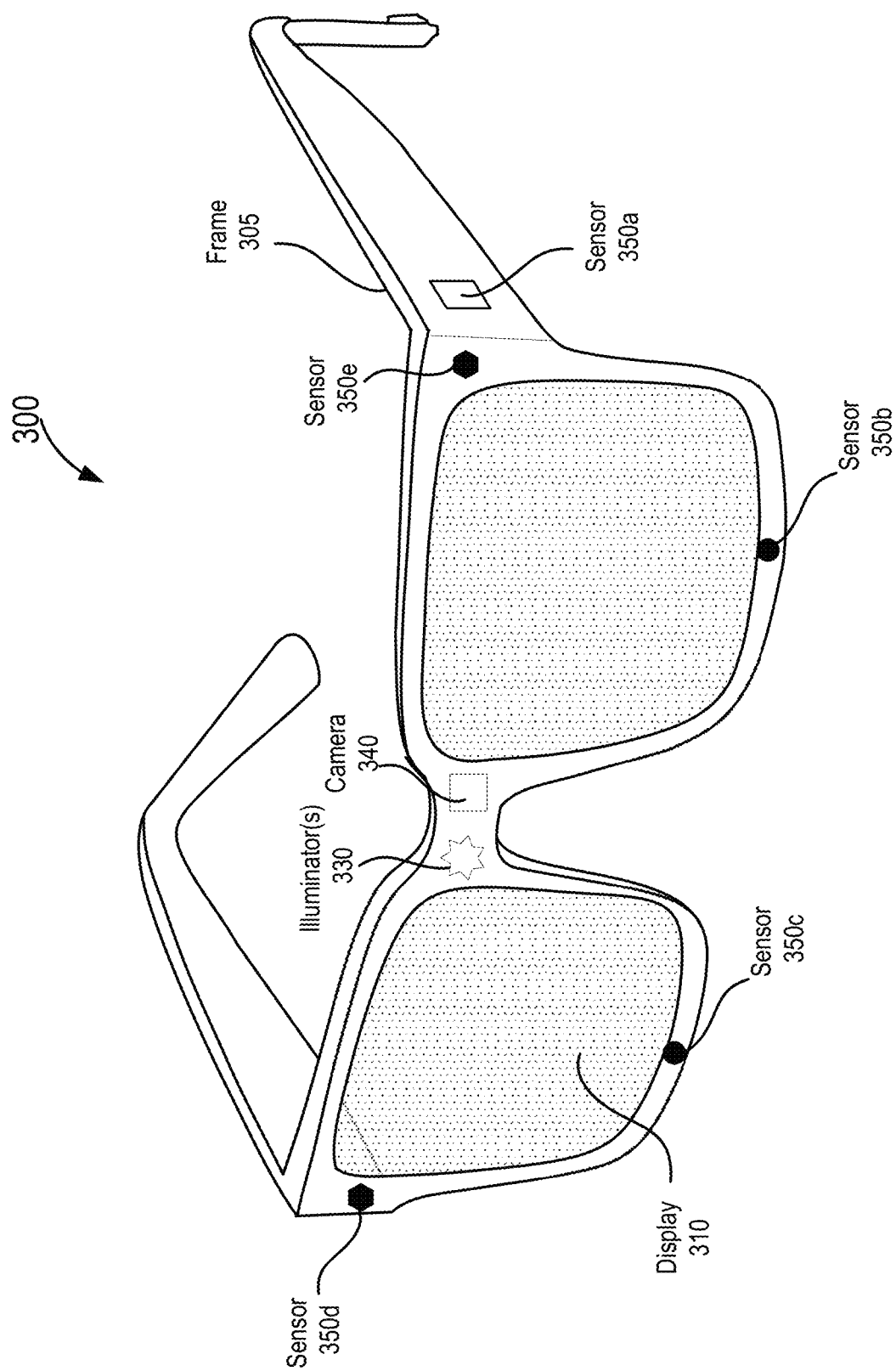
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different regions in a field of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
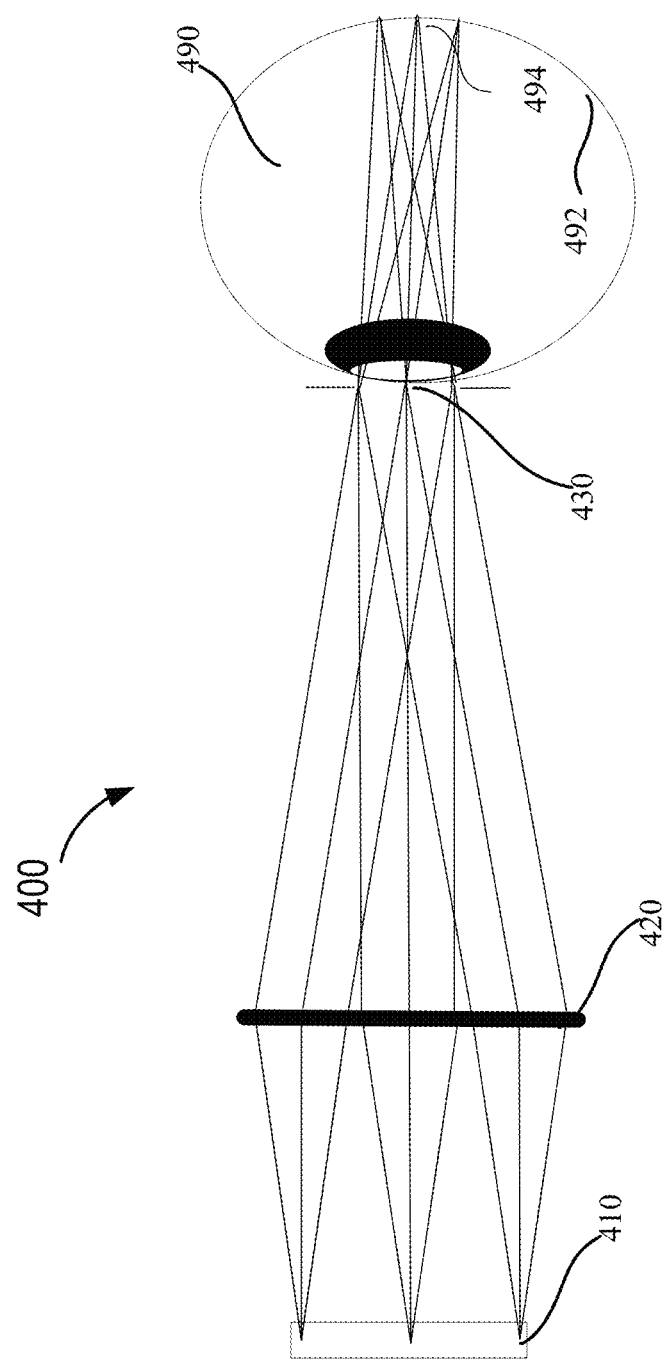
FIG. 4 is a simplified diagram illustrating an example of an optical system in a near-eye display system.

FIG. 4 is a simplified diagram illustrating an example of an optical system 400 in a near-eye display system. Optical system 400 may include an image source 410 and projector optics 420. In the example shown in FIG. 4, image source 410 is in front of projector optics 420. In various embodiments, image source 410 may be located outside of the field of view of user's eye 490. For example, one or more reflectors or directional couplers may be used to deflect light from an image source that is outside of the field of view of user's eye 490 to make the image source appear to be at the location of image source 410 shown in FIG. 4. Light from an area (e.g., a pixel or a light emitting device) on image source 410 may be collimated and directed to an exit pupil 430 by projector optics 420. Thus, objects at different spatial locations on image source 410 may appear to be objects far away from user's eye 490 in different viewing angles (FOVs). The collimated light from different viewing angles may then be focused by the lens of user's eye 490 onto different locations on retina 492 of user's eye 490. For example, at least some portions of the light may be focused on a fovea 494 on retina 492. Collimated light rays from an area on image source 410 and incident on user's eye 490 from a same direction may be focused onto a same location on retina 492. As such, a single image of image source 410 may be formed on retina 492.

II. Pupil Expansion

The user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Field of view describes the angular range of the image as seen by the user, usually measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arc-minutes, compared with the one-arc-minute resolution associated with Snellen 20/20 human visual acuity.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. This may require that the eye rotates in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, the environment where the HMD is used may require the eyebox to be larger to allow for movement of the user's eye and/or head relative the HMD, for example, when the HMD is used in a moving vehicle or designed to be used while the user is moving on foot. The amount of movement in these situations may depend on how well the HMD is coupled to the user's head.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HMD. On the other hand, the larger the eyebox, the larger the optics and the heavier and bulkier the near-eye display device may be.

In order to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 5:
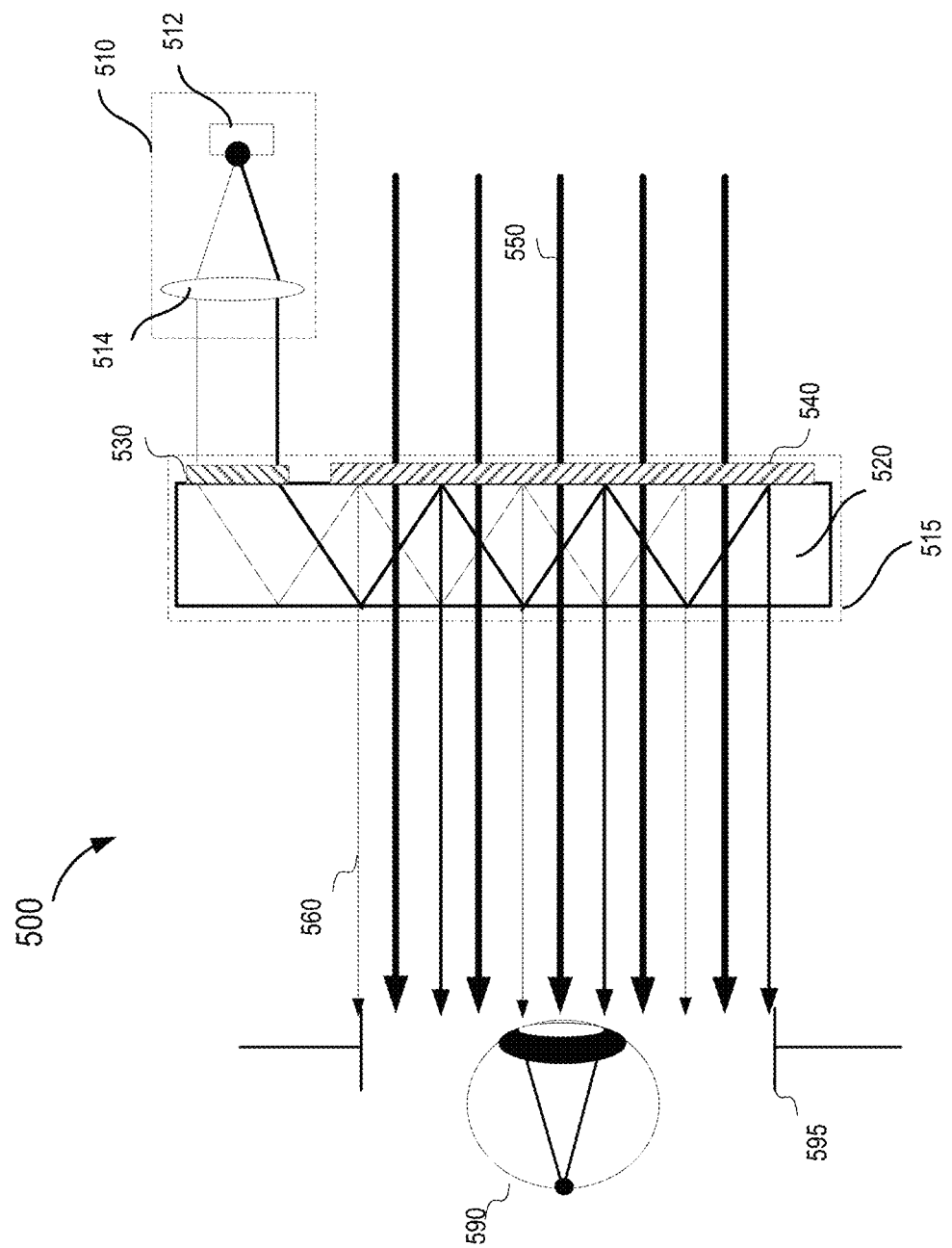
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 May include a projector 510 and a combiner 515. Projector 510 may include a light source or image source 512 and projector optics 514. In some embodiments, light source or image source 512 may include one or more micro-LED devices. In some embodiments, image source 512 may include a plurality of pixels that displays virtual objects, such as an LCD display panel or an LED display panel. In some embodiments, image source 512 may include a light source that generates coherent or partially coherent light. For example, image source 512 may include a laser diode, a vertical cavity surface emitting laser, an LED, a superluminescent LED (sLED), and/or a micro-LED described above. In some embodiments, image source 512 may include a plurality of light sources (e.g., an array of micro-LEDs described above) each emitting a monochromatic image light corresponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, free-form optics, apertures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating or another diffractive optical element (DOE) (e.g., a surface-relief grating (SRG)), a slanted reflective surface of substrate 520, or a refractive coupler (e.g., a wedge or a prism). For example, input coupler 530 may include a reflective volume Bragg grating or a transmissive volume Bragg grating. Input coupler 530 may have a coupling efficiency of greater than 30%, 50%, 75%, 90%, or higher for visible light. Light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 520 may be transparent to visible light.

Substrate 520 may include or may be coupled to a plurality of output couplers 540 each configured to extract at least a portion of the light guided by and propagating within substrate 520 from substrate 520, and direct extracted light 560 to an eyebox 595 where an eye 590 of the user of augmented reality system 500 may be located when augmented reality system 500 is in use. The plurality of output couplers 540 may replicate the exit pupil to increase the size of eyebox 595, such that the displayed image may be visible in a larger area. As input coupler 530, output couplers 540 may include grating couplers (e.g., volume holographic gratings or surface-relief gratings), other diffraction optical elements (DOEs), prisms, etc. For example, output couplers 540 may include reflective volume Bragg gratings or transmissive volume Bragg gratings. Output couplers 540 may have different coupling (e.g., diffraction) efficiencies at different locations. Substrate 520 may also allow light 550 from the environment in front of combiner 515 to pass through with little or no loss. Output couplers 540 may also allow light 550 to pass through with little loss. For example, in some implementations, output couplers 540 may have a very low diffraction efficiency for light 550 such that light 550 may be refracted or otherwise pass through output couplers 540 with little loss, and thus may have a higher intensity than extracted light 560. In some implementations, output couplers 540 may have a high diffraction efficiency for light 550 and may diffract light 550 in certain desired directions (i.e., diffraction angles) with little loss. As a result, the user may be able to view combined images of the environment in front of combiner 515 and images of virtual objects projected by projector 510. In some implementations, output couplers 540 may have a high diffraction efficiency for light 550 and may diffract light 550 to certain desired directions (e.g., diffraction angles) with little loss.

In some embodiments, projector 510, input coupler 530, and output coupler 540 may be on any side of substrate 520. Input coupler 530 and output coupler 540 may be reflective gratings (also referred to as reflective gratings) or transmissive gratings (also referred to as transmissive gratings) to couple display light into or out of substrate 520.

Figure 6:
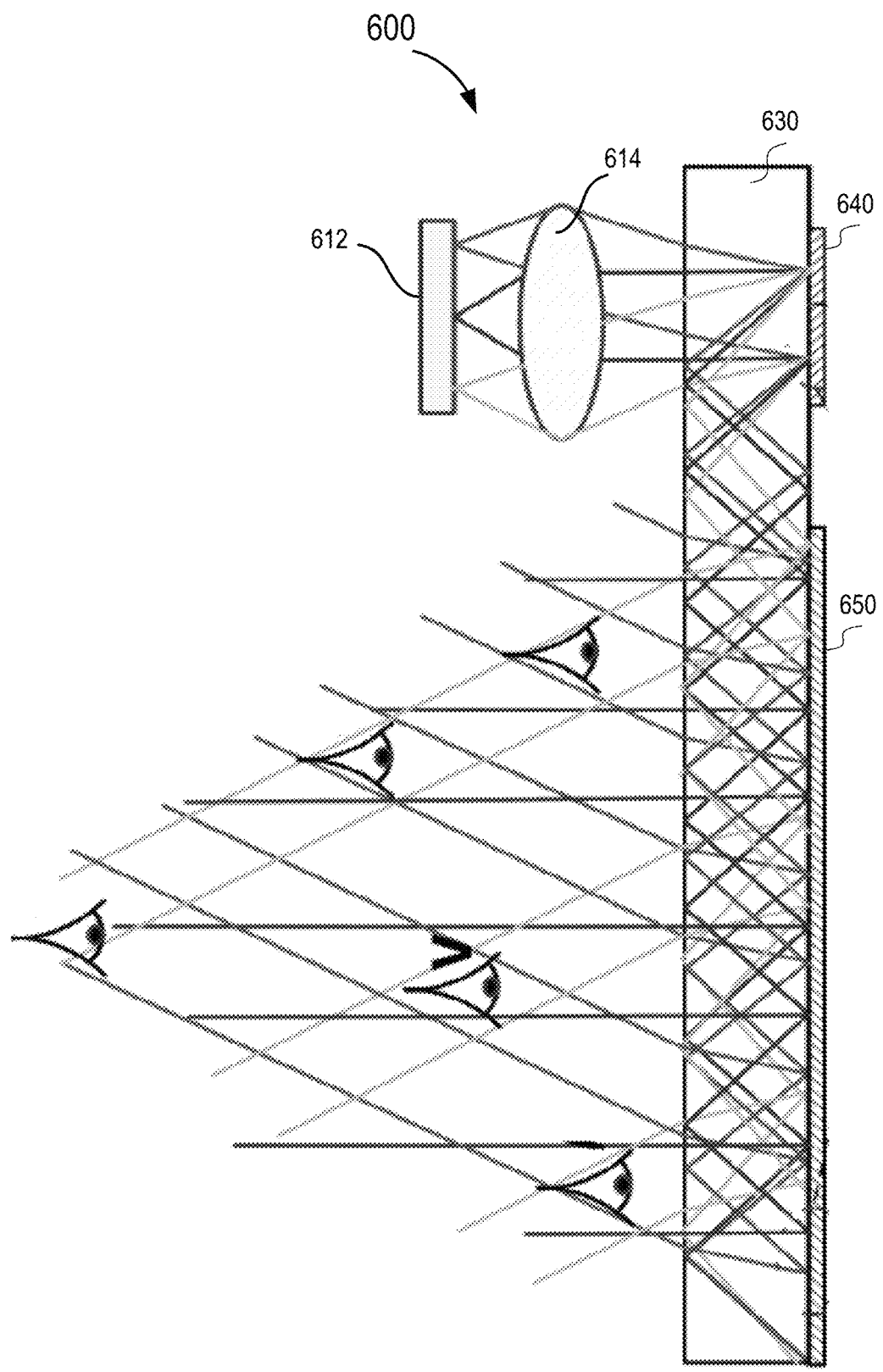
FIG. 6 illustrates an example of an optical see-through augmented reality system including a waveguide display for exit pupil expansion according to certain embodiments.

FIG. 6 illustrates an example of an optical see-through augmented reality system 600 including a waveguide display for exit pupil expansion according to certain embodiments. Augmented reality system 600 may be similar to augmented reality system 500, and may include the waveguide display and a projector that may include a light source or image source 612 and projector optics 614. The waveguide display may include a substrate 630, an input coupler 640, and a plurality of output couplers 650 as described above with respect to augmented reality system 500. While FIG. 5 only shows the propagation of light from a single field of view, FIG. 6 shows the propagation of light from multiple fields of view.

FIG. 6 shows that the exit pupil is replicated by output couplers 650 to form an aggregated exit pupil or eyebox, where different regions in a field of view (e.g., different pixels on image source 612) may be associated with different respective propagation directions towards the eyebox, and light from a same field of view (e.g., a same pixel on image source 612) may have a same propagation direction for the different individual exit pupils. Thus, a single image of image source 612 may be formed by the user's eye located anywhere in the eyebox, where light from different individual exit pupils and propagating in the same direction may be from a same pixel on image source 612 and may be focused onto a same location on the retina of the user's eye. FIG. 6 shows that the image of the image source is visible by the user's eye even if the user's eye moves to different locations in the eyebox.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

As described above, the input and output grating couplers described above can be volume holographic gratings or surface-relief gratings, which may have very different Klein-Cook parameter $Q$:

$$Q = \frac{2\pi \lambda d}{n\Lambda^2},$$

where d is the thickness of the grating, $\lambda$ is the wavelength of the incident light in free space, $\Lambda$ is the grating period, and n is the refractive index of the recording medium. The Klein-Cook parameter $Q$ may divide light diffraction by gratings into three regimes. When a grating is characterized by Q<<1, light diffraction by the grating may be referred to as Raman-Nath diffraction, where multiple diffraction orders may occur for normal and/or oblique incident light. When a grating is characterized by Q>>1 (e.g., Q≥10), light diffraction by the grating may be referred to as Bragg diffraction, where generally only the zeroth and the ±1 diffraction orders may occur for light incident on the grating at an angle satisfying the Bragg condition. When a grating is characterized by Q≈1, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., $\Delta n \leqslant 0.05$) and high spectral and angular selectivity, while surface-relief gratings may generally have large refractive index modulations (e.g., $\Delta n \geqslant 0.5$) and wide spectral and angular bandwidths.

Figure 7A:
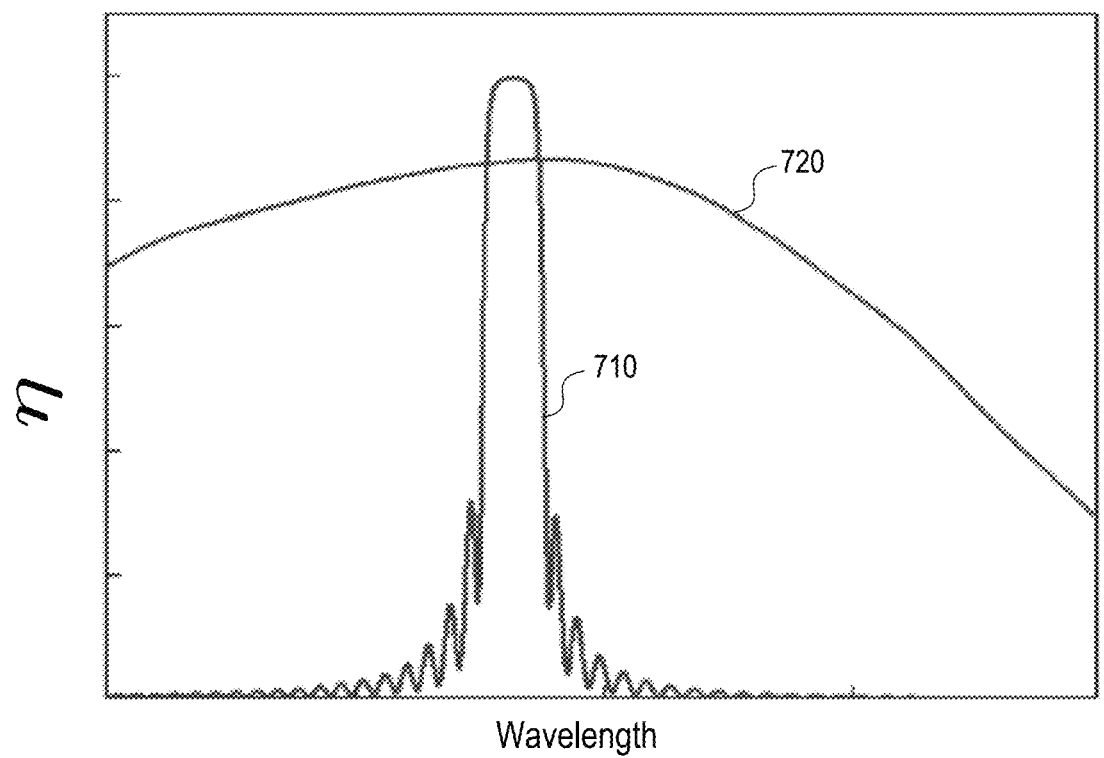
FIG. 7A illustrates the spectral bandwidth of an example of a reflective volume Bragg grating (VBG) and the spectral bandwidth of an example of a transmissive surface-relief grating (SRG).

FIG. 7A illustrates the spectral bandwidth of an example of a volume Bragg grating (e.g., a reflective VBG) and the spectral bandwidth of an example of a surface-relief grating (e.g., a transmissive SRG). The horizontal axis represents the wavelength of the incident visible light and the vertical axis corresponds to the diffraction efficiency. As shown by a curve 710, the diffraction efficiency of the reflective VBG is high in a narrow wavelength range, such as green light. In contrast, the diffraction efficiency of the transmissive SRG may be high in a very wide wavelength range, such as from blue to red light, as shown by a curve 720.

Figure 7B:
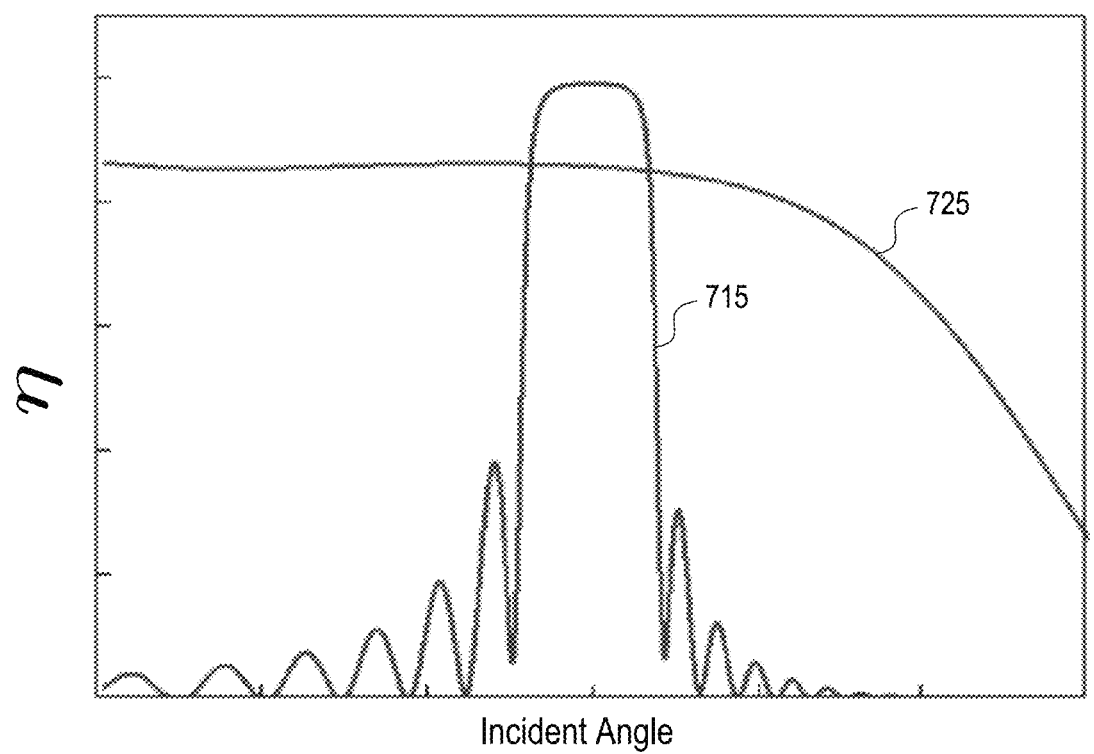
FIG. 7B illustrates the angular bandwidth of an example of a reflective VBG and the angular bandwidth of an example of a transmissive SRG.

FIG. 7B illustrates the angular bandwidth of an example of a volume Bragg grating (e.g., a reflective VBG) and the angular bandwidth of an example of a surface-relief grating (e.g., a transmissive SRG). The horizontal axis represents the incident angle of the visible light incident on the grating, and the vertical axis corresponds to the diffraction efficiency. As shown by a curve 715, the diffraction efficiency of the reflective VBG is high for light incident on the grating from a narrow angular range, such as about ±2.5° from the perfect Bragg condition. In contrast, the diffraction efficiency of the transmissive SRG is high in a very wide angular range, such as greater than about ±10° or wider, as shown by a curve 725.

FIG. 8A illustrates an example of an optical see-through augmented reality system including a waveguide display 800 and surface-relief gratings for exit pupil expansion according to certain embodiments. Waveguide display 800 may include a substrate 810 (e.g., a waveguide), which may be similar to substrate 520. Substrate 810 may be transparent to visible light and may include, for example, a glass, quartz, plastic, polymer, PMMA, ceramic, $Si_3N_4$, or crystal substrate. Substrate 810 may be a flat substrate or a curved substrate. Substrate 810 may include a first surface 812 and a second surface 814. Display light may be coupled into substrate 810 by an input coupler 820, and may be reflected by first surface 812 and second surface 814 through total internal reflection, such that the display light may propagate within substrate 810. Input coupler 820 may include a grating, a refractive coupler (e.g., a wedge or a prism), or a reflective coupler (e.g., a reflective surface having a slant angle with respect to substrate 810). For example, in one embodiment, input coupler 820 may include a prism that may couple display light of different colors into substrate 810 at a same refraction angle. In another example, input coupler 820 may include a grating coupler that may diffract light of different colors into substrate 810 at different directions. Input coupler 820 may have a coupling efficiency of greater than 10%, 20%, 30%, 50%, 75%, 90%, or higher for visible light.

Waveguide display 800 may also include a first output grating 830 and a second output grating 840 positioned on one or two surfaces (e.g., first surface 812 and second surface 814) of substrate 810 for expanding incident display light beam in two dimensions in order to fill an eyebox with the display light. First output grating 830 may be configured to expand at least a portion of the display light beam along one direction, such as approximately in the x direction. Display light coupled into substrate 810 may propagate in a direction shown by a line 832. While the display light propagates within substrate 810 along a direction shown by line 832, a portion of the display light may be diffracted by a region of first output grating 830 towards second output grating 840 as shown by a line 834 each time the display light propagating within substrate 810 reaches first output grating 830. Second output grating 840 may then expand the display light from first output grating 830 in a different direction (e.g., approximately in the y direction) by diffracting a portion of the display light from an exit region 850 to the eyebox each time the display light propagating within substrate 810 reaches second output grating 840.

FIG. 8B illustrates an example of an eye box including two-dimensional replicated exit pupils. FIG. 8B shows that a single input pupil 805 may be replicated by first output grating 830 and second output grating 840 to form an aggregated exit pupil 860 that includes a two-dimensional array of individual exit pupils 862. For example, the exit pupil may be replicated in approximately the x direction by first output grating 830 and in approximately the y direction by second output grating 840. As described above, output light from individual exit pupils 862 and propagating in a same direction may be focused onto a same location in the retina of the user's eye. Thus, a single image may be formed by the user's eye from the output light in the two-dimensional array of individual exit pupils 862.

Figure 9:
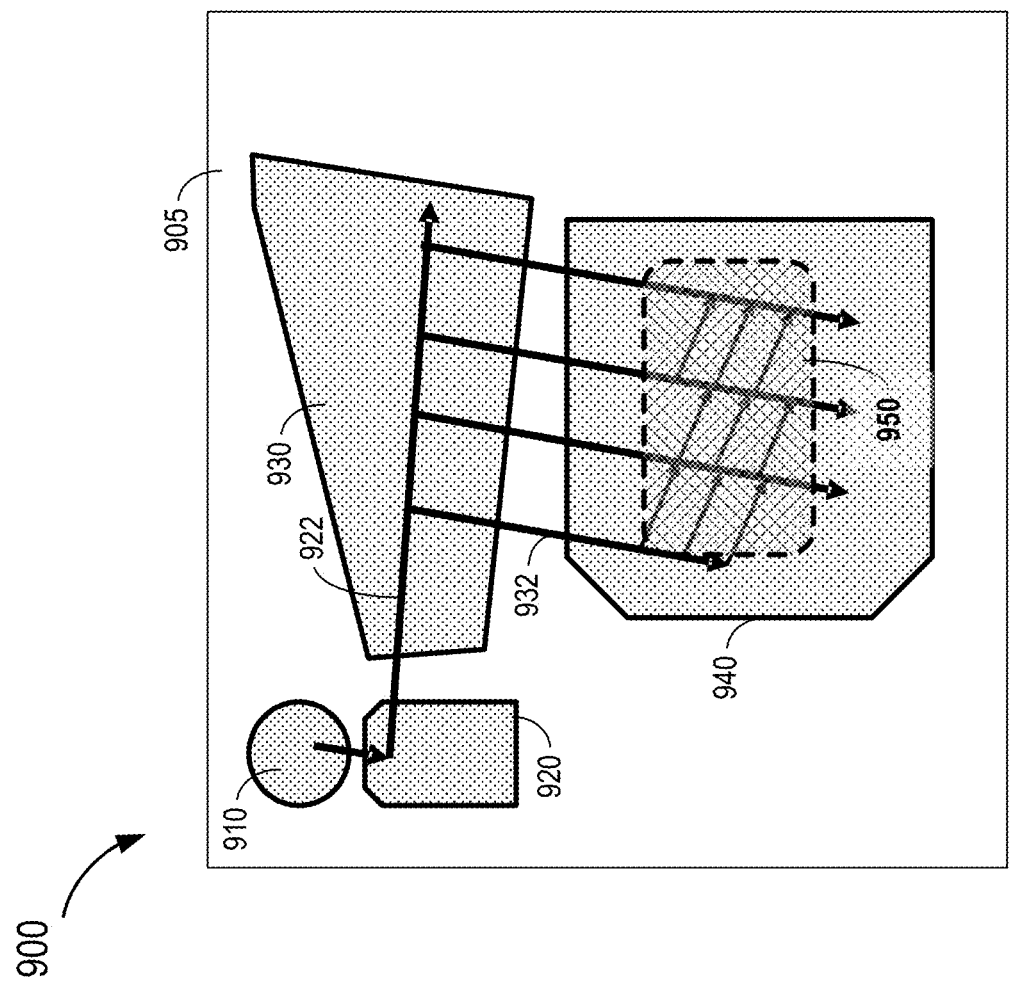
FIG. 9 illustrates an example of a waveguide display with grating couplers for exit pupil expansion according to certain embodiments.

FIG. 9 illustrates an example of a volume Bragg grating-based waveguide display 900 with exit pupil expansion and dispersion reduction according to certain embodiments. Waveguide display 900 may be an example of waveguide display 800 and may include a waveguide 905, and an input grating 910, a first middle grating 920, a second middle grating 930, and an output grating 940 formed on or in waveguide 905. Each of input grating 910, first middle grating 920, second middle grating 930, and output grating 940 may be a transmissive grating or a reflective grating. Display light from a light source (e.g., one or more micro-LED arrays) may be coupled into waveguide 905 by input grating 910. The in-coupled display light may be reflected by surfaces of waveguide 905 through total internal reflection, such that the display light may propagate within waveguide 905. Input grating 910 may include multiplexed VBGs and may couple display light of different colors and from different fields of view into waveguide 905 at corresponding diffraction angles.

First middle grating 920 and second middle grating 930 may be in different regions of a same holographic material layer or may be on different holographic material layers. In some embodiments, first middle grating 920 may be spatially separate from second middle grating 930. First middle grating 920 and second middle grating 930 may each include multiplexed VBGs. In some embodiments, first middle grating 920 and second middle grating 930 may be recorded in a same number of exposures and under similar recording conditions, such that each VBG in first middle grating 920 may match a respective VBG in second middle grating 930 (e.g., having the same grating vector in the x-y plane and having the same and/or opposite grating vectors in the z direction). For example, in some embodiments, a VBG in first middle grating 920 and a corresponding VBG in second middle grating 930 may have the same grating period and the same grating slant angle (and thus the same grating vector), and the same thickness. In one example, first middle grating 920 and second middle grating 930 may have a thickness about 20 μm and may each include about 20 or more VBGs recorded through about 20 or more exposures.

Output grating 940 may be formed in the see-through region of waveguide display 900 and may include an exit region 950 that overlaps with the eyebox of waveguide display 900 when viewed in the z direction (e.g., at a distance about 18 mm from output grating 940 in +z or −z direction). Output grating 940 may include multiplexed VBG gratings that include many VBGs. In some embodiments, output grating 940 and second middle grating 930 may at least partially overlap in the x-y plane, thereby reducing the form factor of waveguide display 900. Output grating 940, in combination with first middle grating 920 and second middle grating 930, may perform the dual-axis pupil expansion described above to expand the incident display light beam in two dimensions to fill the eyebox with the display light.

Input grating 910 may couple the display light from the light source into waveguide 905. The display light may reach first middle grating 920 directly or may be reflected by surfaces of waveguide 905 to first middle grating 920, where the size of the display light beam may be slightly larger than the size of the display light beam at input grating 910. Each VBG in first middle grating 920 may diffract a portion of the display light within a FOV range and a wavelength range that approximately satisfies the Bragg condition of the VBG to second middle grating 930. While the display light diffracted by a VBG in first middle grating 920 propagates within waveguide 905 (e.g., along a direction shown by a line 922) through total internal reflection, a portion of the display light may be diffracted by the corresponding VBG in second middle grating 930 towards output grating 940 each time the display light propagating within waveguide 905 reaches second middle grating 930. Output grating 940 may then expand the display light from second middle grating 930 in a different direction by diffracting a portion of the display light to the eyebox each time the display light propagating within waveguide 905 reaches exit region 950 of output grating 940.

As described above, each VBG in first middle grating 920 may match a respective VBG in second middle grating 930 (e.g., having the same grating vector in the x-y plane and having the same and/or opposite grating vector in the z direction). The two matching VBGs may work under opposite Bragg conditions (e.g., +1 order diffraction versus −1 order diffraction) due to the opposite propagation directions of the display light at the two matching VBGs. For example, as shown in FIG. 9, the VBG in first middle grating 920 may change the propagation direction of the display light from a downward direction to a rightward direction, while the matching VBG in second middle grating 930 may change the propagation direction of the display light from a rightward direction to a downward direction. Thus, the dispersion caused by second middle grating 930 may be opposite to the dispersion caused by first middle grating 920, thereby reducing or minimizing the overall dispersion.

Similarly, each VBG in input grating 910 may match a respective VBG in output grating 940 (e.g., having the same grating vector in the x-y plane and having the same and/or opposite grating vector in the z direction). The two matching VBGs may also work under opposite Bragg conditions (e.g., +1 order diffraction versus −1 order diffraction) due to the opposite propagation directions of the display light (e.g., into and out of waveguide 905) at the two matching VBGs. Therefore, the dispersion caused by input grating 910 may be opposite to the dispersion caused by output grating 940, thereby reducing or minimizing the overall dispersion.

III. Staircase Structure

In the examples of waveguide displays described above, couplers implemented using diffractive optical elements may have limited coupling efficiencies due to, for example, less than 100% diffraction efficiency to the desired diffraction order, leakage, polarization dependence, angular dependence, wavelength dependence, and the like. In addition, due to the size of the input pupil and thus the size of the input coupler, the display light coupled into the waveguide by an input coupler may be reflected back to the input coupler and may be at least partially diffracted by the input coupler again to undesired directions and become leakage light.

Figure 10B:
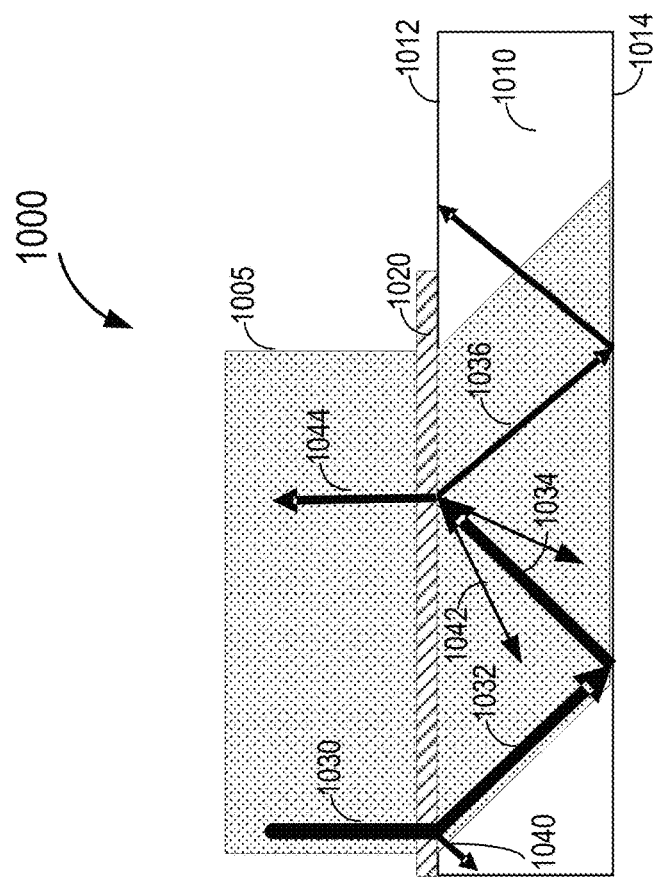
FIG. 10B illustrates examples of undesired light diffraction by an example of a grating coupler in a waveguide display.
Figure 10A:
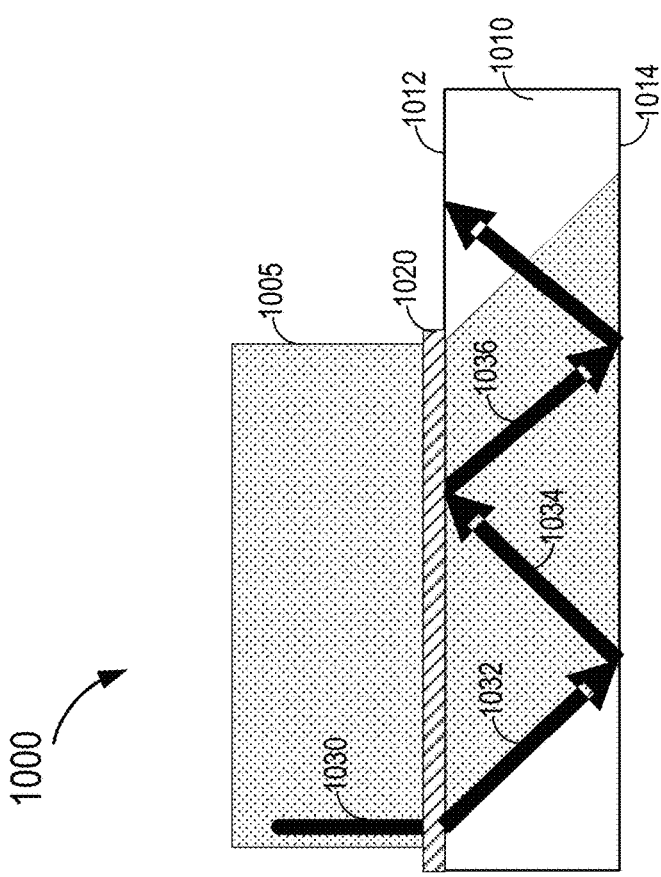
FIG. 10A illustrates an example of a grating coupler for coupling display light into a waveguide display.

FIG. 10A illustrates an example of a grating coupler 1020 for coupling display light into a waveguide 1010 of a waveguide display 1000. Grating coupler 1020 may have a finite area to receive an incident light beam 1005 having a finite beam width from a projector. FIG. 10A shows the desired optical path of an incident light beam 1030. Grating coupler 1020 on a top surface 1012 of waveguide 1010 may diffract incident light beam 1030 into a first diffraction order 1032 having a certain diffraction angle. First diffraction order 1032 may propagate in waveguide 1010 and reach a bottom surface 1014 of waveguide 1010. Bottom surface 1014 of waveguide 1010 may reflect all first diffraction order 1032 back towards grating coupler 1020 as shown by a light beam 1034 due to total internal reflection. It may be desirable that light beam 1034 is fully reflected at top surface 1012 of waveguide 1010 as shown by a light beam 1036, such that all first diffraction order 1032 coupled into waveguide 1010 by grating coupler 1020 may propagate within waveguide 1010 to reach an output coupler.

FIG. 10B illustrates examples of undesired light diffraction by grating coupler 1020 that may reduce the efficiency of waveguide display 1000. As illustrated, when incident light beam 1030 reaches grating coupler 1020, it may be diffracted by grating coupler 1020 into multiple diffraction orders including first diffraction order 1032 and other diffraction orders 1040 (e.g., zeroth order, −1$^{st}$ order, and higher orders). When the reflected light beam 1034 from the bottom surface 1014 reaches top surface 1012 of waveguide 1010, it may be at least partially diffracted by grating coupler 1020 into higher diffraction orders (e.g., ±1, ±2, and the like) as shown by light beams 1042 and 1044. Therefore, the power of the reflected portion (shown by light beam 1036) may be much lower than the power of incident light beam 1030 or first diffraction order 1032. For example, about 20% or more of the in-coupled light may be diffracted out of waveguide 1010 by grating coupler 1020, thereby reducing the overall in-coupling efficiency of grating coupler 1020.

Figure 11:
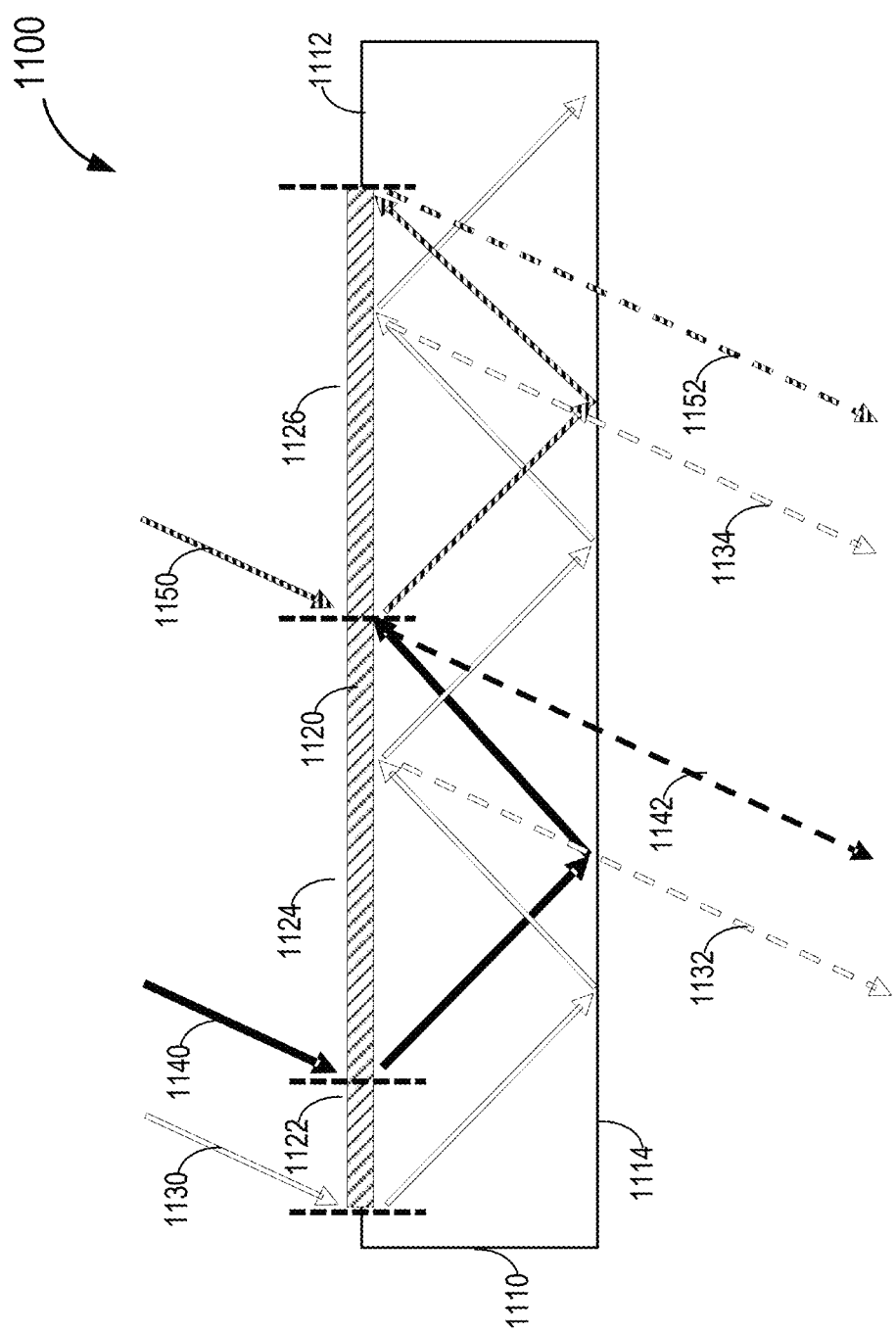
FIG. 11 illustrates an example of a grating coupler for coupling display light into a substrate of a waveguide display.

FIG. 11 illustrates an example of a grating coupler 1120 for coupling display light into a substrate 1110 of a waveguide display 1100. In the illustrated example, grating coupler 1120 may be formed on a top surface 1112 of substrate 1110. A light ray 1130 may be coupled by a first region 1122 of grating coupler 1120 into substrate 1110 at a certain diffraction angle. The in-coupled display light of light ray 1130 may be reflected by a bottom surface 1114 of substrate 1110 and reach grating coupler 1120 at the top surface 1112 of substrate 1110 again. A portion of the in-coupled display light of light ray 1130 may be reflected at the top surface 1112 to continue to propagate within substrate 1110. However, a portion 1132 of the in-coupled display light of light ray 1130 may be diffracted by a second region 1124 of grating coupler 1120 out of substrate 1110 to cause input coupling leakage. The reflected portion may propagate within substrate 1110 and reach a third region 1126 of grating coupler 1120, and may be at least partially diffracted out of substrate 1110 by third region 1126 of grating coupler 1120 as shown by a light ray 1134 to cause further input coupling leakage.

Similarly, a light ray 1140 (e.g., for a different field of view angle or color) may be coupled by grating coupler 1120 into substrate 1110 at a certain diffraction angle, and at least a portion 1142 of the in-coupled light of light ray 1140 may be diffracted out of substrate 1110 by grating coupler 1120 when the portion 1142 of the in-coupled light of light ray 1140 reaches grating coupler 1120 again due to the total internal reflection at the bottom surface 1114 of substrate 1110. An input light ray 1150 (e.g., for another field of view angle or color) may be coupled by grating coupler 1120 into substrate 1110 at a certain diffraction angle, and at least a portion 1152 of the in-coupled light of light ray 1150 may be diffracted out of substrate 1110 by grating coupler 1120 when the portion 1152 of the in-coupled light of light ray 1150 reaches grating coupler 1120 again due to the total internal reflection at the bottom surface 1114 of substrate 1110.

Therefore, the overall input coupling efficiency of grating coupler 1120 may be reduced due to the input coupling leakage. In some embodiments, the input coupling leakage may be reduced by, for example, increasing the thickness of substrate 1110 such that the in-coupled light, when reflected back to the top surface 1112, may be outside of the region of grating coupler 1120. In another example, the pupil size may be reduced such that grating coupler 1120 can have a smaller area and thus the in-coupled light, when reflected back to the top surface 1112, may be outside of the region of grating coupler 1120. However, increasing the thickness of the substrate and/or reducing the pupil size may decrease the pupil density and/or reduce the display resolution.

According to certain embodiments, the first middle grating (e.g., first middle grating 920) may be place underneath the input grating (e.g., input grating 910 or grating coupler 1120), such that the in-coupled display light may be diffracted by the first middle grating before the in-coupled display light would reach the input grating again due to the total internal reflection at the surfaces of the waveguide. The in-coupled display light that is diffracted by the first middle grating may change the propagation direction within the waveguide and thus may not meet the Bragg condition of the input grating when it reaches the input grating again. Therefore, the in-coupled display light that is diffracted by the first middle grating may not be diffracted by the input grating even if it reaches the input grating again. In certain embodiments, a phase structure (e.g., a phase retarder) may alternatively or additionally be used to change the polarization state of the in-coupled display light, such that the out-coupling of the in-coupled display light by the input grating may be reduced due to the polarization dependence of the input grating.

FIG. 12A illustrates an example of a method of improving the in-coupling efficiency of a waveguide display according to certain embodiments. FIG. 12A shows a waveguide 1210, and an input grating 1220 and a first middle grating 1230 in waveguide 1210. Waveguide 1210 may include one or more substrates. Input grating 1220 and first middle grating 1230 may be formed on the one or more substrates. Input grating 1220 in the example shown in FIG. 12A may be a reflective VBG. In some embodiments, input grating 1220 may be a transmissive grating. As illustrated in FIG. 12A, input grating 1220 may overlap with first middle grating 1230 when viewed in the z direction. In-coupled display light from input grating 1220 may be diffracted by first middle grating 1230, and thus may change the propagation direction within the waveguide. As a result, the in-coupled display light diffracted by first middle grating 1230 may not meet the Bragg condition of input grating 1220 when it reaches input grating 1220 again. Therefore, the in-coupled display light that is diffracted by first middle grating 1230 may not be diffracted by input grating 1220 out of waveguide 1210 to cause input coupling leakage. The overlapping of input grating 1220 and first middle grating 1230 may also help to reduce the size of the waveguide display. In one example, input grating 1220 and first middle grating 1230 may be recorded in a same holographic material layer.

FIG. 12B is a top view of an example of a waveguide display 1200 including grating couplers arranged to improve the in-coupling efficiency according to certain embodiments. Waveguide display 1200 may include waveguide 1210 (e.g., a substrate), input grating 1220, and first middle grating 1230 as described above with respect to FIG. 12A. As illustrated, input grating 1220 may overlap with a portion of first middle grating 1230 in the top view. As described above with respect to, for example, FIG. 9, waveguide display 1200 may also include a second middle grating 1240 and an output grating 1250 that may expand the input pupil in two directions.

Input grating 1220 may couple the display light from a light source (e.g., a projector) into waveguide 1210. The display light may reach first middle grating 1230 directly or may be reflected by surfaces of waveguide 1210 to first middle grating 1230. First middle grating 1230 may change the propagation direction of the in-coupled display light by diffracting the in-coupled display light towards second middle grating 1240. The display light diffracted by first middle grating 1230, even if reaching input grating 1220 again, would not be diffracted by input grating 1220 out of waveguide 1210 to cause leakage.

As described above with respect to FIGS. 8A and 9, while the display light diffracted by first middle grating 1230 propagates within waveguide 1210 through total internal reflection, a portion of the display light may be diffracted by second middle grating 1240 towards output grating 1250 each time the display light propagating within waveguide 1210 reaches second middle grating 1240. Output grating 1250 may then expand the display light from second middle grating 1240 in a different direction by diffracting a portion of the display light to an eyebox of waveguide display 1200 each time the display light propagating within waveguide 1210 reaches an exit region 1260 of output grating 1250 that may overlap with the eyebox when viewed in the z direction.

FIG. 12C is a zoom-in top view of a portion of waveguide display 1200 shown in FIG. 12B according to certain embodiments. FIG. 12D is a zoom-in side view of the portion of waveguide display 1200 shown in FIG. 12B according to certain embodiments. FIGS. 12C and 12D shows input grating 1220 and first middle grating 1230 in waveguide 1210. FIG. 12C shows that input grating 1220 overlaps with a portion of first middle grating 1230 when reviewed in the z direction. First middle grating 1230 may include multiple VBGs 1232 that may be used to diffract light from different fields of view and/or in different colors. FIG. 12D shows that input grating 1220 and first middle grating 1230 may be recorded in a same holographic material layer and may be multiplexed in a same region of the holographic material layer.

As described above, overlapping input grating 1220 and first middle grating 1230 may help to reduce the physical dimension of waveguide display 1200. However, due to the limited maximum achievable refractive index modulation in a holographic material layer, multiplexing input grating 1220 and first middle grating 1230 in a same holographic material layer as shown in FIG. 12D may not achieve a high diffraction efficiency for input grating 1220 and first middle grating 1230. In addition, it can be challenging to fabricate input grating 1220 and first middle grating 1230 in a same holographic material layer.

According to certain embodiments, the first middle grating (e.g., first middle grating 1230) may be fabricated in a holographic material layer within a waveguide as shown in FIG. 12A, the input grating (e.g., input grating 1220) may be fabricated in a different holographic material layer in a staircase structure that has a small size to avoid changing the thickness in other regions of the waveguide. Separately recording the input grating and the first middle grating in different holographic material layers may make the manufacturing process easier, and may help to improve the diffraction efficiency of the input grating and the first middle grating due to the higher overall achievable refractive index modulation in multiple holographic material layers. The staircase structure including the input grating may then be attached to the waveguide and aligned with the first middle grating. To avoid FOV clipping, the total thickness and the overall shape of the staircase structure that includes the holographic material layer in which the input grating is recorded and the staircase substrate (if needed) on which the holographic material layer is attached may be optimized. In some embodiments, the thickness of the holographic material layer may be sufficiently high and thus the staircase substrate may not be used. In some embodiments, a staircase substrate (e.g., a thin glass plate) with a certain shape and thickness may be used such that the total thickness of the holographic material layer and the staircase substrate may be equal to the desired thickness of the staircase structure.

FIG. 13A is a top view of an input section of an example of a waveguide display 1300 including an input grating 1322 in a staircase structure 1330 for improving the in-coupling efficiency according to certain embodiments. FIG. 13B is a side view of the example of waveguide display 1300 shown in FIG. 13A according to certain embodiments. In the illustrated example, the input section of waveguide display 1300 may include a waveguide 1310, which may include two or more substrates. First middle grating 1340 may be formed on a surface of one of the two or more substrates and may be sandwiched by two substrates. As described above, first middle grating 1340 may include multiple VBGs for different fields of views.

Staircase structure 1330 may be attached to a top surface of waveguide 1310. As illustrated by FIG. 13B, input grating 1322 may be formed in a holographic material layer 1320 on the top or bottom surface of a staircase substrate 1332 of staircase structure 1330. Input grating 1322 may generally have a circular shape or rectangular shape that matches the shape of the output image of the light source (e.g., a micro-LED array) or a projector. In some embodiments, input grating 1322 may be recorded in holographic material layer 1320 formed (e.g., coated or laminated) on another substrate, and then transferred to staircase substrate 1332 to form staircase structure 1330, which may then be aligned and bonded to waveguide 1310. In some embodiments, holographic material layer 1320 may be coated or laminated on staircase substrate 1332, and may then then be recorded before or after bonding staircase structure 1330 to waveguide 1310.

As shown in FIGS. 13A and 13B, staircase structure 1330 may be flat and may have a certain shape in the x-y plane. Staircase structure 1330 (including input grating 1322 and staircase substrate 1332, if used) may have a certain total thickness. Because the non-zero thickness of staircase structure 1330, the shape of staircase structure 1330 may need to be optimized to avoid pupil clipping and the resultant efficiency reduction.

FIG. 13C illustrates an example of pupil clipping in a waveguide display having a prism 1304 as the input coupler. As shown in FIG. 13C, prism 1304 may couple display light from a projector 1302 (or another light source, such as a micro-LED array) into a waveguide 1306. Due to the physical size of prism 1304, light from certain fields of view may be clipped as shown by the dashed lines and thus may not be coupled into waveguide 1306. In waveguide display 1300 shown in FIGS. 13A and 13B, light from certain fields of view that is diffracted by input grating 1322 may also be clipped if the thickness and the shape of staircase structure 1330 are not appropriately selected.

FIG. 13D includes a perspective view of an example of staircase structure 1330 according to certain embodiments. Holographic material layer 1320 may include input grating 1322 recorded therein. Holographic material layer 1320 may be cut according to the desired shape of staircase structure 1330. Staircase substrate 1332 may also be cut from a substrate (e.g., a glass substrate with a thickness about 100 µm or thicker) according to the desired shape of staircase structure 1330. In the illustrated example, holographic material layer 1320 may be attached to the top surface of staircase substrate 1332. In another example, holographic material layer 1320 may be attached to the bottom surface of staircase substrate 1332. Staircase structure 1330 may then be attached (e.g., bonded) to waveguide 1310. If input grating 1322 has not been recorded in holographic material layer 1320 before holographic material layer 1320 is attached to staircase substrate 1332 to form staircase structure 1330, a recording process may be performed before or after staircase structure 1330 is attached to waveguide 1310 to form input grating 1322 in holographic material layer 1320.

To optimize the input coupling efficiency and minimize pupil clipping for all FOVs of waveguide display 1300, the thickness and/or shape of staircase structure 1330 may be tuned, which may depend on whether input grating 1322 is on the top of staircase structure 1330 or the bottom of staircase structure 1330. As described above, thickness of staircase substrate 1332 may depend on the thickness of holography material layer 1320 in which input grating 1322 is recorded. In some embodiments, one or more holographic material layers 1320 may be used to achieve the desired thickness of staircase structure 1330, and thus staircase substrate 1332 may not be used. For example, in some implementations, if the desired thickness of staircase structure 1330 is 80 µm, four holographic material layers 1320 each having a thickness about 20 µm may be used (if the overall haziness is sufficiently low) and no additional staircase substrate 1332 may be needed. The spatial multiplexing of VBGs in first middle grating 1340, such as the number of VBGs, the FOV covered by each VBG, and the refractive index modulation and the physical dimension of each VBG, may also be optimized.

Figure 14:
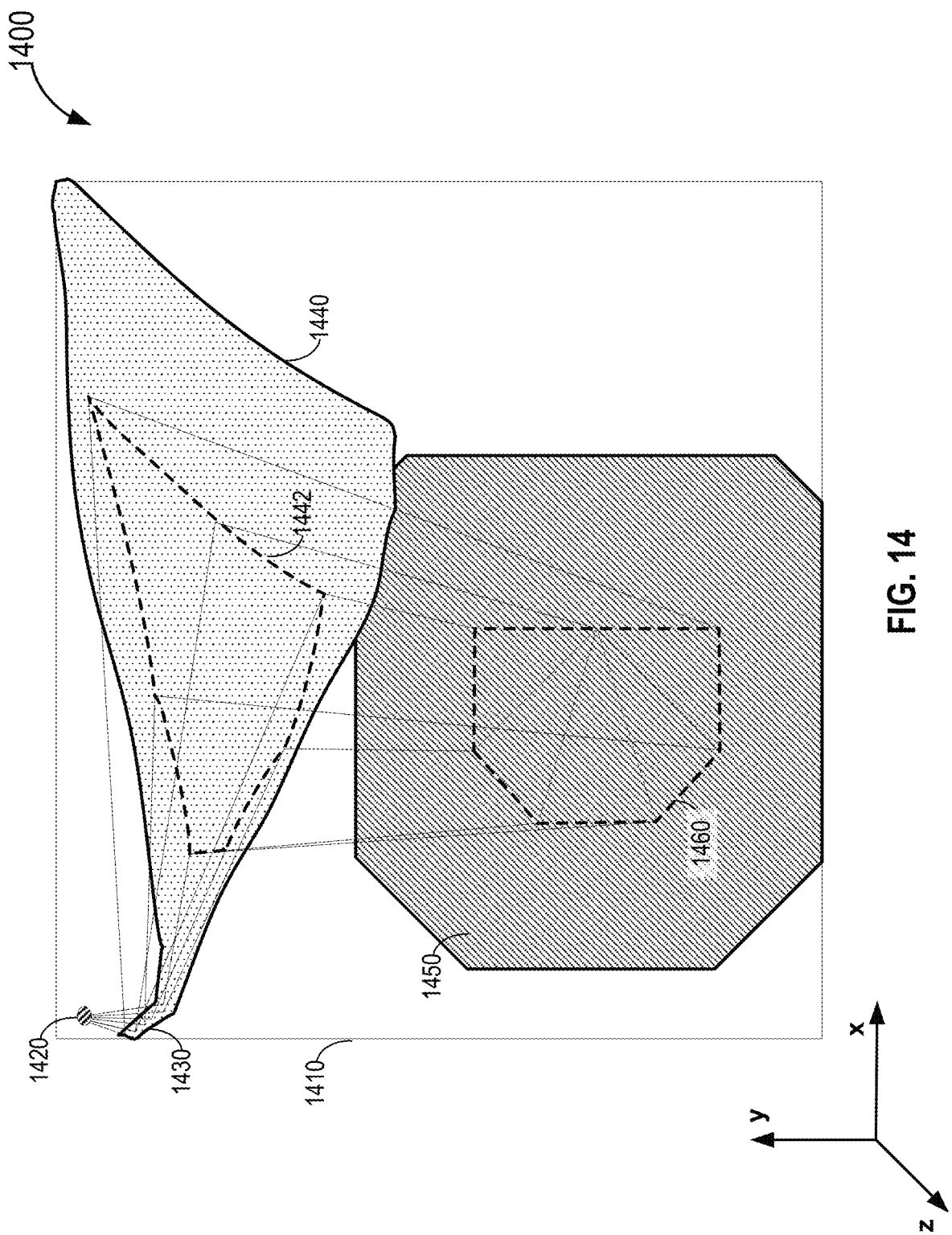
FIG. 14 illustrates an example of a volume Bragg grating-based waveguide display including a first set of gratings for a first FOV according to certain embodiments.

FIG. 14 illustrates an example of a VBG-based waveguide display 1400 used as a baseline for comparing with waveguide displays having the staircase structures disclosed herein. As described above, VBG-based waveguide display 1400 may include one or more substrates 1410. VBG-based waveguide display 1400 may be an example of a waveguide display that includes a single image projector and two or more sets of gratings for two or more FOVs. Only the first set of gratings (e.g., for the left-half FOV) is shown in FIG. 14. The first set of gratings may include an input grating 1420, a first middle grating 1430, a second middle grating 1440, and an output grating 1450 in one or more holographic material layers. Input grating 1420 may be on top of first middle grating 1430 and overlap with first middle grating 1430 as shown in, for example, FIGS. 12A-12D. VBG-based waveguide display 1400 may not include a staircase structure. The first set of gratings may include transmissive VBGs or reflective VBGs. In some embodiments, input grating 1420 and output grating 1450 may have matching grating vectors (e.g., having the same grating vector in the x-y plane) and thus may compensate the dispersion of display light caused by each other.

As described above, the display light from a projector may be coupled into a substrate 1410 by input grating 1420, and may propagate within substrate 1410 and reach first middle grating 1430. First middle grating 1430 may diffract the display light towards second middle grating 1440. Second middle grating 1440 may diffract the display light towards output grating 1450 at multiple locations along substantially the x direction to replicate the exit pupil in substantially the x direction. Output grating 1450 may diffract the display light from each of the multiple locations of second middle grating 1440 out of substrate 1410 at multiple locations along substantially the y direction, such that the exit pupil may be replicated in substantially the y direction. On output grating 1450, an exit region 1460 corresponds to the region where display light for the left-half FOV at one pupil location in the eyebox (e.g., at the center the eyebox) may be coupled out of output grating 1450. A region 1442 in second middle grating 1440 represents the region of second middle grating 1440 that maps to exit region 1460.

The performance of VBG-based waveguide display 1400, such as the minimum in-coupling efficiency for the entire field of view and the average in-coupling efficiency for the entire field of view, is compared with waveguide displays having the staircase structures disclosed herein to show the efficacy of the input grating on the staircase structure disclosed herein. The waveguide displays having the staircase structures may include an input grating on the top or bottom of the staircase structure as shown in, for example, FIG. 13B.

Figure 15:
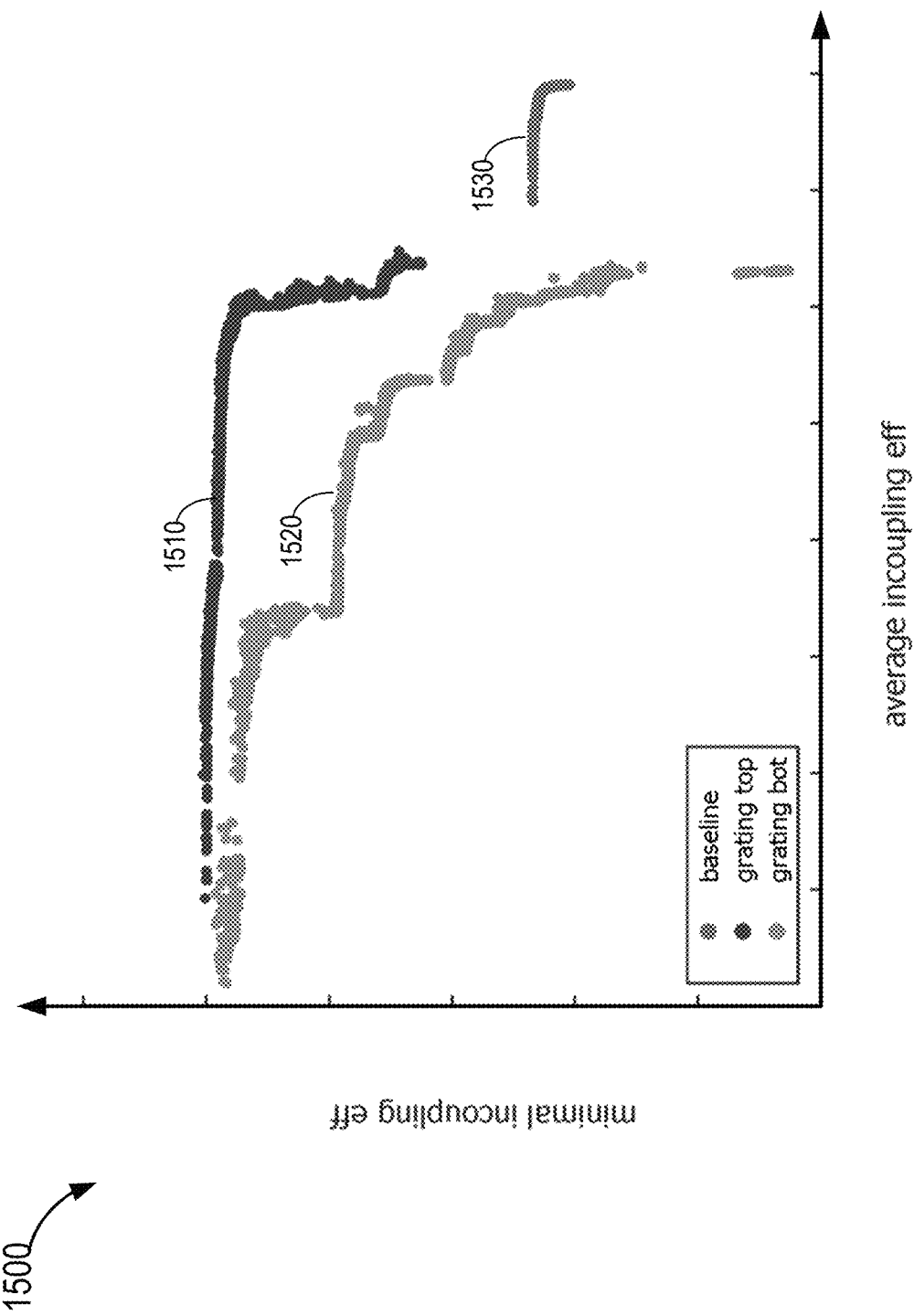
FIG. 15 illustrates optimization results for examples of waveguide displays including an input grating in a staircase structure according to certain embodiments.

FIG. 15 includes a chart 1500 illustrating optimization results for examples of waveguide displays including an input grating in a staircase structure according to certain embodiments. The horizontal axis of chart 1500 corresponds to the average in-coupling efficiency for an entire FOV, while the vertical axis corresponds to the minimum in-coupling efficiency for the entire FOV. Each individual data point in chart 1500 corresponds to a waveguide display with a unique combination of structure (e.g., without or with a staircase structure or with a staircase structure at a different respective location), staircase thickness, and staircase shape. Data points 1530 in FIG. 15 show the simulation results for VBG-based waveguide display 1400, where it is assumed that the input grating and the first middle grating may each use the total achievable refractive index modulation (Δn) of a holographic material layer (which may not be achieved in reality). Data points 1510 in FIG. 15 show the simulation results for VBG-based waveguide displays including an input grating on the top surface of a staircase substrate and having different staircase shapes and/or staircase thicknesses. Data points 1520 in FIG. 15 show the simulation results for VBG-based waveguide displays including an input grating on the bottom surface of a staircase substrate and having different staircase shapes and/or staircase thicknesses.

Data points 1530 in FIG. 15 show that the average in-coupling efficiency of VBG-based waveguide display 1400 may be slightly higher, but the minimum in-coupling efficiency in the entire FOV is much lower. Data points 1510 show that, with the input grating on the top of a staircase structure as shown in FIGS. 13A-13B and 13D, the average in-coupling efficiency can be fairly high, such as close to the average in-coupling efficiency of VBG-based waveguide display 1400, and the minimum in-coupling efficiency can be much higher than the minimum in-coupling efficiency of VBG-based waveguide display 1400. Data points 1520 show that, with the input grating on the bottom surface of a staircase structure as shown in FIGS. 13A-13B, the average in-coupling efficiency can be fairly high too, and the minimum in-coupling efficiency can be higher than the minimum in-coupling efficiency of VBG-based waveguide display 1400.

Figure 16A:
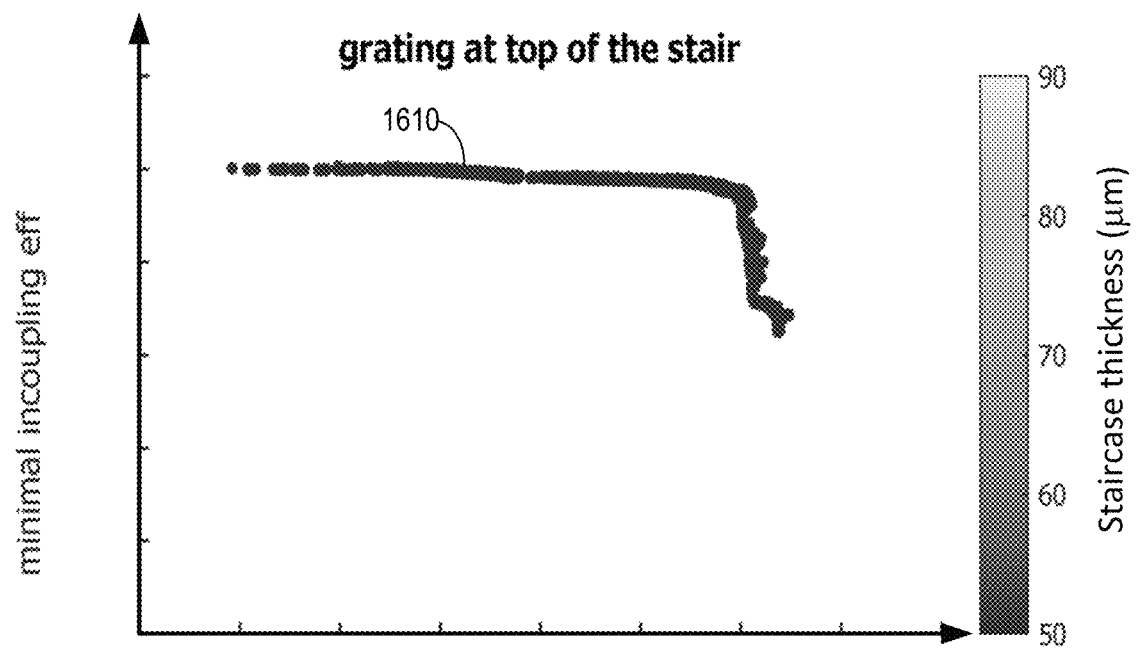
FIG. 16A illustrates staircase thickness optimization results for examples of waveguide displays including a grating coupler on the top of a staircase structure according to certain embodiments.

FIG. 16A illustrates staircase thickness optimization results for examples of waveguide displays including a grating coupler on top of a staircase structure according to certain embodiments. In the optimization, the thickness of the staircase structure (including the holographic material layer and the staircase substrate) is varied between 50 μm and 500 μm. A curve 1610 includes data points each showing the average in-coupling efficiency for an entire field of view and the minimum in-coupling efficiency for the field of view for a staircase structure having a different respective thickness. As shown by the optimization results, for staircase structures with the input grating at the top, better in-coupling efficiencies can be achieved when the staircase structures are thinner, such as about 50 μm, where both the average in-coupling efficiency and the minimum in-coupling efficiency can be higher.

Figure 16B:
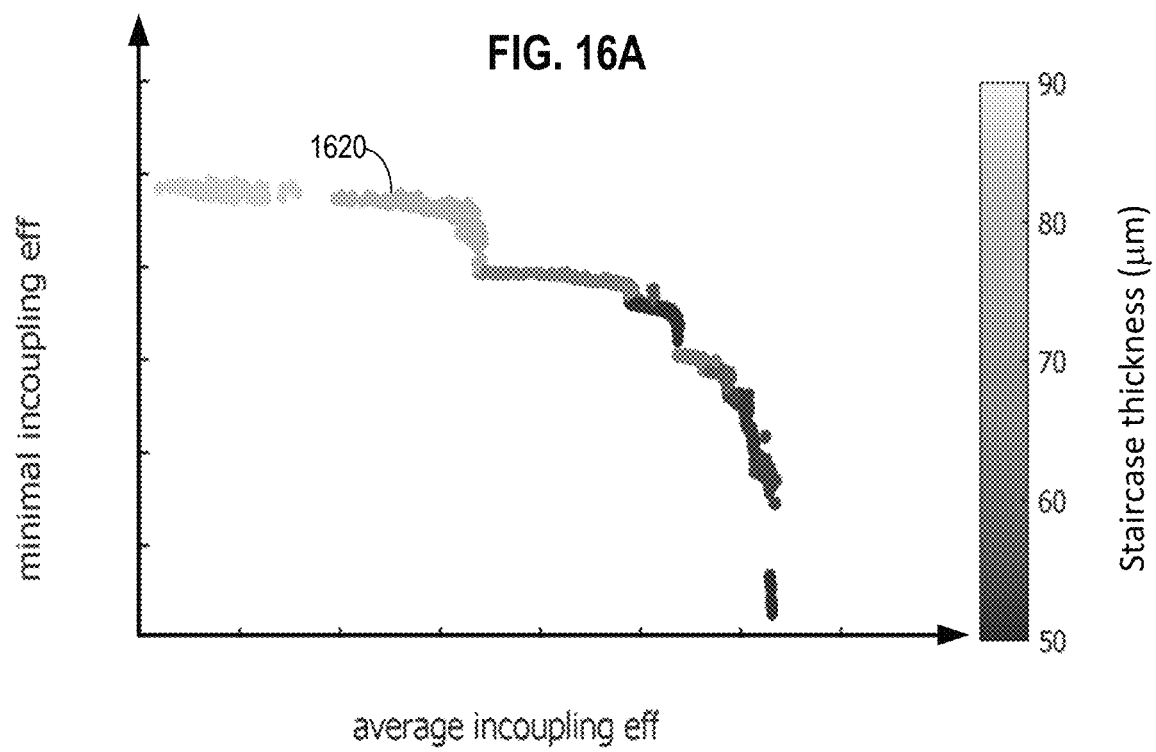
FIG. 16B illustrates staircase thickness optimization results for examples of waveguide displays including a grating coupler on the bottom of a staircase structure according to certain embodiments.

FIG. 16B illustrates staircase thickness optimization results for examples of waveguide displays including a grating coupler on the bottom of a staircase structure according to certain embodiments. In the optimization, the thickness of the staircase structure (including the holographic material layer and the staircase substrate) is varied between 50 μm and 500 μm. A curve 1620 includes data points each showing the average in-coupling efficiency for an entire field of view and the minimum in-coupling efficiency for the field of view for a staircase structure having a different respective thickness. As shown by the optimization results, for staircase structures with the input grating at the bottom, better average in-coupling efficiencies can be achieved when the staircase structures are thinner, such as close to 50 μm, while better minimum in-coupling efficiencies can be achieved when the staircase structures are relatively thicker, such as about 80 μm.

FIGS. 17A-17C illustrate staircase shape optimization results for examples of waveguide displays including a grating coupler on the top of a staircase structure according to certain embodiments. Each example of waveguide display shown in FIGS. 17A-17C corresponds to a data point 1510 in FIG. 15 and has a unique combination of staircase shape and stair thickness and a unique combination of average in-coupling efficiency and minimum in-coupling efficiency. FIG. 17A shows a portion of a waveguide display that includes a substrate 1710, a staircase structure 1730 that includes an input grating 1720 on a staircase substrate, and a first middle grating 1740 as described above. The thickness of staircase structure 1730 including input grating 1720 and the staircase substrate is about 50 μm. FIG. 17A shows the optimized shape of staircase structure 1730, which has a small size that may be slightly larger than the (circular) input grating 1720.

FIG. 17B shows a portion of a waveguide display that includes a substrate 1712, a staircase structure 1732 that includes an input grating 1722 on a staircase substrate, and a first middle grating 1742 as described above. The thickness of staircase structure 1732 including input grating 1722 and the staircase substrate is about 50 μm. FIG. 17B shows the optimized shape of staircase structure 1732, which has a small size that may be slightly larger than the (circular) input grating 1722. Staircase structure 1732 and staircase structure 1730 may have different shapes and/or thicknesses.

FIG. 17C shows a portion of a waveguide display that includes a substrate 1714, a staircase structure 1734 that includes an input grating 1724 on a staircase substrate, and a first middle grating 1744 as described above. The thickness of staircase structure 1734 including input grating 1724 and the staircase substrate is about 50 μm. FIG. 17C shows the optimized shape of staircase structure 1734, which has a small size that may be slightly larger than the (circular) input grating 1724. Staircase structure 1734 may have a shape (and/or thickness) different from the shapes (and/or thicknesses) of staircase structure 1730 and staircase structure 1732.

FIGS. 17D-17F illustrate staircase thickness optimization results for examples of waveguide displays including a grating coupler on the bottom of a staircase structure according to certain embodiments. Each example of waveguide display shown in FIGS. 17D-17F corresponds to a data point 1520 in FIG. 15 and has a unique combination of staircase shape and stair thickness and a unique combination of average in-coupling efficiency and minimum in-coupling efficiency. FIG. 17D shows a portion of a waveguide display that includes a substrate 1715, a staircase structure 1735 that includes an input grating 1725 under a staircase substrate, and a first middle grating 1745 as described above. The thickness of staircase structure 1735 including input grating 1725 and the staircase substrate is about 63 μm. FIG. 17D shows the optimized shape of staircase structure 1735.

FIG. 17E shows a portion of a waveguide display that includes a substrate 1716, a staircase structure 1736 that includes an input grating 1726 under a staircase substrate, and a first middle grating 1746 as described above. The thickness of staircase structure 1736 including input grating 1726 and the staircase substrate is about 56 μm. FIG. 17E shows the optimized shape of staircase structure 1736, which is larger than the (circular) input grating 1726 and has an edge that extends towards the right. Staircase structure 1736 and staircase structure 1735 may have different shapes and/or thicknesses.

FIG. 17F shows a portion of a waveguide display that includes a substrate 1718, a staircase structure 1738 that includes an input grating 1728 under a staircase substrate, and a first middle grating 1748 as described above. The thickness of staircase structure 1738 including input grating 1728 and the staircase substrate is about 81 μm. FIG. 17F shows that the optimized shape of staircase structure 1738, which is larger than the (circular) input grating 1728 and has an edge that extends towards the right.

IV. Multiple Color Projectors/Input Couplers

Figure 18:
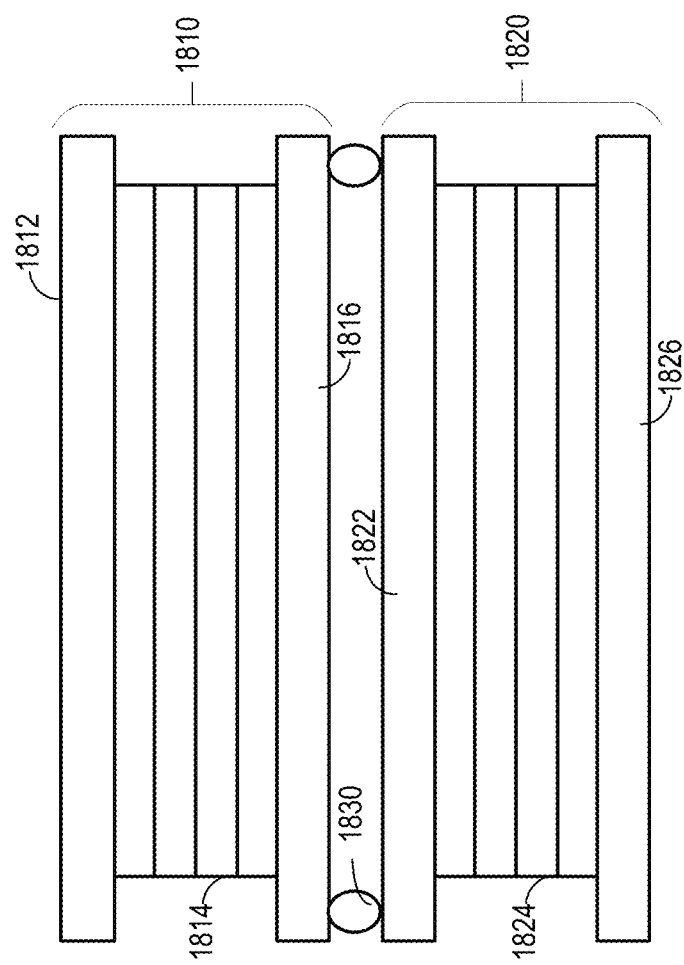
FIG. 18 illustrates an example of a waveguide display including volume Bragg grating couplers according to certain embodiments.

FIG. 18 illustrates an example of a waveguide display 1800 including volume Bragg grating couplers. In the illustrated example, waveguide display 1800 may include a first assembly 1810 and a second assembly 1820 that are separated by a spacer 1830. First assembly 1810 may include a first substrate 1812, a second substrate 1816, and one or more holographic grating layers 1814 between first substrate 1812 and second substrate 1816. First substrate 1812 and second substrate 1816 may each be a thin transparent substrate, such as a glass substrate having a thickness about 100 μm or few hundred micrometers. Holographic grating layers 1814 may include multiplexed reflective VBGs, transmissive VBGs, or both. Holographic grating layers 1814 may have a total thickness less than about 100 μm, such as between about 20 μm and about 80 μm. Similarly, second assembly 1820 may include a first substrate 1822, a second substrate 1826, and one or more holographic grating layers 1824 between first substrate 1822 and second substrate 1826. Holographic grating layers 1824 may include multiplexed reflective VBGs, transmissive VBGs, or both. First assembly 1810 may be used to couple display light in red, green, and blue colors from certain fields of view to user's eyes, and second assembly 1820 may be used to couple display light in red, green, and blue colors from other fields of view to user's eyes.

FIG. 19A is a front view of an example of a volume Bragg grating-based waveguide display 1900 according to certain embodiments. FIG. 19B is a side view of the example of volume Bragg grating-based waveguide display 1900 shown in FIG. 19A. Waveguide display 1900 may be an example of first assembly 1810 or second assembly 1820, or a part of first assembly 1810 or second assembly 1820. In the illustrated example, waveguide display 1900 may include a waveguide 1910, an input coupler, and a middle grating 1930 and an output grating 1940 in waveguide 1910. The input coupler may include projector optics 1920 (e.g., a lens) and an input grating 1922. Display light may be collimated by projector optics 1920 and projected onto input grating 1922, which may couple the display light into waveguide 1910 by diffraction as described above. The display light may reach a first portion 1932 of middle grating 1930 and may be diffracted by first portion 1932 of middle grating 1930 to change the propagation direction and reach a second portion 1934 of middle grating 1930, which may then diffract the display light towards output grating 1940. Output grating 1940 may diffract the display light out of waveguide 1910 at different locations to form multiple exit pupils as described above.

First portion 1932 and second portion 1934 of middle grating 1930 may be on a same holographic material layer and may have matching grating vectors (e.g., having a same grating vector in the x-y plane and a same grating vector and/or opposite grating vectors in the z direction). Therefore, they may compensate for the dispersion of display light caused by each other to reduce the overall dispersion, due to the opposite Bragg conditions (e.g., +1 order and −1 order diffractions) for the diffractions at first portion 1932 and second portion 1934 of middle grating 1930. In addition, input grating 1922 and output grating 1940 may have matching grating vectors (e.g., having the same grating vector in the x-y plane and having the same or opposite grating vectors in the z direction), where input grating 1922 may couple the display light into waveguide 1910, while output grating 1940 may couple the display light out of the waveguide. Therefore, input grating 1922 and output grating 1940 may compensate for the dispersion of display light caused by each other to reduce the overall dispersion, due to the opposite diffraction directions and opposite Bragg conditions (e.g., +1 order and −1 order diffractions) for the diffractions at input grating 1922 and output grating 1940. In this way, the dispersion by first portion 1932 and second portion 1934 of middle grating 1930 may be canceled out, and the dispersion by input grating 1922 and output grating 1940 may also be canceled out. Therefore, the overall dispersion of the display light by waveguide display 1900 can be minimized. As such, a higher resolution of the displayed image may be achieved.

Each of input grating 1922, first portion 1932 and second portion 1934 of middle grating 1930, and output grating 1940 may include multiplexed volume Bragg gratings configured to diffract display light of different colors and/or from different fields of view. Due to the limited wavelength range and/or angular range of each VBG grating as described above with respect to FIGS. 7A and 7B, different VBGs may need to be used to diffract different color components of the display light and/or display light from different fields of view. Thus, to cover a large field of view for all colors, many VBGs may be needed. However, the achievable total refractive index modulations of a holographic material layer may be limited. Therefore, limited number of VBGs may be recorded in the holographic material layer, and the overall diffraction efficiency of VBG-based waveguide display 1900 may be low and/or the field of view of VBG-based waveguide display 1900 may be small. As such, multiple holographic material layers may be needed to cover the entire fields of view for all colors.

Figure 20B:
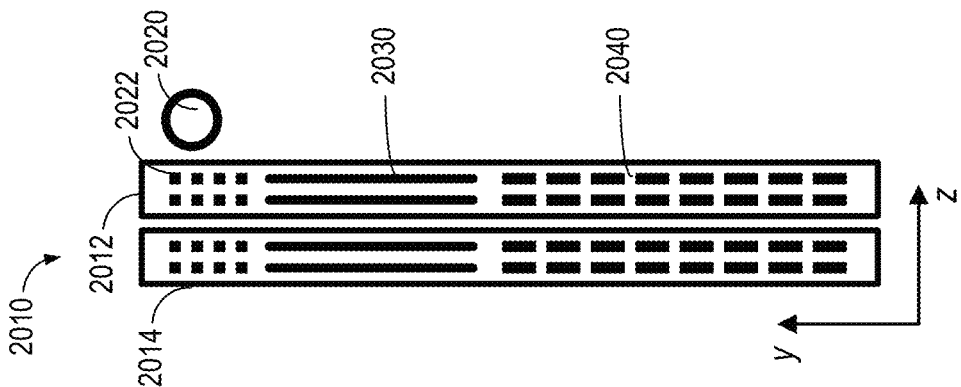
FIG. 20B is a side view of the example of the volume Bragg grating-based waveguide display shown in FIG. 20A according to certain embodiments.
Figure 20A:
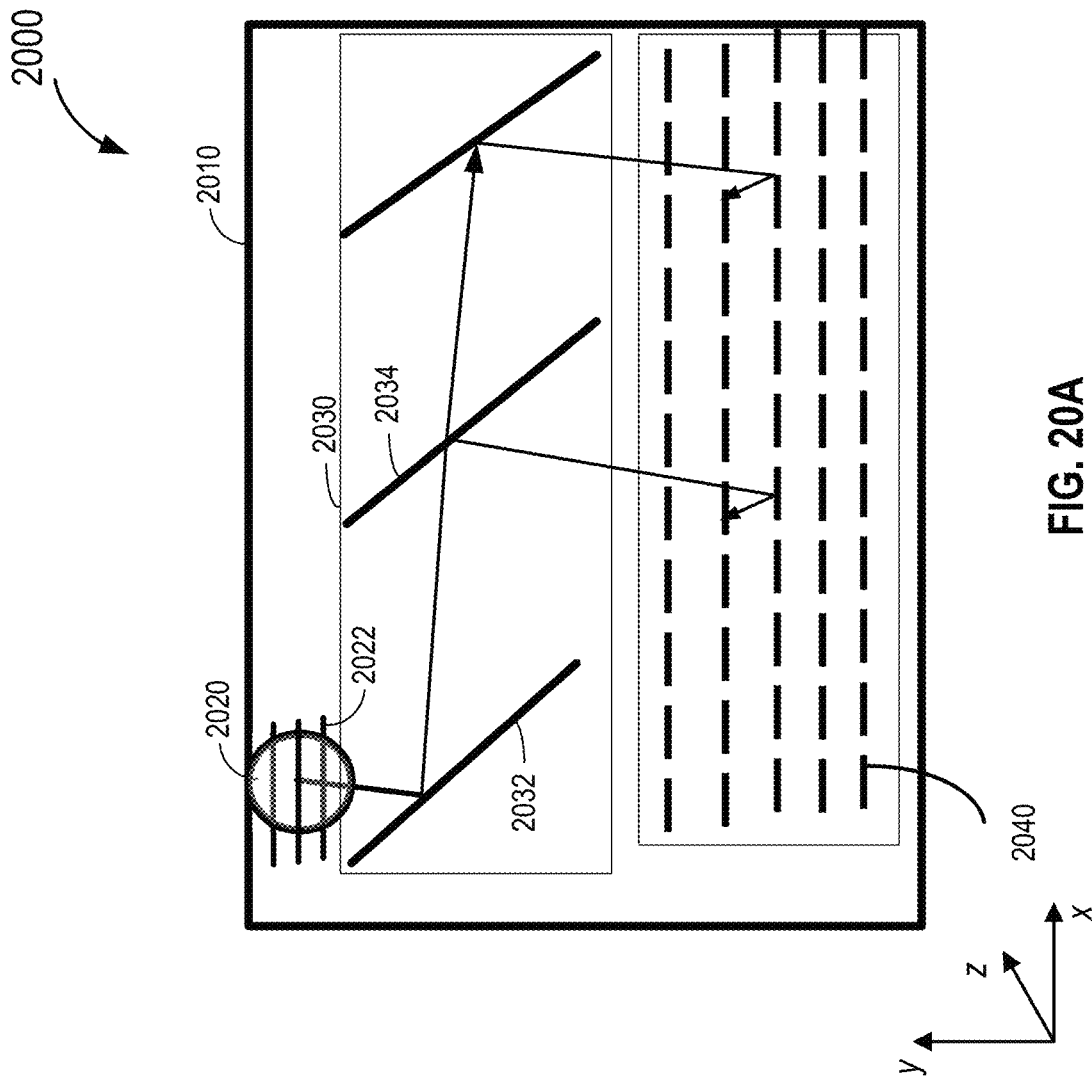
FIG. 20A is a front view of an example of a volume Bragg grating-based waveguide display including multiple polymer layers according to certain embodiments.

FIG. 20A is a front view of an example of a volume Bragg grating-based waveguide display 2000 according to certain embodiments. FIG. 20B is a side view of the example of volume Bragg grating-based waveguide display 2000 shown in FIG. 20A. Waveguide display 2000 may be an example of first assembly 1810, second assembly 1820, or waveguide display 1800. Waveguide display 2000 may include a waveguide 2010, an input coupler, and a middle grating 2030 and an output grating 2040 formed on or in waveguide 2010. The input coupler may include projector optics 2020 (e.g., a lens) and an input grating 2022. Display light may be collimated by projector optics 2020 and projected onto input grating 2022, which may couple the display light into waveguide 2010 by diffraction as described above. The display light may reach a first portion 2032 of middle grating 2030 and may be diffracted by first portion 2032 of middle grating 2030 to change the propagation direction and reach a second portion 2034 of middle grating 2030, which may diffract the display light towards output grating 2040. Output grating 2040 may diffract the display light out of waveguide 2010 at different locations to form multiple exit pupils as described above.

As described above, first portion 2032 and second portion 2034 of middle grating 2030 may have matching grating vectors (e.g., having a same grating vector in the x-y plane and a same grating vector and/or opposite grating vectors in the z direction). Input grating 2022 and output grating 2040 may have matching grating vectors (e.g., having the same grating vector in the x-y plane and having the same and/or opposite grating vectors in the z direction). Therefore, due to the opposite diffraction directions and opposite Bragg conditions (e.g., +1 order and −1 order diffractions), the overall dispersion by first portion 2032 and second portion 2034 of middle grating 2030 may be reduced or canceled out, and the overall dispersion by input grating 2022 and output grating 2040 may also be reduced or canceled out. Therefore, the overall dispersion of the display light by waveguide display 2000 can be minimized. As such, a higher resolution of the displayed image may be achieved.

As illustrated in FIG. 20B, waveguide display 2000 may include multiple polymer layers on one or more waveguide plates, where input grating 2022, middle grating 2030, and output grating 2040 may each be split into multiple gratings recorded in the multiple polymer layers. The gratings on each polymer layer may cover different respective FOVs and light spectra, and the combination of the multiple polymer layers may provide the full FOV and spectral coverage. In this way, each polymer layer can be thin (e.g., about 20 μlm to about 100 μm), and can be exposed for fewer times (e.g., less than about 100) to record fewer gratings to reduce haziness and increase the refractive index modulation for each VBG grating. Therefore, the diffraction efficiency of each VBG grating can be high for the covered FOV and spectrum, and the overall diffraction efficiency of waveguide display 2000 may be high for the entire FOV and spectrum due to the multiple polymer layers used. In the example shown in FIGS. 20A and 20B, waveguide display 2000 may include a first assembly 2012 that includes multiple polymer layers on one or more substrates, and a second assembly 2014 that includes multiple polymer layers on one or more substrates. Each polymer layer in first assembly 2012 and second assembly 2014 may include part of input grating 2022, middle grating 2030, and/or output grating 2040 for certain fields of view.

Figure 21A:
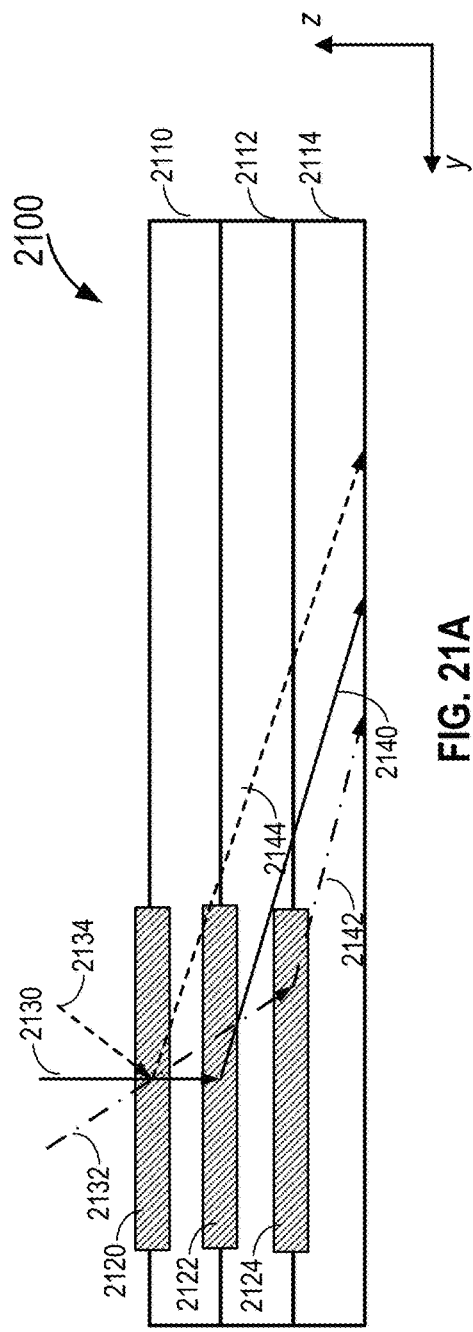
FIG. 21A illustrates an example of a volume Bragg grating-based waveguide display including multiple grating layers for different fields of view according to certain embodiments.

FIG. 21A illustrates an example of a volume Bragg grating-based waveguide display 2100 including multiple grating layers for different fields of view according to certain embodiments. VBG-based waveguide display 2100 may be an example of waveguide display 1800 or VBG-based waveguide display 2000 described above. In waveguide display 2100, gratings may be spatially multiplexed along the z direction. For example, waveguide display 2100 may include multiple substrates, such as substrates 2110, 2112, 2114, and the like. The substrates may include a same material or materials having similar refractive indexes. One or more VBGs (e.g., VBGs 2120, 2122, 2124, etc.) may be made on each substrate, such as recorded in a holographic material layer formed on the substrate. The VBGs may be reflective gratings or transmissive gratings. The substrates with the VBGs may be arranged in a substrate stack along the z direction for spatial multiplexing. Each VBG may be a multiplexed VBG that includes multiple gratings designed for different Bragg conditions to couple display light in different wavelength ranges and/or different FOVs into or out of the waveguide.

In the example shown in FIG. 21A, VBG 2120 may couple light 2134 from a positive field of view into the waveguide as shown by a light ray 2144 within the waveguide. VBG 2122 may couple light 2130 from around 0° field of view into the waveguide as shown by a light ray 2140 within the waveguide. VBG 2124 may couple light 2132 from a negative field of view into the waveguide as shown by a light ray 2142 within the waveguide. As described above, each of VBGs 2120, 2122, and 2124 may be a multiplexed VBG with many exposures, and thus may couple light from different FOV ranges into or out of the waveguide.

Figure 21B:
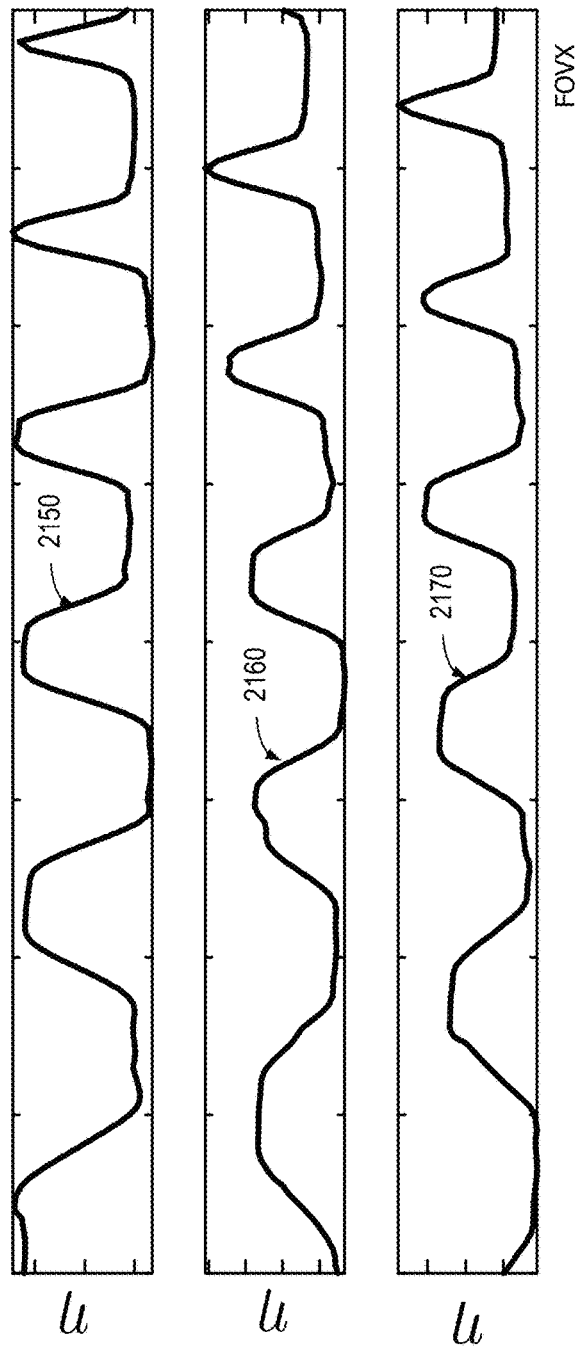
FIG. 21B illustrates the fields of view of multiple gratings in an example of a volume Bragg grating-based waveguide display according to certain embodiments.

FIG. 21B illustrates the fields of view of multiple gratings in an example of a volume Bragg grating-based waveguide display (e.g., waveguide display 2100) according to certain embodiments. In some embodiments, each of the gratings may be in a respective grating layer and/or on a respective waveguide plate. Each of the gratings may be a multiplexed grating including many exposures, and may be used to couple display light from multiple FOV ranges into or out of the waveguide at high efficiencies. For example, a curve 2150 shows the diffraction efficiency of a first VBG (e.g., VBG 2122 of FIG. 21A) for light from different fields of view. A curve 2160 shows the diffraction efficiency of a second VBG (e.g., VBG 2120 of FIG. 21A) for light from different fields of view. A curve 2170 shows the diffraction efficiency of a third VBG (e.g., VBG 2124 of FIG. 21A) for light from different fields of view. The first, second, and third VBGs arranged in a stack may more uniformly diffract light in the full field of view (e.g., from about −20° to about 20° at high efficiencies. The first VBG, the second VBG, and the third VBG may be used to couple display light of the same color or different colors. Different sets of VBGS may be used to cover the full field of view for display light of different colors.

Figure 22B:
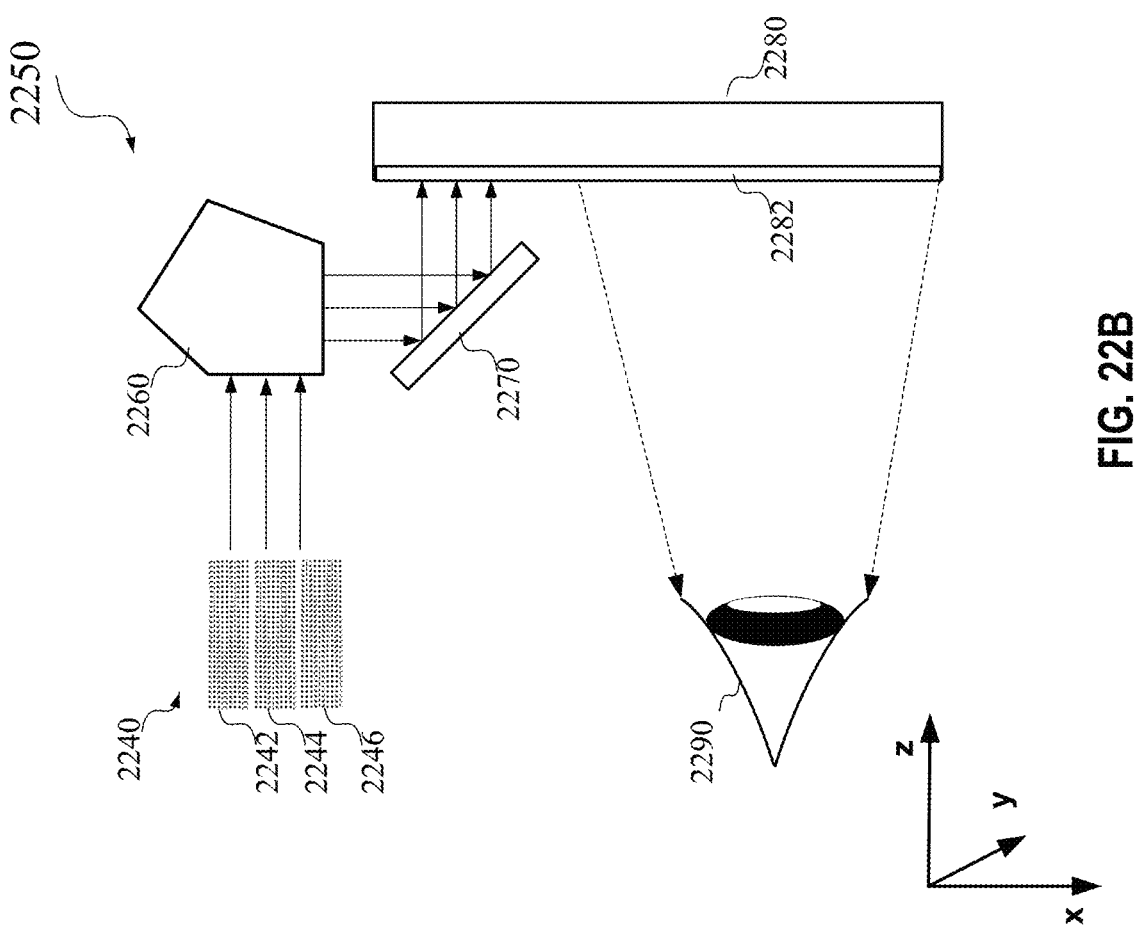
FIG. 22B illustrates another example of a near-eye display device including a waveguide display according to certain embodiments.
Figure 22A:
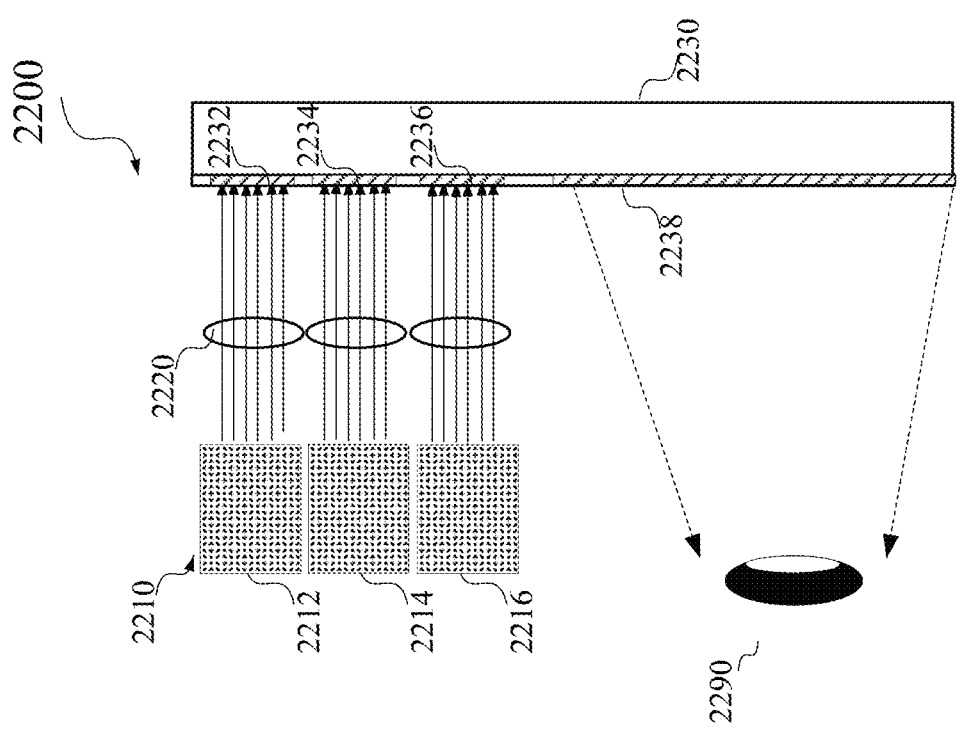
FIG. 22A illustrates an example of a near-eye display device including a waveguide display according to certain embodiments.

FIG. 22A illustrates an example of a near-eye display (NED) device 2200 including a waveguide display 2230 according to certain embodiments. NED device 2200 may be an example of near-eye display 120, augmented reality system 500, or another type of waveguide displays disclosed herein. NED device 2200 may include a light source 2210, projection optics 2220, and waveguide display 2230. Light source 2210 may include multiple panels of light emitters for different colors, such as a panel of red light emitters 2212, a panel of green light emitters 2214, and a panel of blue light emitters 2216. The red light emitters 2212 are organized into an array; the green light emitters 2214 are organized into an array; and the blue light emitters 2216 are organized into an array. The dimensions and pitches of light emitters in light source 2210 may be small. For example, each light emitter may have a diameter less than 2 μm (e.g., about 1.2 μm) and the pitch may be less than 3 μm (e.g., about 2 μm). As such, the number of light emitters in each of red light emitters 2212, green light emitters 2214, and blue light emitters 2216 can be equal to or greater than the number of pixels in a display image, such as 960×720, 1280×720, 1440×1080, 1920×1080, 2160×1080, or 2560× 1080 pixels. Thus, a display image may be generated simultaneously by light source 2210. A scanning element may not be needed in NED device 2200.

Before reaching waveguide display 2230, the light emitted by light source 2210 may be conditioned by projection optics 2220, which may include a lens array. Projection optics 2220 may collimate or focus the light emitted by light source 2210 to waveguide display 2230. Waveguide display 2230 may include three input couplers 2232, 2234, and 2236 for coupling the light emitted by red light emitters 2212, green light emitters 2214, and blue light emitters 2216, respectively, into waveguide display 2230. The light coupled into waveguide display 2230 may propagate within waveguide display 2230 through, for example, total internal reflection as described above. Gratings 2238 may expand the display light in two directions and couple portions of the light propagating within waveguide display 2230 out of waveguide display 2230 and towards user's eye 2290 as described above.

FIG. 22B illustrates another example of a near-eye display (NED) device 2250 including a waveguide display 2280 according to certain embodiments. In some embodiments, NED device 2250 may use a scanning mirror 2270 to project light from a light source 2240 to an image field where a user's eye 2290 may be located. NED device 2250 may be an example of near-eye display 120, augmented reality system 500, or another type of display devices. Light source 2240 may include one or more rows or one or more columns of light emitters of different colors, such as multiple rows of red light emitters 2242, multiple rows of green light emitters 2244, and multiple rows of blue light emitters 2246. For example, red light emitters 2242, green light emitters 2244, and blue light emitters 2246 may each include N rows, each row including, for example, 2560 light emitters (pixels). The red light emitters 2242 are organized into an array; the green light emitters 2244 are organized into an array; and the blue light emitters 2246 are organized into an array. In some embodiments, light source 2240 may include a single line of light emitters for each color. In some embodiments, light source 2240 may include multiple columns of light emitters for each of red, green, and blue colors, where each column may include, for example, 1080 light emitters. In some embodiments, the dimensions and/or pitches of the light emitters in light source 2240 may be relatively large (e.g., about 3-5 μm) and thus light source 2240 may not include sufficient light emitters for simultaneously generating a full display image. For example, the number of light emitters for a single color may be fewer than the number of pixels (e.g., 2560×1080 pixels) in a display image. The light emitted by light source 2240 may be a set of collimated or diverging beams of light.

Before reaching scanning mirror 2270, the light emitted by light source 2240 may be conditioned by various optical devices, such as collimating lenses or a freeform optical element 2260. Freeform optical element 2260 may include, for example, a multi-facet prism or another light folding element that may direct the light emitted by light source 2240 towards scanning mirror 2270, such as changing the propagation direction of the light emitted by light source 2240 by, for example, less than 90°, about 90°, or greater than 90°. In some embodiments, freeform optical element 2260 may be rotatable to scan the light. Scanning mirror 2270 and/or freeform optical element 2260 may reflect and project the light emitted by light source 2240 to waveguide display 2280, which may include gratings 2282 for coupling the light emitted by light source 2240 into waveguide display 2280. For example, gratings 2282 may include a respective input coupler for each color. The light coupled into waveguide display 2280 may propagate within waveguide display 2280 through, for example, total internal reflection as described above. Gratings 2282 may also expand the display light in two directions and couple portions of the light propagating within waveguide display 2280 out of waveguide display 2280 and towards user's eye 2290.

Scanning mirror 2270 may include a microelectromechanical system (MEMS) mirror or any other suitable mirrors. Scanning mirror 2270 may rotate to scan in one or two dimensions. As scanning mirror 2270 rotates, the light emitted by light source 2240 may be directed to a different area of waveguide display 2280 at a different angle such that a full display image may be projected onto waveguide display 2280 and directed to user's eye 2290 by waveguide display 2280 in each scanning cycle. For example, in embodiments where light source 2240 includes light emitters for all pixels in one or more rows or columns, scanning mirror 2270 may be rotated in the column or row direction (e.g., x or y direction) to scan an image. In embodiments where light source 2240 includes light emitters for some but not all pixels in one or more rows or columns, scanning mirror 2270 may be rotated in both the row and column directions (e.g., both x and y directions) to project a display image (e.g., using a raster-type scanning pattern).

NED device 2250 may operate in predefined display periods. A display period (e.g., display cycle) may refer to a duration of time in which a full image is scanned or projected. For example, a display period may be a reciprocal of the desired frame rate. In NED device 2250 that includes scanning mirror 2270, the display period may also be referred to as a scanning period or scanning cycle. The light generation by light source 2240 may be synchronized with the rotation of scanning mirror 2270. For example, each scanning cycle may include multiple scanning steps, where light source 2240 may generate a different light pattern in each respective scanning step. In each scanning cycle, as scanning mirror 2270 rotates, a display image may be projected onto waveguide display 2280 and user's eye 2290. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 2270 may revert back to the initial position to project light for the first few rows of the next display image or may rotate in a reverse direction or scan pattern to project light for the next display image, where a new set of driving signals may be fed to light source 2240. The same process may be repeated as scanning mirror 2270 rotates in each scanning cycle. As such, different images may be projected to user's eye 2290 in different scanning cycles.

Figure 23A:
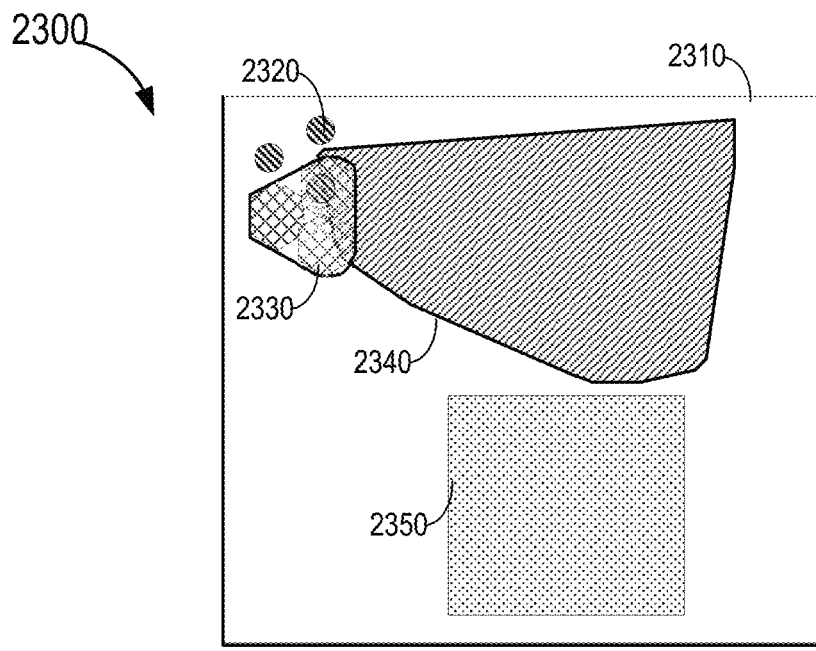
FIG. 23A illustrates the layout of a first set of gratings in an example of a waveguide display including three projectors for three different colors according to certain embodiments.
Figure 23B:
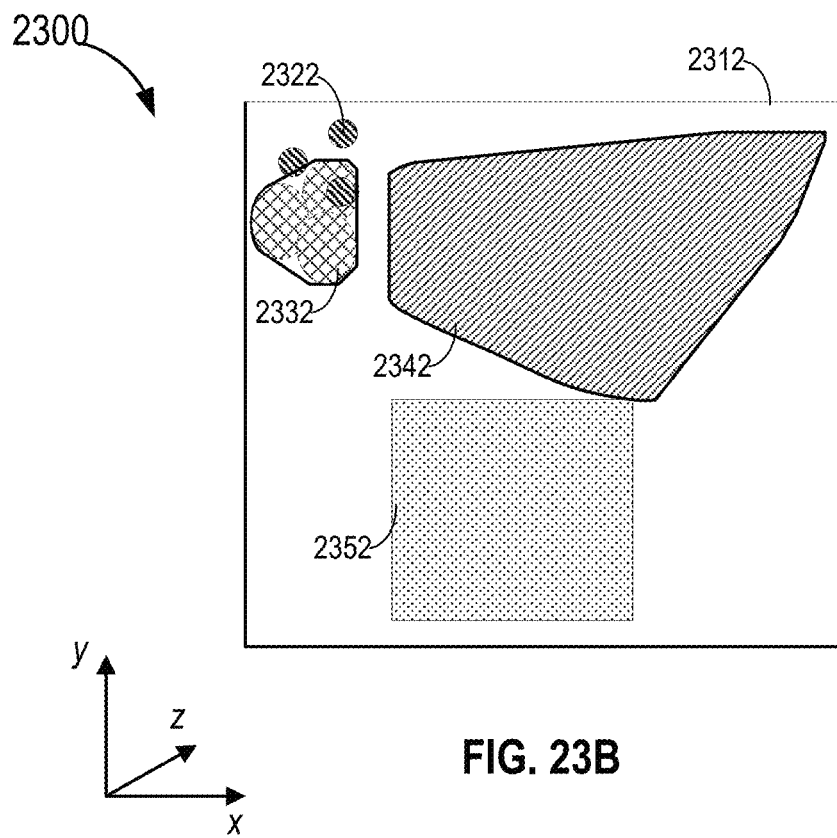
FIG. 23B illustrates the layout of a second set of gratings in an example of a waveguide display including three projectors for three different colors according to certain embodiments.

FIG. 23A illustrates the layout of a first set of gratings in an example of waveguide display 2300 including three projectors for three different colors according to certain embodiments. FIG. 23B illustrates the layout of a second set of gratings in the example of waveguide display 2300 including three projectors for three different colors according to certain embodiments. Waveguide display 2300 may be an example of waveguide display 1800, 2000, or 2200, and may include two assemblies as described above, where FIG. 23A may show the first assembly and FIG. 23B may show the second assembly. The first assembly may be used to couple display light for some fields of view from three color projectors to user's eyes, while the second assembly may be used to couple display light for some other fields of view from the three color projectors to user's eyes. Each color projector may include, for example, a micro-LED array that emits display light in one color as described above with respect to FIGS. 22A and 22B. The three color projectors may include, for example, a red micro-LED array, a green micro-LED array, and a blue micro-LED array. Each micro-LED array may generate a monochromatic image of a corresponding color, and thus the three micro-LED arrays may generate a color image.

The first assembly of waveguide display 2300 shown in FIG. 23A may include a waveguide 2310 (e.g., a substrate), three input gratings 2320, three first middle gratings 2330, a second middle grating 2340, and an output grating 2350. Each of the three input gratings 2320 may be used to couple display light of one color from a light source (e.g., a micro-LED array) into waveguide 2310. Each of the three first middle grating 2330 may be used to direct display light from a corresponding input grating 2320 towards second middle grating 2340 as described above. Second middle grating 2340 and output grating 2350 may expand the input pupil in two directions and deliver the display light to user's eyes.

The second assembly of waveguide display 2300 shown in FIG. 23B may include a waveguide 2312 (e.g., a substrate), three input gratings 2322, three first middle gratings 2332, a second middle grating 2342, and an output grating 2352. Each of the three input gratings 2322 may be used to couple display light of one color from a light source (e.g., a micro-LED array) into waveguide 2312. Each of the three first middle grating 2332 may be used to direct display light from a corresponding input grating 2323 towards second middle grating 2342 as described above. Second middle grating 2342 and output grating 2352 may expand the input pupil in two directions and deliver the display light to user's eyes.

Because of the separate input gratings and/or first middle gratings for display light of different colors, each input grating and/or first middle grating may use the total achievable refractive index modulation of a holographic material layer to achieve a higher diffraction efficiency for display light of the respective color. In various embodiments, waveguide display 2300 may have an improved overall in-coupling efficiency that is about five to ten times of the overall in-coupling efficiency of a waveguide display without separate projectors and input gratings for three different colors.

V. Phase Structures

Gratings described above may be optimized to maximize the power of the display light in the desired path. For example, the grating shape, the slant angle, the grating period, the duty cycle, the grating height or depth, the refractive index, the refractive index modulation, the overcoating material, and the spatial variations of these grating parameters across the grating may be adjusted to improve the efficiencies of directing display light to the desired directions. In addition, as described with respect to FIGS. 10A-11, display light coupled into a waveguide by an input grating coupler may reach the input grating coupler again and may be partially coupled out the waveguide by the input grating coupler. Thus, the overall input coupling efficiency of the input grating coupler may be low. As described above, in some embodiments, staircase structures and/or separate grating couplers for different colors may help to improve the overall in-coupling efficiencies. Furthermore, grating couplers may have different diffraction efficiencies for s-polarized light and p-polarized light. For example, a grating coupler may have a higher in-coupling efficiency for s-polarized input light than for p-polarized input light, and may also have a higher out-coupling efficiency for s-polarized light than for p-polarized light.

According to certain embodiments, the efficiency of a waveguide display may be further improved by controlling the polarization state of the display light beam along its propagation path. For example, a phase structure may be coupled to the waveguide and used to change the polarization state of the light reflected at the surface of the waveguide, such that the reflected light, when reaching a polarization-dependent grating coupler, may be preferentially diffracted or reflected to the desired directions towards the eyebox to improve the overall efficiency of the waveguide display.

Figure 24A:
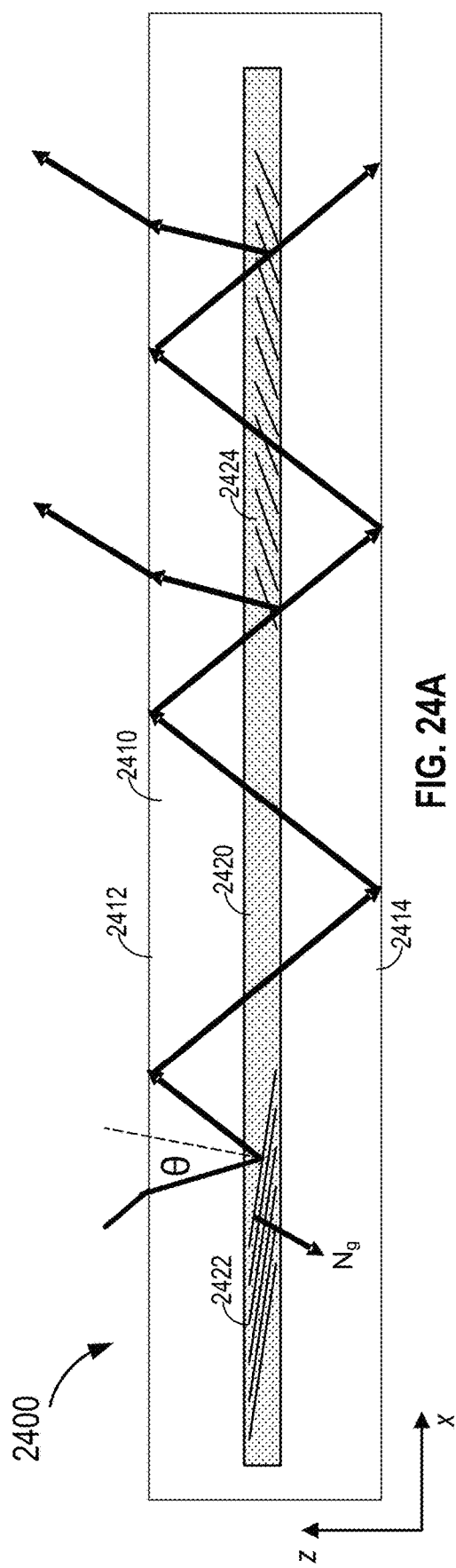
FIG. 24A illustrates an example of a waveguide display including volume Bragg grating couplers according to certain embodiments.

FIG. 24A illustrates an example of a waveguide display 2400 including volume Bragg grating couplers. Waveguide display 2400 may include a VBG layer 2420 within a substrate 2410 or between two substrates. VBG layer 2420 may include an input VBG 2422 and an output VBG 2424. In the illustrated example, input VBG 2422 may reflectively diffract incident light, and thus may function as a reflective VBG. Output VBG 2424 may partially reflectively diffract the light from input VBG 2422 out of substrate 2410 towards an eyebox of waveguide display 2400.

Figure 24B:
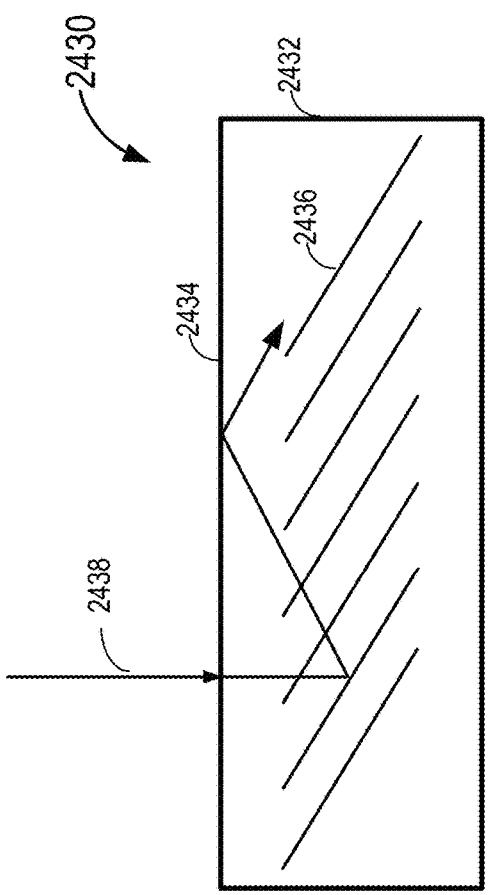
FIG. 24B illustrates an example of an input coupler including a volume Bragg grating in a substrate according to certain embodiments.

FIG. 24B illustrates an example of an input coupler 2430 including a volume Bragg grating 2436 in a substrate 2432. VBG 2436 may be an example of input VBG 2422 or output VBG 2424. As illustrated, VBG 2436 may function as multiple reflectors that strongly reflect light of a specific wavelength and from a specific angle that satisfies the Bragg condition. Both transmissive VBGs and reflective VBGs may function as multilayer reflectors. Depending on the slant angle of the multiple reflectors in VBG 2436, the reflected light may or may not pass through VBG 2436 such that VBG 2436 may transmissively or reflectively diffract incident light 2438 as shown in FIG. 24B. In the illustrated example, the reflectively diffracted light may be reflected at a top surface 2434 of substrate 2432 and may reach VBG 2436 again. VBG 2436 may at least partially diffract the reflected light out of substrate 2432 and thus may decrease the input coupling efficiency of input coupler 2430. The reflectivity of each of the multiple reflectors may depend on the polarization state and the incident angle of the incident light, and the base refractive index and the refractive index modulation ($\Delta n$) of the VBG.

Figure 24D:
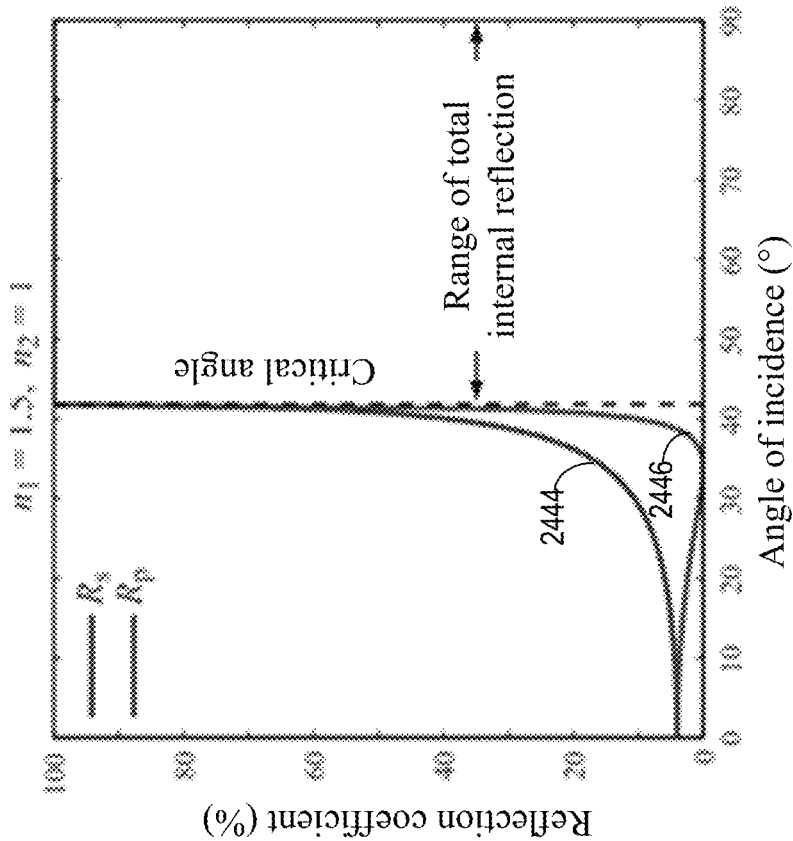
FIG. 24D illustrates examples of reflection coefficients of s-polarization and p-polarization light with different incident angles at an interface between a high refractive index material and a low refractive index material.
Figure 24C:
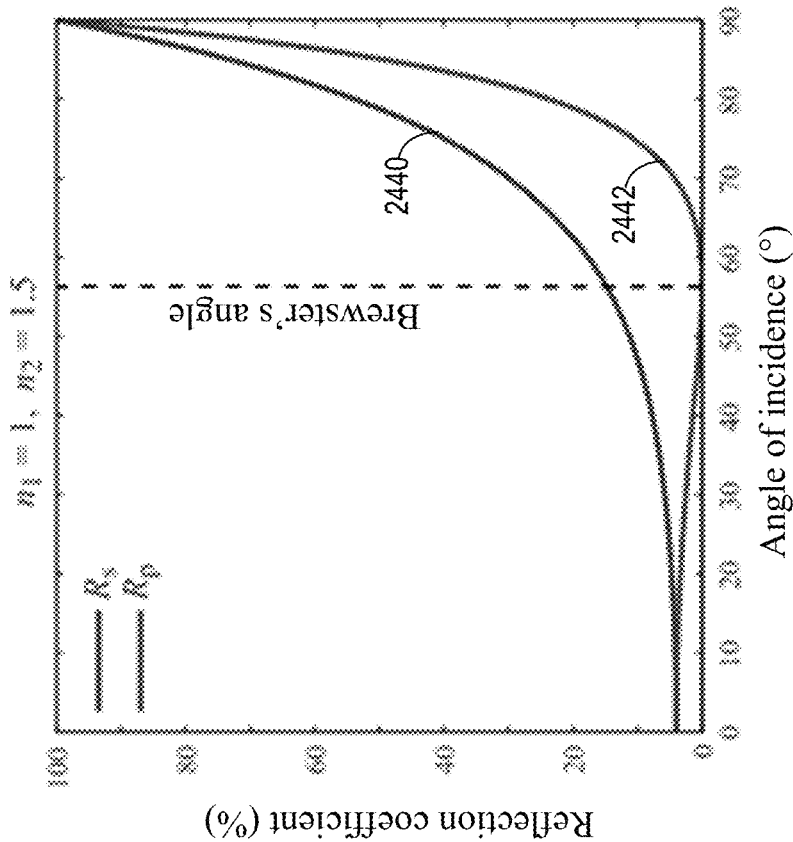
FIG. 24C illustrates examples of reflection coefficients of s-polarized and p-polarized light with different incident angles at an interface between a low refractive index material and a high refractive index material.

FIG. 24C illustrates examples of reflection coefficients of s-polarized and p-polarized light with different incident angles at an interface between a low refractive index material and a high refractive index material. In the illustrated example, the refractive index of the first medium is 1.0, the refractive index of the second medium is 1.5, and the s-polarized or p-polarized light reaches the interface between the two media from the first medium. A curve 2440 in FIG. 24C shows the reflection coefficients for s-polarized light with different incident angles. A curve 2442 shows the reflection coefficients for p-polarized light with different incident angles. Curve 2442 shows that, when the incident angle is equal to or close to the Brewster's angle, the reflection coefficient for p-polarized light is about or close to zero. Thus, the reflectivity at the interface between the two media can be very low for p-polarized light from certain incident angles.

FIG. 24D illustrates examples of reflection coefficients of s-polarization and p-polarization light with different incident angles at an interface between a high refractive index material and a low refractive index material. In the illustrated example, the refractive index of the first medium is 1.5, the refractive index of the second medium is 1.0, and the s-polarized or p-polarized light reaches the interface between the two media from the first medium. A curve 2444 in FIG. 24D shows the reflection coefficients for s-polarized light with different incident angles. A curve 2446 shows the reflection coefficients for p-polarized light with different incident angles. As shown by curves 2444 and 2446, the incident light may be totally reflected when the incident angle is greater than the critical angle. When the incident angle is less than the critical angle, the reflection coefficients for p-polarized light with incident angles at or near the Brewster's angle may be close to zero. Thus, the reflectivity at the interface between the two media can be very low for p-polarized light from certain incident angles. Thus, in a VBG-based waveguide display, it may be desirable to alter the polarization state of the incident light to preferentially diffract or transmit the incident light in order to achieve a high efficiency of the VBG-based waveguide display FIG. 24E illustrates a cross-sectional view of an example of a waveguide display 2402 including VBG couplers and a phase structure 2456 according to certain embodiments. Waveguide display 2402 may be similar to waveguide display 2400 and may additionally include phase structure 2456. As illustrated, waveguide display 2402 may include VBGs 2460 and 2462 in a substrate 2450 or between two substrates. VBG 2460 may reflectively diffract incident display light (e.g., s-polarized light) towards a top surface 2452 of substrate 2450. Top surface 2452 may reflect the display light towards a bottom surface 2454 of substrate 2450. Phase structure 2456 at bottom surface 2454 of substrate 2450 may receive the reflected display light and change the polarization state of the display light, for example, to p-polarized light. The display light may be reflected at bottom surface 2454 of substrate 2450 or a bottom surface of phase structure 2456. The reflected display light may incident on VBG 2462 as s-polarized light due to the different orientation and different grating vector of VBG 2462 compared to VBG 2460, and may be diffracted out of substrate 2450 towards an eyebox at a higher diffraction efficiency by VBG 2462. Simulation results show that, by using phase structure 2456, the maximum coupling efficiency may be improved by about 42% from the baseline efficiency (without using phase structure 2456).

FIG. 24F illustrates a cross-sectional view of an example of a waveguide display 2404 including volume Bragg gratings 2480 and 2482 and phase structures 2490 and 2492 according to certain embodiments. As illustrated, waveguide display 2404 may include VBGs 2480 and 2482 in a substrate 2470 or between two substrates. VBG 2480 may reflectively diffract incident display light (e.g., s-polarized light) towards a top surface of substrate 2470. Phase structure 2492 may be coupled to the top surface of substrate 2470, and may change the polarization state of the incident display light. The top surface of substrate 2470 or phase structure 2492 may reflect the display light towards the bottom surface of substrate 2470. Phase structure 2490 at the bottom surface of substrate 2470 may change the polarization state of the incident display light. The display light may be reflected at the bottom surface of substrate 2470 or phase structure 2490. The reflected display light may be incident on VBG 2482, and may be diffracted by VBG 2482 out of substrate 2470 towards an eyebox at a high diffraction efficiency.

In some embodiments, phase structures 2490 and 2492 may be only at selected locations on the top and bottom surfaces of substrate 2470. In some embodiments, either phase structure 2490 or phase structure 2492 may be used in a waveguide display. In some embodiments, both phase structure 2490 and phase structure 2492 may be used in a waveguide display, where the desired phase change or retardation may be achieved by the combination of the two phase structures. For example, to convert s-polarized light to p-polarized light, a first phase structure may convert the s-polarized light to circularly polarized light, and a second phase structure may convert the circularly polarized light to p-polarized light. In some embodiments, the polarization alteration characteristics of phase structure 2490 or phase structure 2492 may vary at different locations.

Phase structures 2456, 2490, and 2492 described above may include any birefringent materials (e.g., birefringent crystals, liquid crystals, or polymers) or structures (e.g., gratings, meta-gratings, micro-structures, nano-structures, or other subwavelength structures) that can cause a desired phase delay between two orthogonal linear polarization components (e.g., s-polarized component and p-polarized component) of a light beam, such that the incident light beam may be changed to an s-polarized, p-polarized, circularly polarized, or elliptically polarized beam. In one example, phase structure 2456, 2490, or 2492 may include a waveplate having a desired phase delay, such as a quarter-wave plate (QWP) or a waveplate have another phase delay. The phase structure may be placed at various locations in a waveguide display, such as at the input coupler region, between the input coupler and the output coupler, at the output coupler region, or any combinations.

FIG. 25A illustrates a cross-sectional view of an input portion of an example of a waveguide display 2500 including VBG couplers and a phase structure 2540 according to certain embodiments. As illustrated, waveguide display 2500 may include an input grating 2520 and a first middle grating 2530 in a waveguide 2510 or between two substrates. Input grating 2520 may be an example of the input grating described above, and first middle grating 2530 may be an example of the first middle grating described above. Input grating 2520 may reflectively diffract incident display light towards the top surface of waveguide 2510. The top surface of waveguide 2510 may reflect the display light towards a bottom surface of waveguide 2510. Phase structure 2540 at bottom surface 2514 of waveguide 2510 may receive the reflected display light and change the polarization state of the display light, for example, from s-polarized light to p-polarized light or from p-polarized light to s-polarized light. The display light may be reflected at the bottom surface of waveguide 2510 or a bottom surface of phase structure 2540. The reflected p-polarized display light may be incident on input grating 2520 again, but may be minimally diffracted by input grating 2520. The p-polarized display light may be reflected at the top surface of waveguide 2510 and reach first middle grating 2530 as s-polarized light due to the different orientation and different grating vector of first middle grating 2530 compared to input grating 2520, and may be diffracted by first middle grating 2530 to a second middle grating at a higher diffraction efficiency.

FIG. 25B illustrates a top view of the example of waveguide display 2500 including VBG couplers and phase structure 2540 according to certain embodiments. As illustrated, in addition to input grating 2520, phase structure 2540, and first middle grating 2530, waveguide display 2500 may also include a second middle grating 2550 and an output grating 2560. Each of gratings 2550 and 2560 may be a reflective VBG or a transmissive VBG. As described above with respect to FIG. 9, second middle grating 2550 may receive the display light diffracted by first middle grating 2530 and replicate the input pupil in one direction (e.g., approximately the x direction) and direct the display light towards output grating 2560. Output grating 2560 may replicate the input pupil in a second direction (e.g., approximately the y direction) and direct the display light towards an eyebox 2570.

In the illustrated example, phase structure 2540 is shown to be at a region where input grating 2520 and/or first middle grating 2530 are located, to change the polarization state of the display light coupled into waveguide 2510, for example, from p-polarized to s-polarized or from s-polarized to p-polarized. In some other embodiments, phase structure 2540 may also be at regions where second middle grating 2550 and/or output grating 2560 are located, to change the polarization state of the display light during its propagation within waveguide 2510.

Figure 26B:
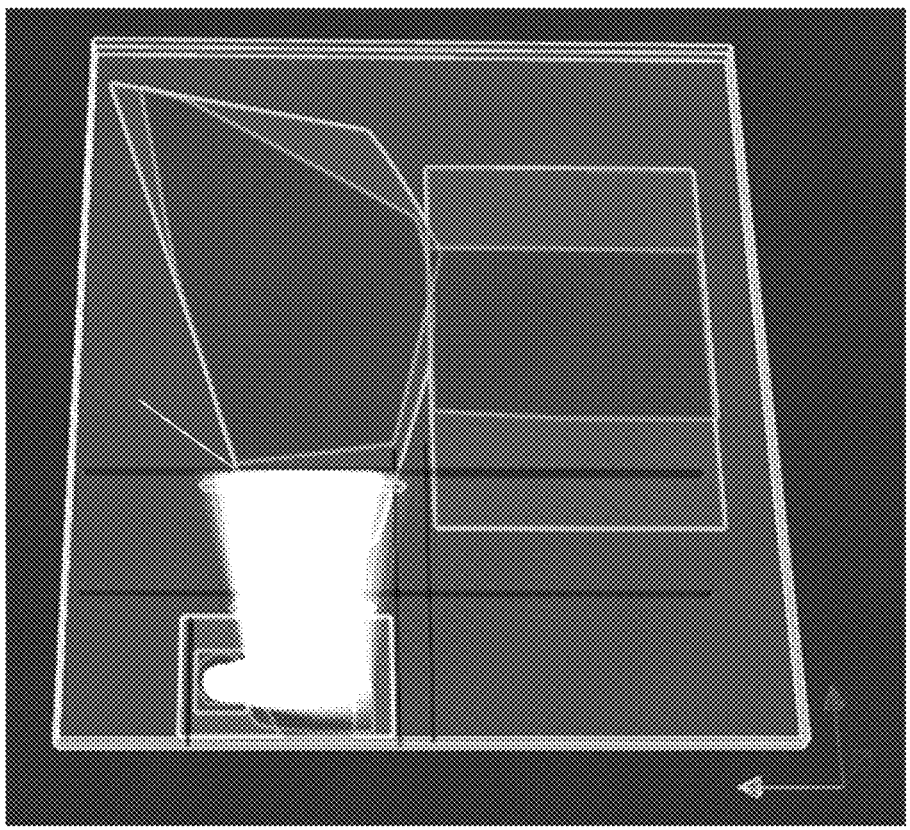
FIG. 26B illustrates the simulation result of an example of a waveguide display including VBGs and a phase structure according to certain embodiments.
Figure 26A:
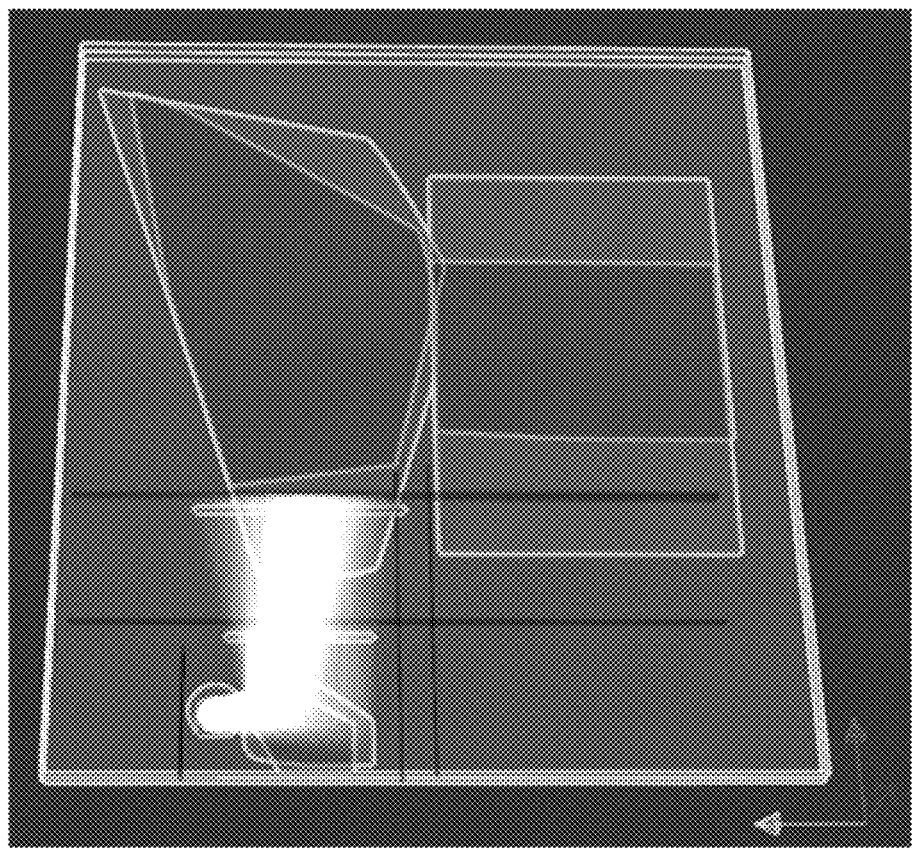
FIG. 26A illustrates the simulation result of an example of a waveguide display including VBGs according to certain embodiments.

FIG. 26A illustrates a simulation result for an example of a volume Bragg grating-based waveguide display 2600 according to certain embodiments. Waveguide display 2600 may be an example of waveguide display 900. FIG. 26A shows a display light beam coupled into a waveguide by an input grating (e.g., input grating 910) and then directed by a first middle grating (e.g., first middle grating 920) to a second middle grating (e.g., second middle grating 930). The in-coupling efficiency of waveguide display 2600 may be measured after the display light is diffracted by the first middle grating and before the display light reaches the second middle grating.

FIG. 26B illustrates a simulation result of an example of a waveguide display 2605 including volume Bragg gratings and a phase structure according to certain embodiments. Waveguide display 2605 may be an example of waveguide display 2500, where a phase structure (e.g., phase structure 2540) may be located at a region where an input grating (e.g., input grating 2520) and a first middle grating (e.g., first middle grating 2530) are located. FIG. 26B shows a display light beam coupled into a waveguide by the input grating and then directed by the first middle grating to a second middle grating (e.g., second middle grating 2550). The in-coupling efficiency of waveguide display 2605 may be measured after the display light is diffracted by the first middle grating and before the display light reaches the second middle grating. FIG. 26B shows that the intensity of the display light beam after the first middle grating may be much higher than that shown in FIG. 26A.

Figure 27:
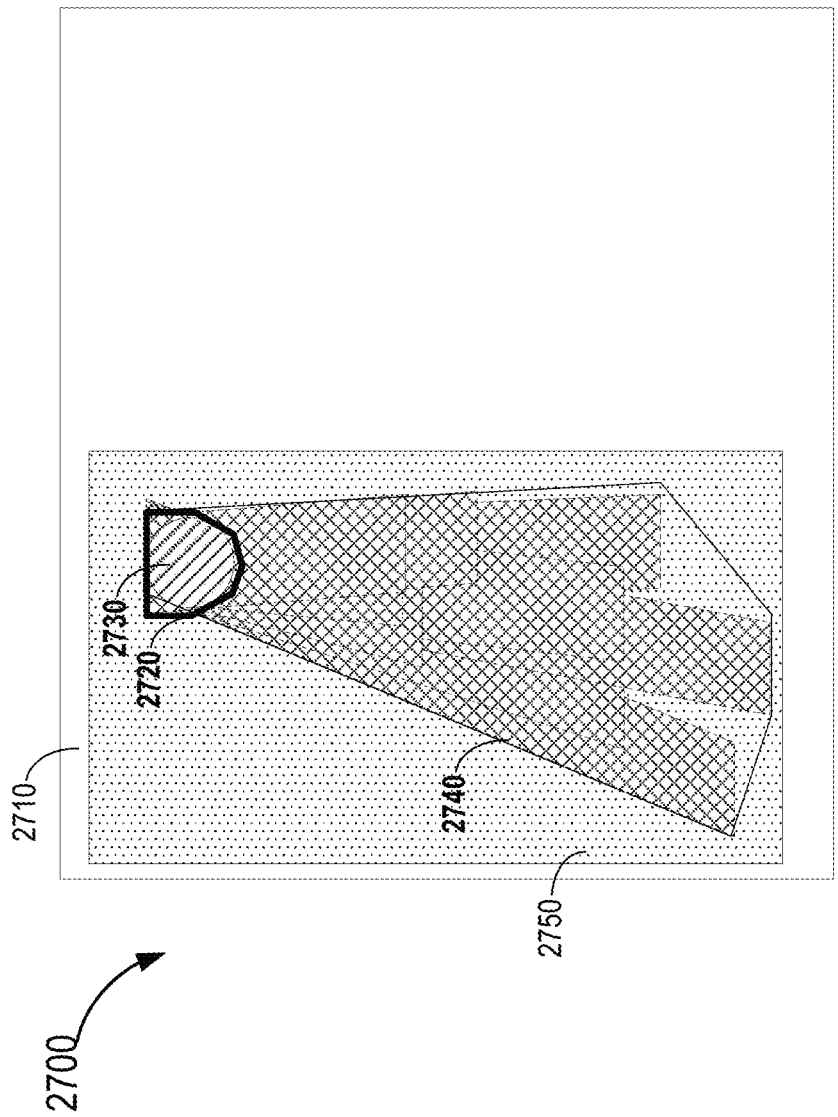
FIG. 27 illustrates a portion of an example of a waveguide display including a staircase structure and a phase structure according to certain embodiments.

FIG. 27 illustrates a portion of an example of a waveguide display 2700 including a staircase structure 2720 and a phase structure 2750 according to certain embodiments. As waveguide display 1300, waveguide display 2700 may include a waveguide 2710 and a first middle grating 2740 formed in waveguide 2710. Staircase structure 2720 may be bonded to waveguide 2710. Staircase structure 2720 may include an input grating 2730 on the top or the bottom of a staircase substrate as described above with respect to, for example, FIGS. 13A, 13B, 13D, and 17A-17F, to reduce the undesired coupling of the display light out of waveguide 2710 by input grating 2730 and to reduce FOV clipping. In addition, phase structure 2750 as described above with respect to FIGS. 24C-25B may be formed at the bottom or top surface of waveguide 2710, to further improve the in-coupling efficiency of the waveguide display 2700. In the example shown in FIG. 27, input grating 2730 may be formed on the top of staircase structure 2720, and the staircase substrate may have a size that is close to the size of input grating 2730 (e.g., have a circular shape).

Figure 28B:
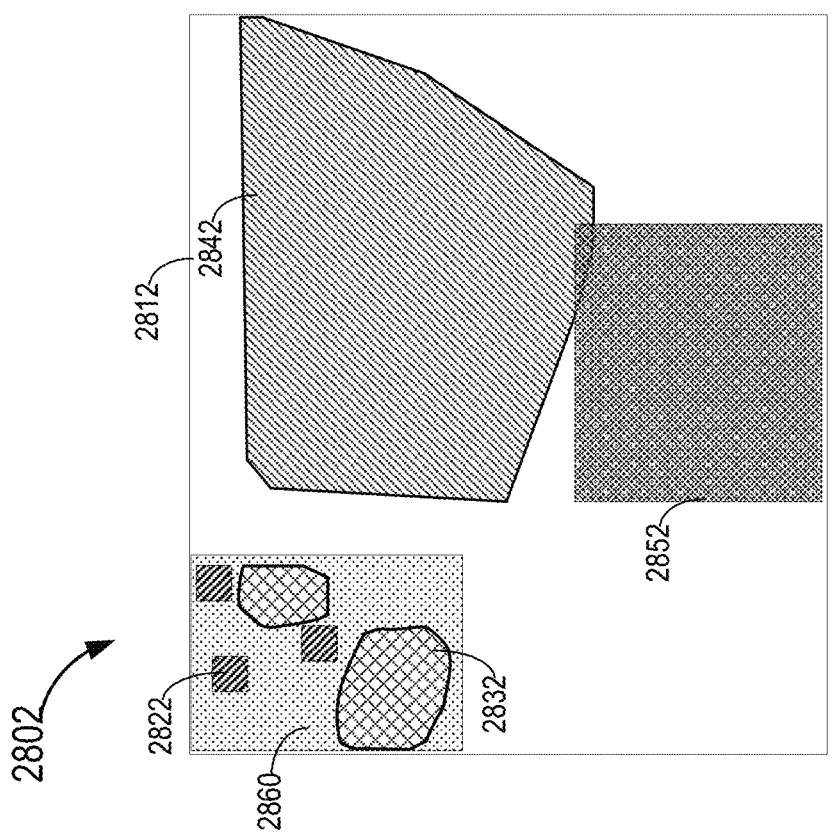
FIG. 28B illustrates an example of a waveguide display including separate projectors and input gratings for different colors and a phase structure according to certain embodiments.
Figure 28A:
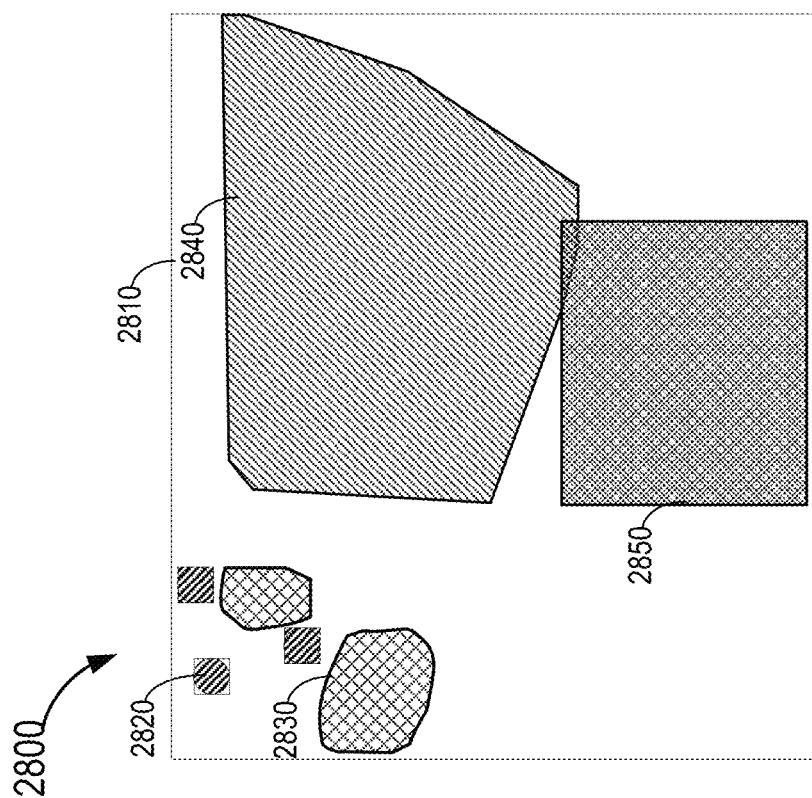
FIG. 28A illustrates an example of a waveguide display including separate projectors and input grating couplers for different colors according to certain embodiments.

FIG. 28A illustrates an example of a waveguide display 2800 including separate projectors and input grating couplers for different colors according to certain embodiments. Waveguide display 2800 may be similar to waveguide display 2300 and may include one or more assemblies. FIG. 28A shows one of the one or more assemblies. The projectors may include three projectors. Each projector may include, for example, a micro-LED array that emits display light in one color as described above with respect to FIGS. 22A and 22B. The three projectors may include, for example, a red micro-LED array, a green micro-LED array, and a blue micro-LED array. Each micro-LED array may generate a monochromatic image of a corresponding color, where the combination of the three monochromatic images may form a color image. Waveguide display 2800 may include a waveguide 2810 (e.g., a substrate), multiple (e.g., three) input gratings 2820, multiple first middle gratings 2830 (which may be separate from each other or may be in contiguous regions), a second middle grating 2840, and an output grating 2850. Each of the multiple input gratings 2820 may be used to couple display light of one color from a light source (e.g., a micro-LED array) into waveguide 2810. Each of the multiple first middle grating 2830 may be used to direct display light from an input grating 2820 towards second middle grating 2840 as described above. Second middle grating 2840 and output grating 2850 may expand the input pupil in two directions and couple the display light to user's eyes.

FIG. 28B illustrates an example of a waveguide display 2802 including separate projectors and input gratings for different colors and a phase structure 2860 according to certain embodiments. Waveguide display 2802 may be similar to waveguide display 2800, and may include one or more assemblies. One of the one or more assemblies may include a waveguide 2812 (e.g., a substrate), multiple (e.g., three) input gratings 2822, multiple first middle gratings 2832 (which may be separate from each other or may be in contiguous regions), a second middle grating 2842, and an output grating 2852. The projectors may include three projectors. Each projector may include, for example, a micro-LED array that emits display light in one color. The three projectors may include, for example, a red micro-LED array, a green micro-LED array, and a blue micro-LED array. Each micro-LED array may generate a monochromatic image of a corresponding color, where the combination of the three monochromatic images may form a color image. Each of the multiple input gratings 2822 may be used to couple display light of one color from a light source (e.g., a micro-LED array) into waveguide 2812. Each of the multiple first middle grating 2832 may be used to direct display light from an input grating 2822 towards second middle grating 2842 as described above. Second middle grating 2842 and output grating 2852 may expand the input pupil in two directions and couple the display light to user's eyes.

Waveguide display 2802 may also include an additional phase structure 2860 as described above. Phase structure 2540 may be at a region where input gratings 2822 and/or first middle grating 2832 are located, to change the polarization state of the display light coupled into waveguide 2812, for example, from p-polarized to s-polarized or from s-polarized to p-polarized. In some other embodiments, phase structure 2860 may also be at regions where second middle grating 2842 and/or output grating 2552 are located, to change the polarization state of the display light during its propagation within waveguide 2812.

Figure 29B:
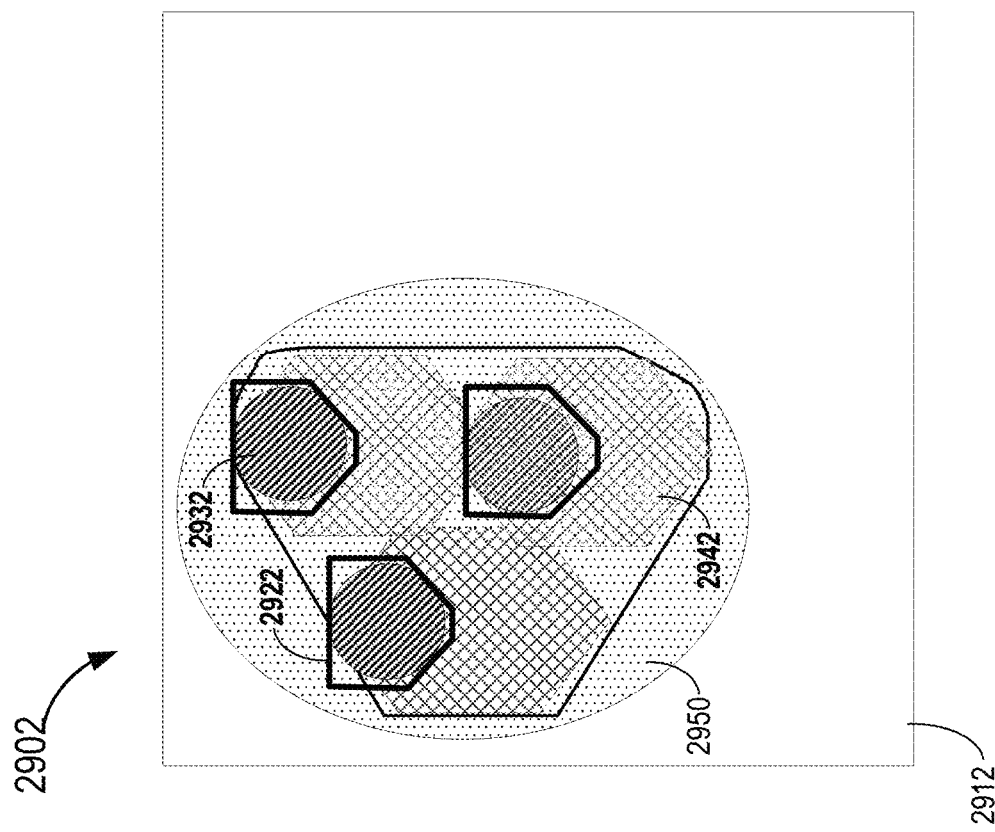
FIG. 29B illustrates an input portion of an example of a waveguide display including multiple projectors, multiples input gratings 3132 on multiple staircase structures, and a phase structure according to certain embodiments.
Figure 29A:
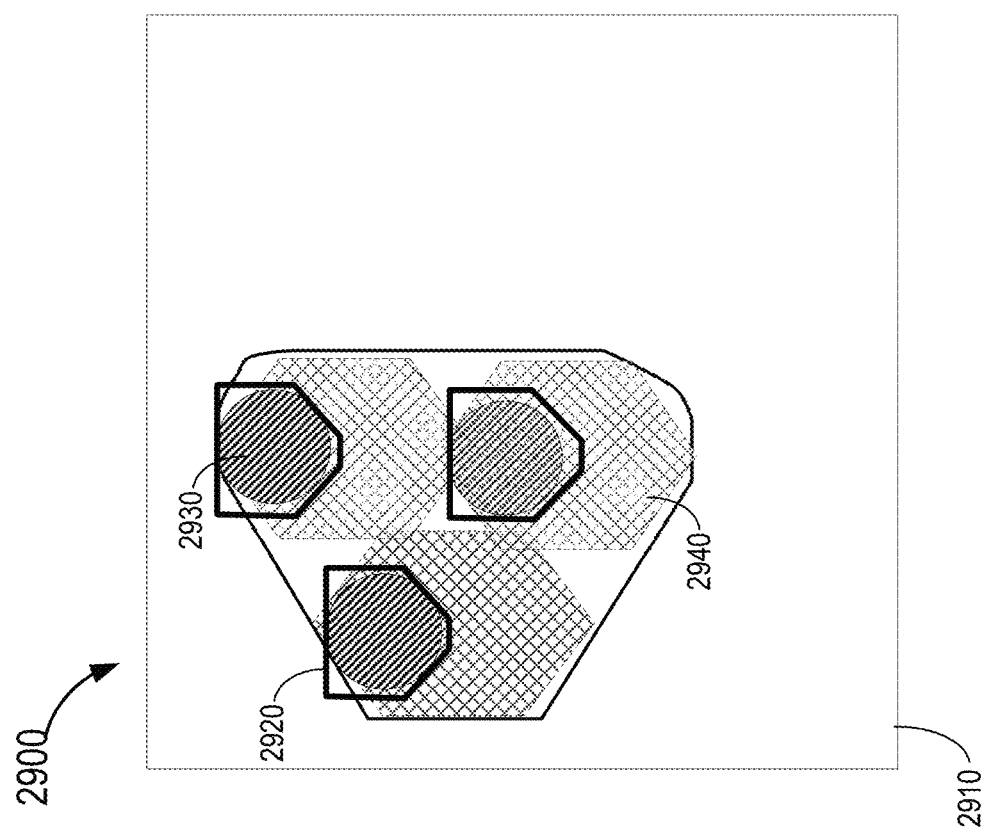
FIG. 29A illustrates an input portion of an example of a waveguide display including multiple projectors and multiples input gratings on multiple staircase structures according to certain embodiments.

FIG. 29A illustrates an input portion of an example of a waveguide display 2900 including multiple projectors and multiples input gratings 2930 on multiple staircase structures 2920 according to certain embodiments. Each projector may include, for example, a micro-LED array that emits display light in one color as described above with respect to FIGS. 22A and 22B. The three color projectors may include, for example, a red micro-LED array, a green micro-LED array, and a blue micro-LED array. Each micro-LED array may generate a monochromatic image of a corresponding color, and thus the three micro-LED arrays in combination may generate a color image. Waveguide display 2900 may include a waveguide 2910 (e.g., a substrate), three staircase structures 2920 each including an input grating 2930, and three first middle gratings 2940, which may be separate from each other or may be in contiguous regions. The shape and the thickness of staircase structures 2920 may be selected to optimize the input efficiency and reduce the FOV clipping as described above. As also described above, the staircase structures 2920 may or may not include a staircase substrate, the thickness of which may be the difference between the total desired thickness of staircase structure 2920 and the thickness of the holographic material layer for input grating 2930. Each input grating 2930 may be used to couple display light of one color from a light source (e.g., a micro-LED array) into waveguide 2910. Each first middle grating 2940 may be used to direct display light from an input grating 2930 towards a second middle grating (e.g., second middle grating 2340, 2840, or 2842, not shown in FIG. 29A) as described above. The second middle grating and an output grating (e.g., output grating 2350, 2850, or 2852, not shown in FIG. 29A) may expand the input pupil in two directions and couple the display light to user's eyes.

FIG. 29B illustrates an input portion of an example of a waveguide display 2902 including multiple projectors, multiples input gratings 2932 on multiple staircase structures 2922, and a phase structure 2950 according to certain embodiments. Waveguide display 2902 may be similar to waveguide display 2900, and may include a waveguide 2912 (e.g., a substrate), three staircase structures 2922 each including an input grating 2932, and three first middle gratings 2942, which may be separate from each other or may be in contiguous regions. The shape and the thickness of staircase structures 2922 may be selected to optimize the input efficiency and reduce the FOV clipping as described above. As also described above, the staircase structures 2922 may or may not include a staircase substrate, the thickness of which may be the difference between the total desired thickness of staircase structure 2922 and the thickness of the holographic material layer for input grating 2932. Each input grating 2932 may be used to couple display light of one color from a light source (e.g., a micro-LED array) into waveguide 2912. Each first middle grating 2942 may be used to receive and redirect display light from an input grating 2932 towards a second middle grating (e.g., second middle grating 2340, 2840, or 2842, not shown in FIG. 29B) as described above. The second middle grating and an output grating (e.g., output grating 2350, 2850, or 2852, not shown in FIG. 29B) may expand the input pupil in two directions and couple the display light to user's eyes.

Waveguide display 2902 may also include an additional phase structure 2950 as described above. Phase structure 2950 may be at a region where input gratings 2932 and/or first middle gratings 2942 are located, to change the polarization state of the display light coupled into waveguide 2912, for example, from p-polarized to s-polarized or from s-polarized to p-polarized. In some other embodiments, phase structure 2950 may also be at regions where the second middle grating and/or the output grating are located, to change the polarization state of the display light during its propagation within waveguide 2912.

The phase structures described above (e.g., phase structure 2456, 2490, 2492, 2540, 2750, 2860, or 2950) may include any birefringent materials (e.g., birefringent crystals, liquid crystals, or polymers) or structures (e.g., gratings, meta-gratings, nano-structures, or other subwavelength structures) that can cause a desired phase delay between two orthogonal linear polarization components (e.g., s-polarized light and p-polarized light), such that the incident light beam may be changed to an s-polarized, p-polarized, circularly polarized, or elliptically polarized beam.

In some embodiments, in order to reduce the loss (e.g., due to undesired Fresnel reflection) at the interfaces between the phase structures and the adjacent components of the waveguide display, such as the substrate, it may be desirable to use a phase structure that has an effective refractive index close to the refractive index of the adjacent component. In some embodiments where the substrate has a high refractive index (e.g., >2.0, such as 2.5), it may be difficult to find a birefringent material that has a matching refractive index. In such cases, gratings or other subwavelength structures may be used to achieve the phase delay, polarization conversion, and refractive index matching, such that a difference between the refractive index of the substrate and the effective refractive index of the phase structure may be less than about 0.35, less than about 0.2, less than about 0.1, or less than about 0.05.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 30:
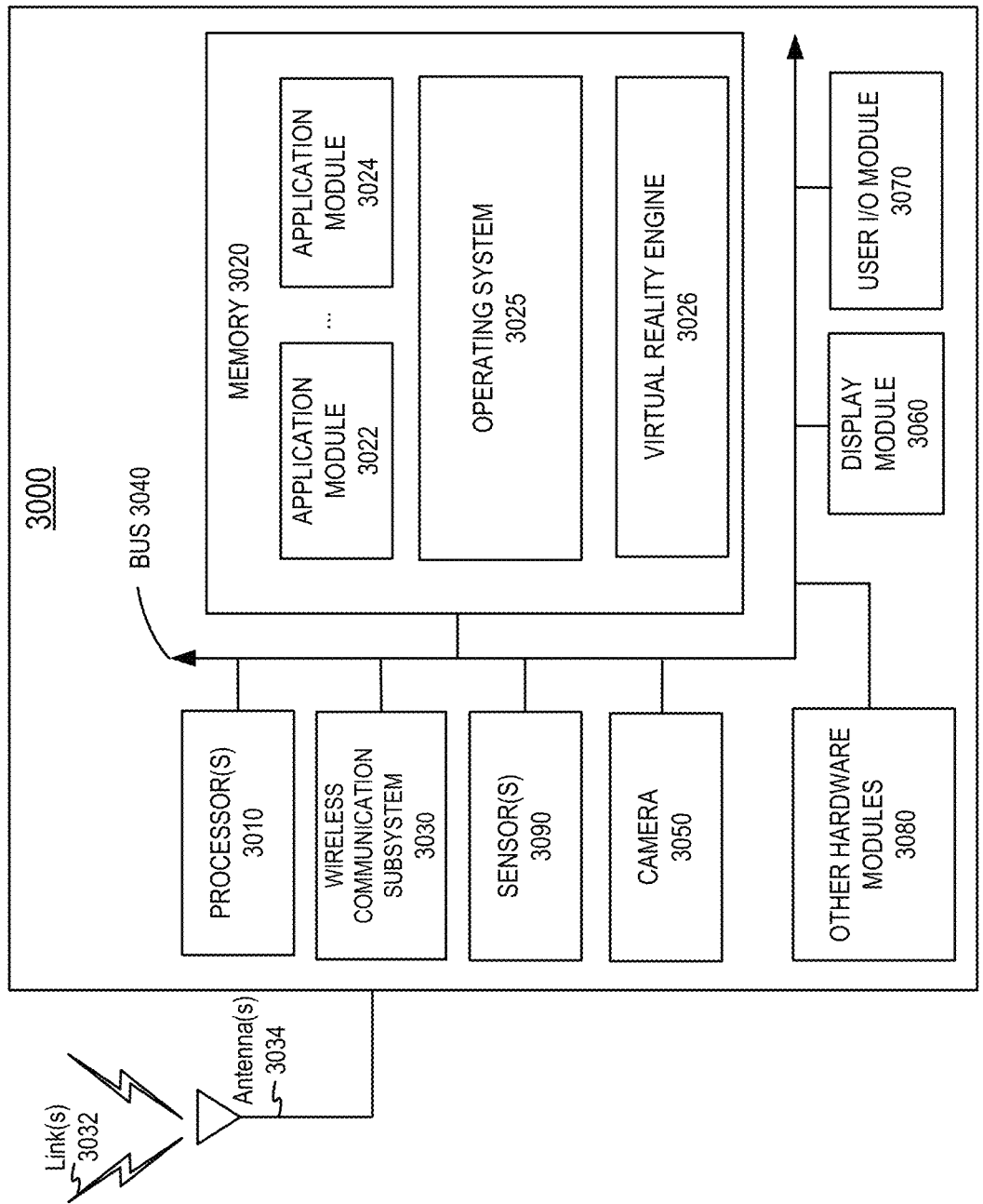
FIG. 30 is a simplified block diagram of an example of an electronic system in an example of a near-eye display according to certain embodiments.

FIG. 30 is a simplified block diagram of an example of an electronic system 3000 of an example near-eye display (e.g., HMD device) for implementing some of the examples disclosed herein. Electronic system 3000 may be used as the electronic system of an HMD device or other near-eye displays described above. In this example, electronic system 3000 may include one or more processor(s) 3010 and a memory 3020. Processor(s) 3010 may be configured to execute instructions for performing operations at a number of components, and can be, for example, a general-purpose processor or microprocessor suitable for implementation within a portable electronic device. Processor(s) 3010 may be communicatively coupled with a plurality of components within electronic system 3000. To realize this communicative coupling, processor(s) 3010 may communicate with the other illustrated components across a bus 3040. Bus 3040 may be any subsystem adapted to transfer data within electronic system 3000. Bus 3040 may include a plurality of computer buses and additional circuitry to transfer data.

Memory 3020 may be coupled to processor(s) 3010. In some embodiments, memory 3020 may offer both short-term and long-term storage and may be divided into several units. Memory 3020 may be volatile, such as static random access memory (SRAM) and/or dynamic random access memory (DRAM) and/or non-volatile, such as read-only memory (ROM), flash memory, and the like. Furthermore, memory 3020 may include removable storage devices, such as secure digital (SD) cards. Memory 3020 may provide storage of computer-readable instructions, data structures, program modules, and other data for electronic system 3000. In some embodiments, memory 3020 may be distributed into different hardware modules. A set of instructions and/or code might be stored on memory 3020. The instructions might take the form of executable code that may be executable by electronic system 3000, and/or might take the form of source and/or installable code, which, upon compilation and/or installation on electronic system 3000 (e.g., using any of a variety of generally available compilers, installation programs, compression/decompression utilities, etc.), may take the form of executable code.

In some embodiments, memory 3020 may store a plurality of application modules 3022 through 3024, which may include any number of applications. Examples of applications may include gaming applications, conferencing applications, video playback applications, or other suitable applications. The applications may include a depth sensing function or eye tracking function. Application modules 3022-3024 may include particular instructions to be executed by processor(s) 3010. In some embodiments, certain applications or parts of application modules 3022-3024 may be executable by other hardware modules 3080. In certain embodiments, memory 3020 may additionally include secure memory, which may include additional security controls to prevent copying or other unauthorized access to secure information.

In some embodiments, memory 3020 may include an operating system 3025 loaded therein. Operating system 3025 may be operable to initiate the execution of the instructions provided by application modules 3022-3024 and/or manage other hardware modules 3080 as well as interfaces with a wireless communication subsystem 3030 which may include one or more wireless transceivers. Operating system 3025 may be adapted to perform other operations across the components of electronic system 3000 including threading, resource management, data storage control and other similar functionality.

Wireless communication subsystem 3030 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 3000 may include one or more antennas 3034 for wireless communication as part of wireless communication subsystem 3030 or as a separate component coupled to any portion of the system. Depending on desired functionality, wireless communication subsystem 3030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 3030 may permit data to be exchanged with a network, other computer systems, and/or any other devices described herein. Wireless communication subsystem 3030 may include a means for transmitting or receiving data, such as identifiers of HMD devices, position data, a geographic map, a heat map, photos, or videos, using antenna(s) 3034 and wireless link(s) 3032. Wireless communication subsystem 3030, processor(s) 3010, and memory 3020 may together comprise at least a part of one or more of a means for performing some functions disclosed herein.

Embodiments of electronic system 3000 may also include one or more sensors 3090. Sensor(s) 3090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 3090 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 3000 may include a display module 3060. Display module 3060 may be a near-eye display, and may graphically present information, such as images, videos, and various instructions, from electronic system 3000 to a user. Such information may be derived from one or more application modules 3022-3024, virtual reality engine 3026, one or more other hardware modules 3080, a combination thereof, or any other suitable means for resolving graphical content for the user (e.g., by operating system 3025). Display module 3060 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 3000 may include a user input/output module 3070. User input/output module 3070 may allow a user to send action requests to electronic system 3000. An action request may be a request to perform a particular action. For example, an action request may be to start or end an application or to perform a particular action within the application. User input/output module 3070 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 3000. In some embodiments, user input/output module 3070 may provide haptic feedback to the user in accordance with instructions received from electronic system 3000. For example, the haptic feedback may be provided when an action request is received or has been performed.

Electronic system 3000 may include a camera 3050 that may be used to take photos or videos of a user, for example, for tracking the user's eye position. Camera 3050 may also be used to take photos or videos of the environment, for example, for VR, AR, or MR applications. Camera 3050 may include, for example, a complementary metal-oxide-semiconductor (CMOS) image sensor with a few millions or tens of millions of pixels. In some implementations, camera 3050 may include two or more cameras that may be used to capture 3-D images.

In some embodiments, electronic system 3000 may include a plurality of other hardware modules 3080. Each of other hardware modules 3080 may be a physical module within electronic system 3000. While each of other hardware modules 3080 may be permanently configured as a structure, some of other hardware modules 3080 may be temporarily configured to perform specific functions or temporarily activated. Examples of other hardware modules 3080 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 3080 may be implemented in software.

In some embodiments, memory 3020 of electronic system 3000 may also store a virtual reality engine 3026. Virtual reality engine 3026 may execute applications within electronic system 3000 and receive position information, acceleration information, velocity information, predicted future positions, or some combination thereof of the HMD device from the various sensors. In some embodiments, the information received by virtual reality engine 3026 may be used for producing a signal (e.g., display instructions) to display module 3060. For example, if the received information indicates that the user has looked to the left, virtual reality engine 3026 may generate content for the HMD device that mirrors the user's movement in a virtual environment. Additionally, virtual reality engine 3026 may perform an action within an application in response to an action request received from user input/output module 3070 and provide feedback to the user. The provided feedback may be visual, audible, or haptic feedback. In some implementations, processor(s) 3010 may include one or more GPUs that may execute virtual reality engine 3026.

In various implementations, the above-described hardware and modules may be implemented on a single device or on multiple devices that can communicate with one another using wired or wireless connections. For example, in some implementations, some components or modules, such as GPUs, virtual reality engine 3026, and applications (e.g., tracking application), may be implemented on a console separate from the head-mounted display device. In some implementations, one console may be connected to or support more than one HMD.

In alternative configurations, different and/or additional components may be included in electronic system 3000. Similarly, functionality of one or more of the components can be distributed among the components in a manner different from the manner described above. For example, in some embodiments, electronic system 3000 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
   a waveguide;
   three non-overlapping input gratings, wherein each of the three non-overlapping input gratings is configured to couple display light in a respective color into the waveguide;
   one or more first middle gratings configured to receive and redirect the display light from the three non-overlapping input gratings;
   a second middle grating configured to diffract, at two or more regions of the second middle grating, the display light from the one or more first middle gratings; and
   an output grating configured to couple the display light from each of the two or more regions of the second middle grating out of the waveguide at two or more regions of the output grating.

2. The waveguide display of claim 1, wherein the one or more first middle gratings include three first middle gratings, each first middle grating of the three first middle gratings corresponding to a respective input grating of the three non-overlapping input gratings and configured to receive and redirect the display light of the respective color from the corresponding respective input grating.

3. The waveguide display of claim 1, wherein the waveguide comprises:
   a first substrate;
   a second substrate; and
   one or more holographic material layers between the first substrate and the second substrate, wherein the one or more first middle gratings and the second middle grating are formed in the one or more holographic material layers.

4. The waveguide display of claim 1, further comprising three projectors, wherein:
   each projector of the three projectors is configured to generate a monochromatic image; and
   each input grating of the three non-overlapping input gratings is configured to couple the monochromatic image from a corresponding projector of the three projectors into the waveguide.

5. The waveguide display of claim 4, wherein each projector of the three projectors includes a two-dimensional array of micro-LEDs.

6. The waveguide display of claim 1, further comprising a phase structure on the waveguide, the phase structure configured to change a polarization state of the display light incident on the phase structure before or after the display light is redirected by the one or more first middle gratings.

7. The waveguide display of claim 6, wherein the phase structure comprises a waveplate, a layer of a birefringent material, or a subwavelength structure and an overcoat layer.

8. The waveguide display of claim 6, wherein the phase structure is in selected regions of the waveguide or is characterized by a spatially varying phase retardation across different regions of the phase structure.

9. The waveguide display of claim 1, wherein the three non-overlapping input gratings, the one or more first middle gratings, and the second middle grating include multiplexed transmissive volume Bragg gratings or multiplexed reflective volume Bragg gratings.

10. The waveguide display of claim 1, wherein:
    each input grating of the three non-overlapping input gratings is on a respective staircase structure bonded to the waveguide; and
    each respective staircase structure is on top of the one or more first middle gratings.

11. The waveguide display of claim 10, wherein:
    each respective staircase structure includes a staircase substrate; and
    each input grating of the three non-overlapping input gratings is on a top or a bottom of the staircase substrate of the respective staircase structure.

12. The waveguide display of claim 10, wherein the respective staircase structure is characterized by a total thickness less than 100 μm.

13. The waveguide display of claim 10, wherein the respective staircase structure includes two or more holographic material layers, the input grating formed in the two or more holographic material layers.

14. The waveguide display of claim 10, wherein a shape and a thickness of the respective staircase structure are selected to avoid clipping of a field of view of the waveguide display by the respective staircase structure.

15. A waveguide display comprising:
    a waveguide;
    three projectors, each projector of the three projector configured to generate display light of a respective color;
    three non-overlapping input gratings, each of the three non-overlapping input gratings configured to couple the display light in a respective color into the waveguide;
    three first middle gratings, each of the three first middle gratings configured to receive and redirect the display light from a respective input grating of the three non-overlapping input gratings;
    a second middle grating configured to receive and redirect the display light from the three first middle gratings; and
    an output grating configured to couple the display light from the second middle grating out of the waveguide.

16. The waveguide display of claim 15, wherein the waveguide comprises:
    a first substrate;
    a second substrate; and one or more holographic material layers between the first substrate and the second substrate, wherein the three first middle gratings and the second middle grating are formed in the one or more holographic material layers.

17. The waveguide display of claim 15, further comprising a phase structure on the waveguide, the phase structure configured to change a polarization state of the display light incident on the phase structure after or before the display light is diffracted by the three first middle gratings.

18. The waveguide display of claim 17, wherein the phase structure comprises a waveplate, a layer of a birefringent material, or a subwavelength structure and an overcoat layer.

19. The waveguide display of claim 15, wherein:
each input grating of the three non-overlapping input gratings is on a respective staircase structure bonded to the waveguide; and
each respective staircase structure is on top a first middle grating of the three first middle gratings.

20. The waveguide display of claim 19, wherein:
each respective staircase structure includes a staircase substrate;
each input grating of the three non-overlapping input gratings is on a top or a bottom of the staircase substrate of the respective staircase structure; and
each respective staircase structure is characterized by a total thickness less than 100 μm.

\* \* \* \* \*